A2

United States Patent
Prokopenko et al.

(10) Patent No.: US 8,024,394 B2
(45) Date of Patent: Sep. 20, 2011

(54) DUAL MODE FLOATING POINT MULTIPLY ACCUMULATE UNIT

(75) Inventors: Boris Prokopenko, Milpitas, CA (US); Timour Paltashev, Fremont, CA (US); Derek Gladding, San Francisco, CA (US)

(73) Assignee: Via Technologies, Inc., Taipei (TW)

( * ) Notice: Subject to any disclaimer, the term of this patent is extended or adjusted under 35 U.S.C. 154(b) by 1262 days.

(21) Appl. No.: 11/671,630

(22) Filed: Feb. 6, 2007

(65) Prior Publication Data

US 2007/0185953 A1 Aug. 9, 2007

Related U.S. Application Data

(60) Provisional application No. 60/765,571, filed on Feb. 6, 2006.

(51) Int. Cl.
*G06F 7/38* (2006.01)
(52) U.S. Cl. ...................................... 708/513
(58) Field of Classification Search .................. 708/501, 708/513
See application file for complete search history.

(56) References Cited

U.S. PATENT DOCUMENTS

| 4,893,268 | A | * | 1/1990 | Denman et al. ............... 708/627 |
|---|---|---|---|---|
| 5,268,855 | A | * | 12/1993 | Mason et al. .................. 708/513 |
| 5,631,859 | A | * | 5/1997 | Markstein et al. ............ 708/513 |
| 5,764,558 | A | | 6/1998 | Pearson et al. |
| 5,892,698 | A | * | 4/1999 | Naffziger ....................... 708/501 |
| 6,282,556 | B1 | | 8/2001 | Chehrazi et al. |
| 6,292,886 | B1 | * | 9/2001 | Makineni et al. ............. 712/222 |
| 6,480,872 | B1 | | 11/2002 | Choquette |
| 6,493,817 | B1 | * | 12/2002 | Renstrom ........................ 712/22 |
| 6,711,602 | B1 | | 3/2004 | Bhandal et al. |
| 2003/0069913 | A1 | | 4/2003 | Deng et al. |
| 2004/0199561 | A1 | * | 10/2004 | Brooks et al. ................. 708/501 |

* cited by examiner

*Primary Examiner* — Chuong D Ngo
(74) *Attorney, Agent, or Firm* — Thomas, Kayden, Horstemeyer & Risley, LLP

(57) ABSTRACT

Included are embodiments of a Multiply-Accumulate Unit to process multiple format floating point operands. For short format operands, embodiments of the Multiply Accumulate Unit are configured to process data with twice the throughput as long and mixed format data. At least one embodiment can include a short exponent calculation component configured to receive short format data, a long exponent calculation component configured to receive long format data, and a mixed exponent calculation component configured to receive short exponent data, the mixed exponent calculation component further configured to received long format data. Embodiments also include a mantissa datapath configured for implementation to accommodate processing of long, mixed, and short floating point operands.

15 Claims, 42 Drawing Sheets

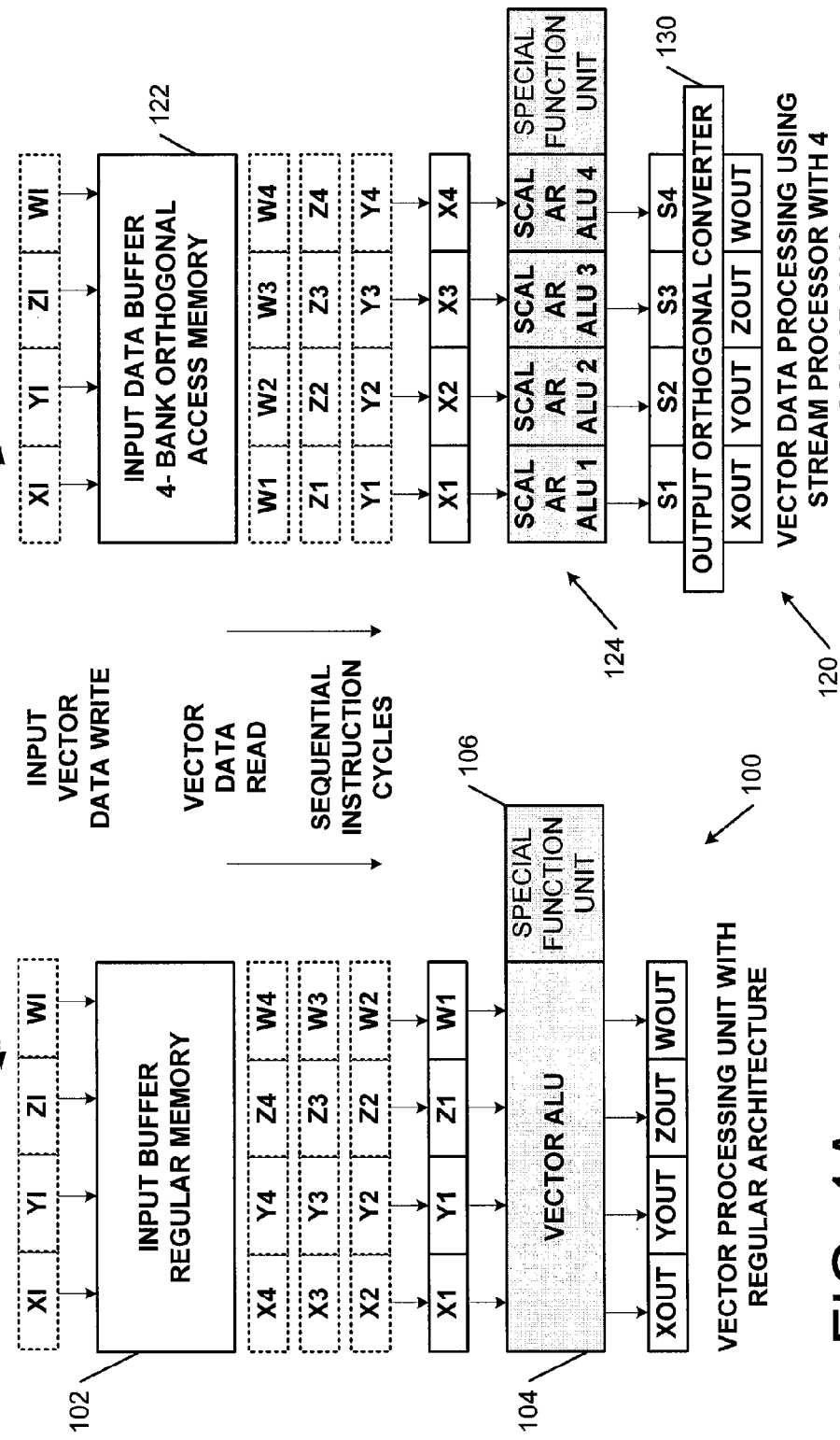

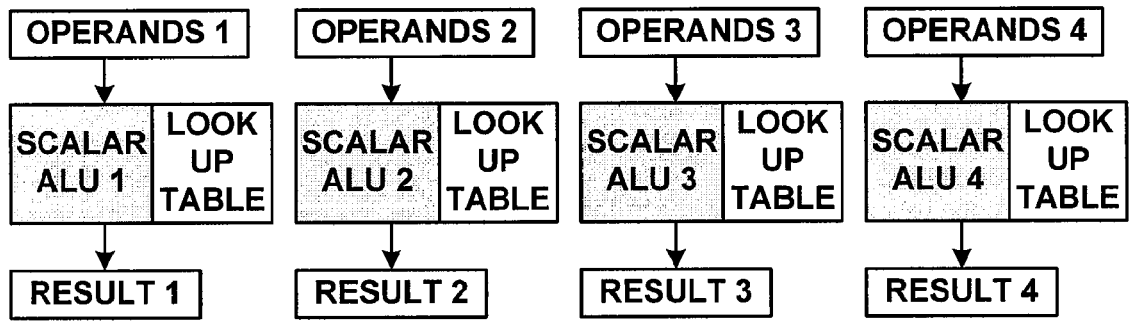
FIG. 1C ALGORITHMIC SOFTWARE IMPLEMENTATION OF COMPLEX FUNCTIONS IN SIMD STRUCTURE
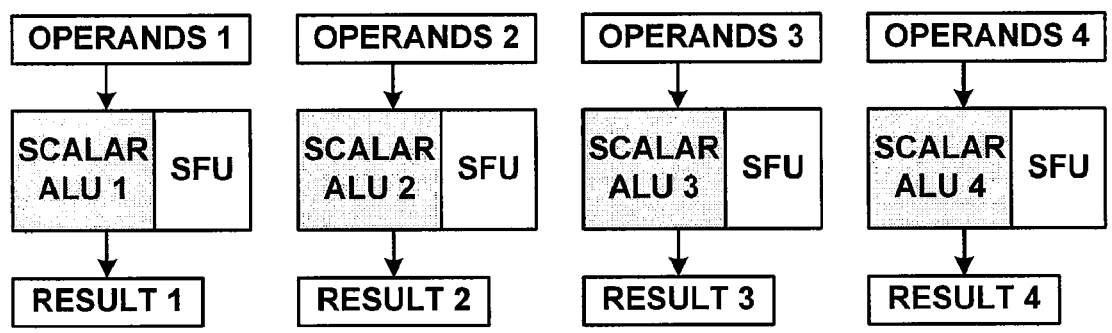
FIG. 1D HARDWARE IMPLEMENTATION OF COMPLEX FUNCTIONS IN SIMD STRUCTURE WITH PRIVATE SPECIAL FUNCTION UNITS

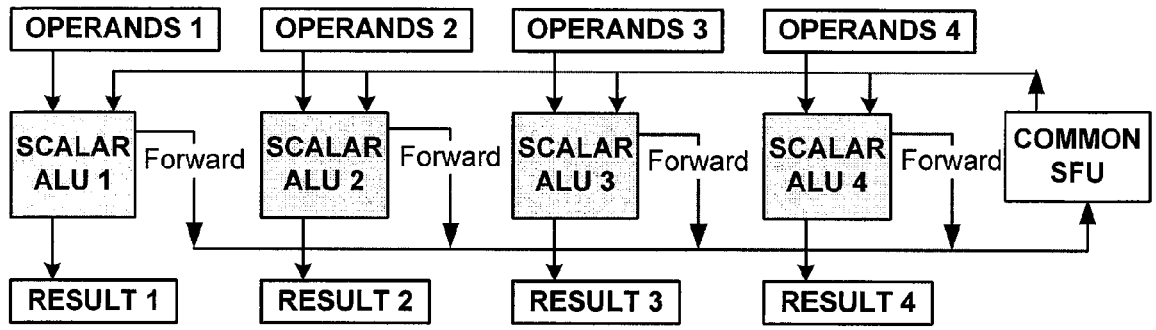
FIG. 1E  HARDWARE IMPLEMENTATION OF COMPLEX FUNCTIONS IN SIMD STRUCTURE WITH COMMON SPECIAL FUNCTION UNIT
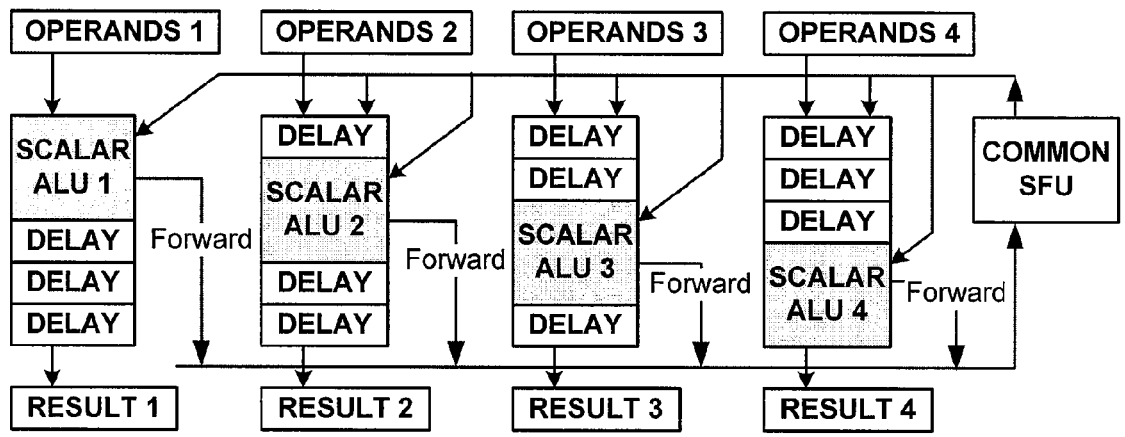
FIG. 1F  HARDWARE IMPLEMENTATION OF COMPLEX FUNCTIONS IN SIMD STRUCTURE WITH COMMON SPECIAL FUNCTION UNIT

A) VERTEX STREAM DATA PROCESSING IN SCALAR ALU WITH SIMD FACTOR 4

B) TRIANGLE STREAM DATA PROCESSING IN SCALAR ALU WITH SIMD FACTOR 4

A) VECTOR STREAM DATA PROCESSING IN SCALAR ALU WITH SIMD FACTOR 4 (LONG FORMAT)

FOLDING RESULTS OF 4 ALUS TO ALU3

B) VECTOR STREAM DATA PROCESSING IN SCALAR ALU WITH SIMD FACTOR 1 (LONG FORMAT)

FIG. 5A

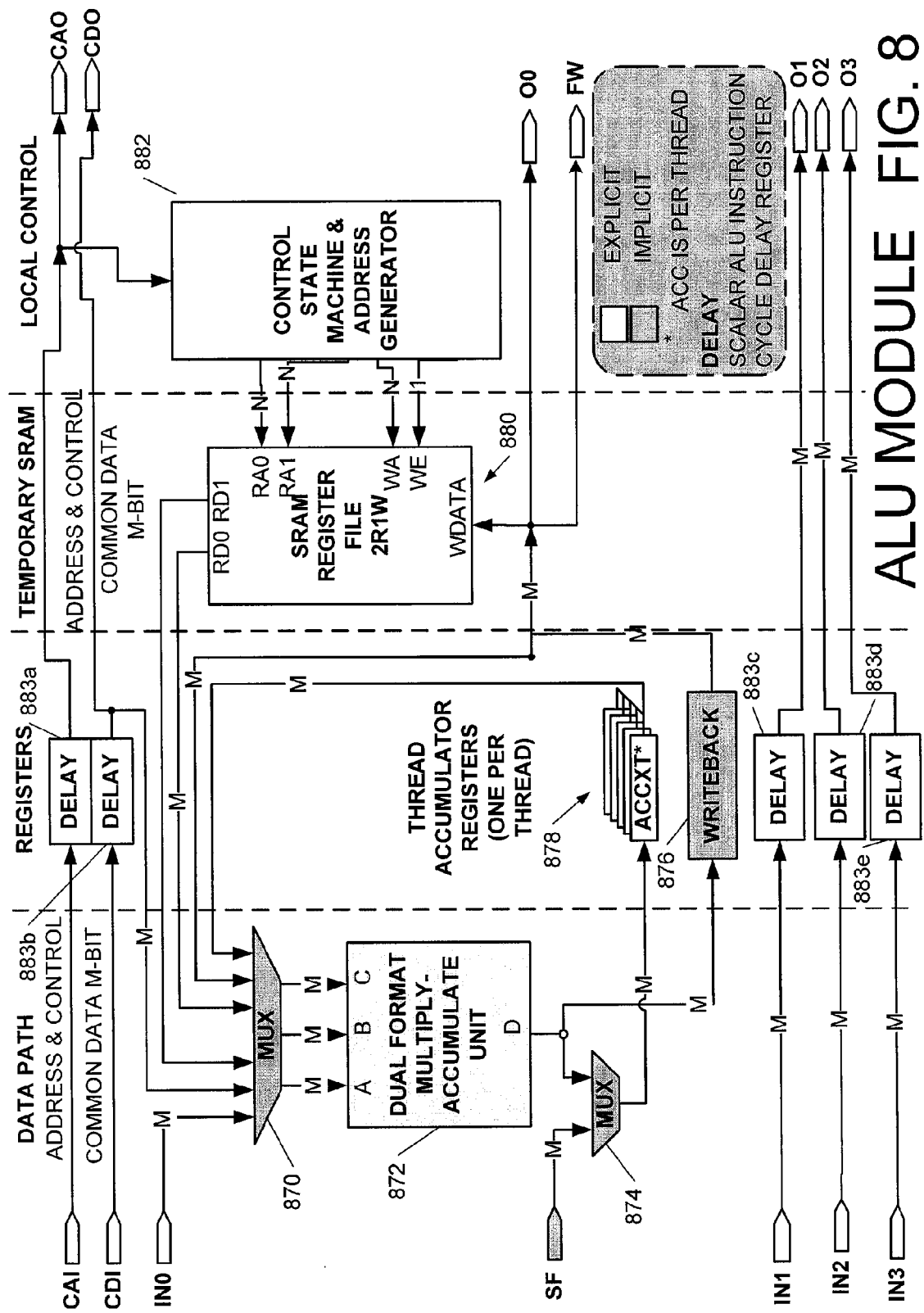
ALU MODULE  FIG. 8

DATA FORMAT DETAILS AND SIGNAL NAME CONVENTION

MIXED MANTISSA DATA PATH ALU 1

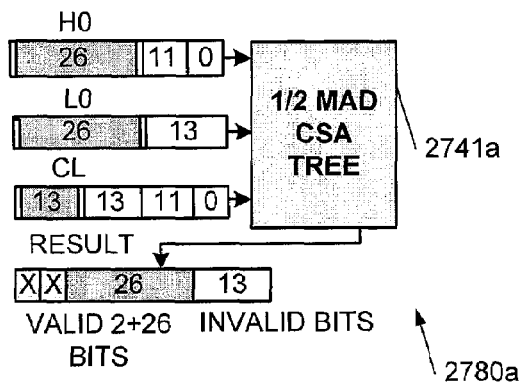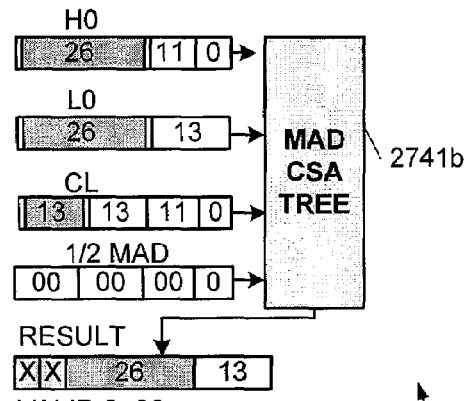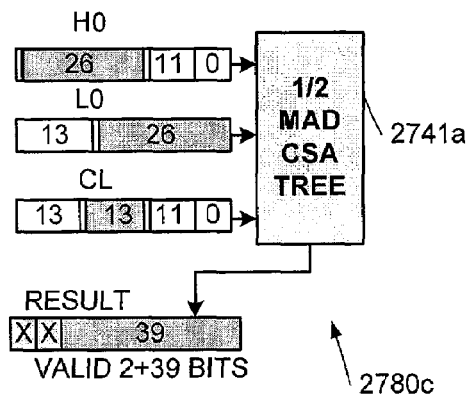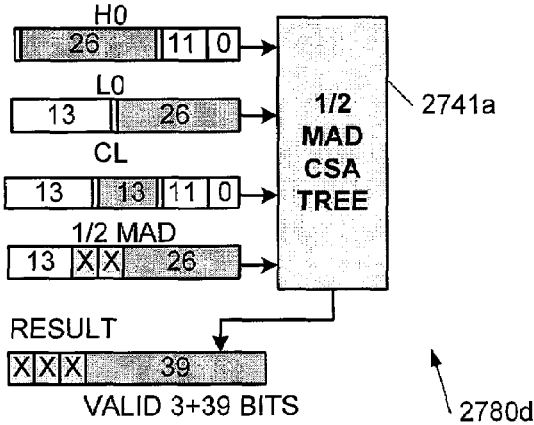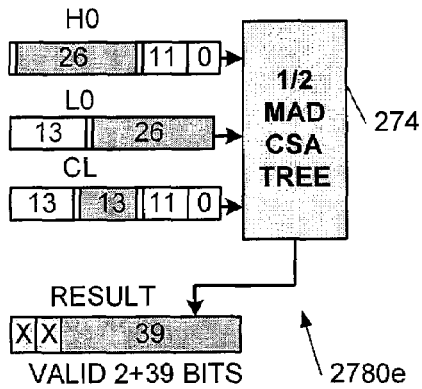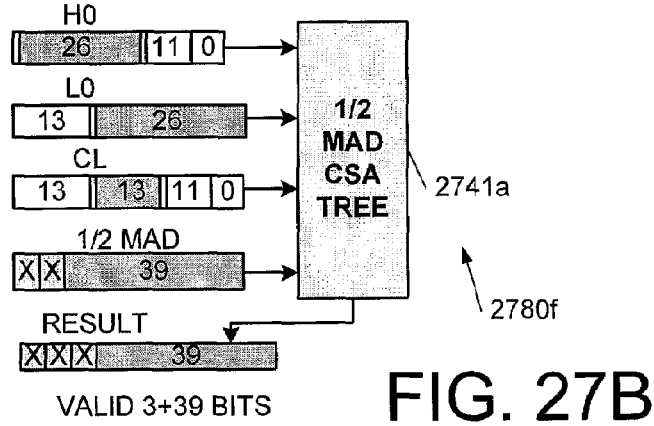
FIG. 27B

SHORT MODE PROCESSING FORMATS FOR MAC CSA
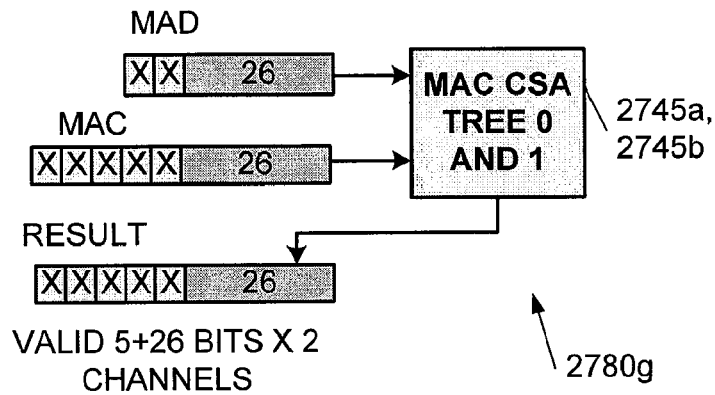
VALID 5+26 BITS X 2 CHANNELS
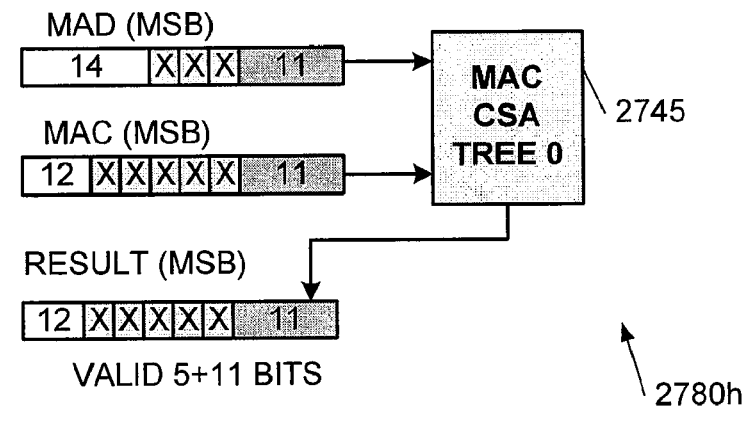
VALID 5+11 BITS
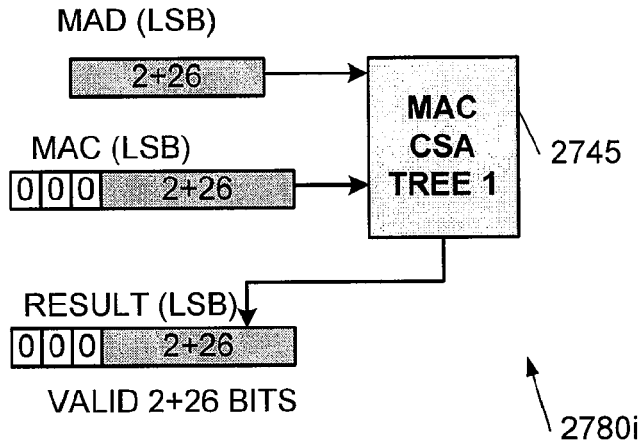
VALID 2+26 BITS
MIXED MODE PROCESSING FORMATS FOR MAC CSA CAN BE THE SAME AS LONG FORMATS
FIG. 27C

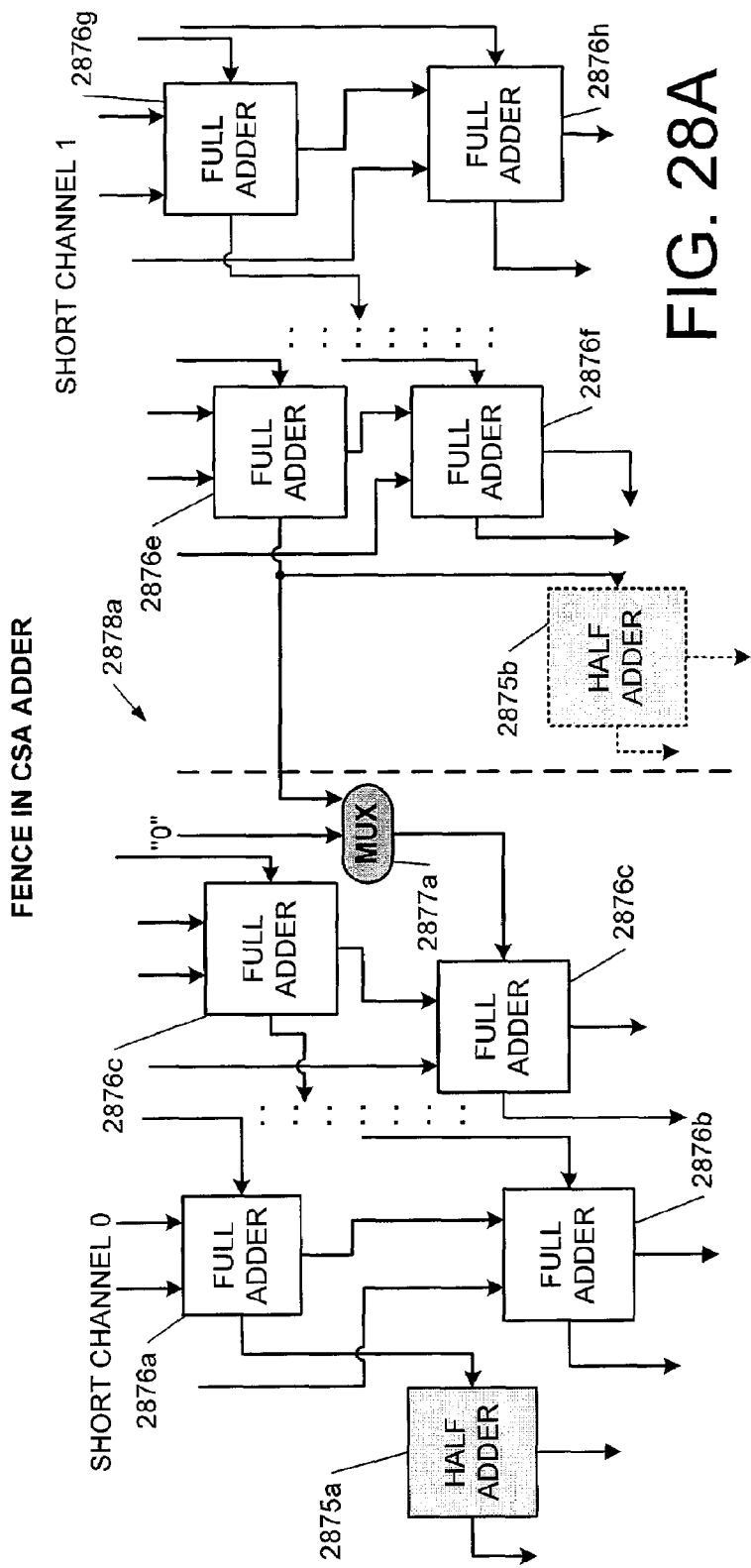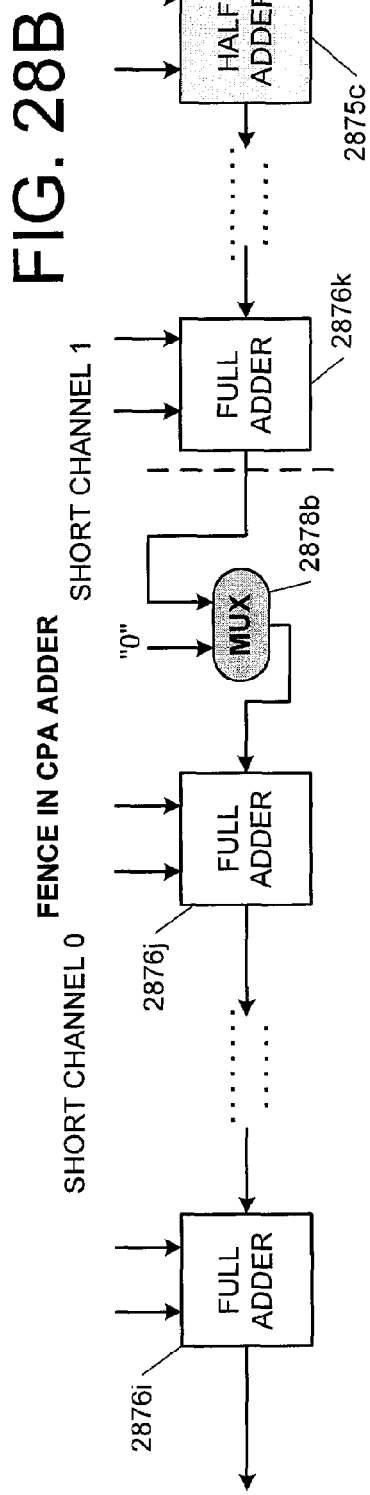
FIG. 28A
FIG. 28B

DUAL MODE FLOATING POINT MULTIPLY ACCUMULATE UNIT

CROSS REFERENCE

This application claims the benefit of U.S. Provisional Application No. 60/765,571, filed on Feb. 6, 2006, which is incorporated by reference in its entirety. This application is also related to copending U.S. Utility patent application entitled "Stream Processor with Variable Single Instruction Multiple Data (SIMD) Factor and Common Special Function" filed on the same day as the present application and accorded Ser. No. 11/671,610, which is hereby incorporated by reference herein in its entirety.

The U.S. patent application entitled "SIMD Processor with Scalar Arithmetic Logic Units" filed on Jan. 29, 2003 and given Ser. No. 10/354,795 is also incorporated by reference in its entirety.

BACKGROUND

Since the year 2000, fixed function Graphics Processing Units (GPUs) are becoming more and more programmable, providing a user with direct and flexible control on the processing primitive, vertex, texture, and pixel streams in graphics chips. Many current GPUs can feature programmability in the form of at least one shader (primitive, vertex, etc.) but generally can process only a few types of data (say 32-bit floating point for vertex and 32-bit integer). The programmable shaders in the graphics pipeline are generally arranged in sequential manner for forwarding data to fixed function units and to each other with a data format conversion if desired.

Also generally involved in the design of GPUs are parallel multiprocessor architecture principles. Application of parallel architecture principles generally utilizes a plurality of same type arithmetic logic units (ALUs) to process different types of stream data in non-uniform program threads. In many circumstances, the ALUs are desired to process different kinds of data for every clock cycle if non-uniform program threads are interleaved.

One of important issues is an implementation of complex mathematical functions (special functions) in such multiprocessor structures. There are generally two ways to implement them: special subroutine executed on general ALU and special hardware unit attached to general ALU which produced result by its request. Software implementation of such functions creates significant performance degradation, which might be unacceptable in case of real-time graphics applications. In the case of multiple ALU combined in SIMD structure such unit should be attached to every ALU which may significantly increase hardware overhead. Such complex functions are not used very often in a shader program and most of the time those special hardware units combined with each general ALU will be idling.

This situation can be partially resolved by sharing the special function unit (SFU) among a plurality of ALUs, but in the case of an SIMD structure, a thread will be stalled until all streams will get their result from shared SFU which will process requests sequentially. It may take several cycles of overhead in each involvement of complex mathematical function in shader program. Special arrangements in the SIMD stream architecture should be made to minimize stall wait cycles and provide smooth stream processing with minimal overhead if non-uniform program threads are interleaved.

While the ALUs used in this multiprocessing manner generally sustain high throughput, the ALUs should be able to process more data streams in short format sharing the same hardware for longer format. Generally speaking, current ALUs for GPUs are configured to process only one format of floating point unit (e.g., 32-bit IEEE format as standard) and generally experience low performance in processing lower accuracy pixel and texture data. Additionally, if another type of data format is supported, the ALU generally works with the same number of streams with little to no throughput improvement nor Single Instruction Multiple Data (SIMD) factor variability regardless of the data format. Further, current ALUs are generally not configured to arbitrarily interleave the flow of instructions (lack of support for non-uniform threads). Additionally, current dual format Multiply Accumulate (MACC) units can generally process only integer data.

Vector machines with a fixed data format and a fixed SIMD factor generally have less of a hardware load and generally process stream data relatively slowly in the case where there are a lesser number of elements in the vector stream than the width of a vector unit. Additionally current graphics shader architecture generally has limited instruction set capabilities in processing different format data in the same instruction.

Thus, a heretofore unaddressed need exists in the industry to address the aforementioned deficiencies and inadequacies.

SUMMARY

Included are embodiments of a Multiply-Accumulate Unit that is configured to process a plurality of different data types. Embodiments of the Multiply-Accumulate Unit include a short format component configured to facilitate processing of short format data, a long format component configured to facilitate processing of long format data, a mixed format component configured to facilitate processing of short format data and long format data, and a mantissa datapath configured to facilitate processing of a plurality of different formatted operands.

Also included are methods of process a plurality of different data types. At least one embodiment of a method includes receiving data for processing, determining whether the received data includes short format data, determining whether the received data includes long format data, processing the data according to a control signal, and sending the data to output.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 1A is a flowchart illustrating stream data processing steps that can be taken in an exemplary vector processing unit.

FIG. 1B is a flowchart illustrating stream data processing steps that can be taken in an exemplary scalar processing unit, similar to the steps illustrated in FIG. 1A.

FIG. 1C is an exemplary stream processing SIMD structure with software implementation of complex mathematical functions.

FIG. 1D is an exemplary stream processing SIMD structure with hardware implementation of complex mathematical functions using private special function unit (SFU) for each ALU.

FIG. 1E is an exemplary stream processing SIMD structure with hardware implementation of complex mathematical functions using a common SFU for all ALUs.

FIG. 1F is an exemplary stream processing SIMD structure with implementation of complex mathematical functions using a common SFU with interleaved access to common SFU.

Figure 1G:
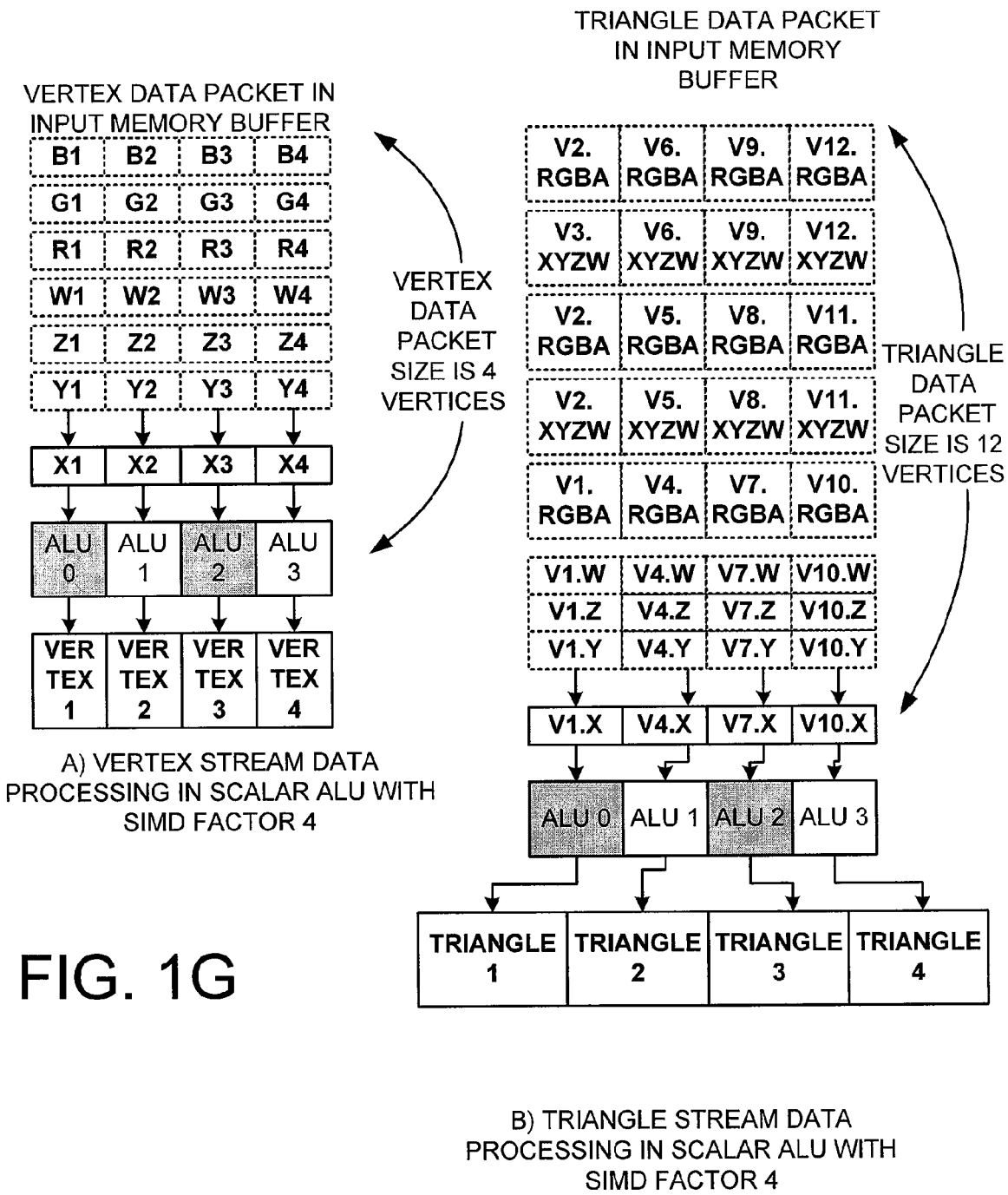
FIG. 1G is an exemplary illustration of an SIMD factor reduction in the case of a common SIMD structure for both vertex and triangle processing.
Figure 2A:
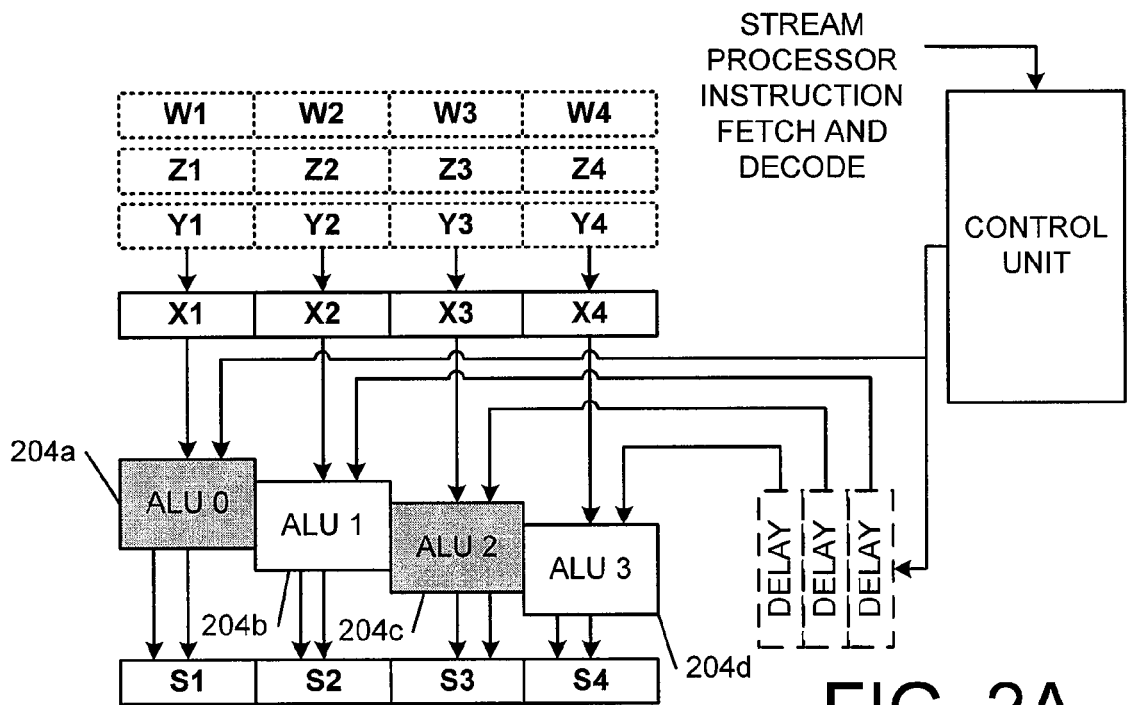

FIG. 2A a flowchart illustrating steps that can be taken in an exemplary scalar processing unit, similar to the flowchart from FIG. 1, with an SIMD factor 4.

Figure 2B:
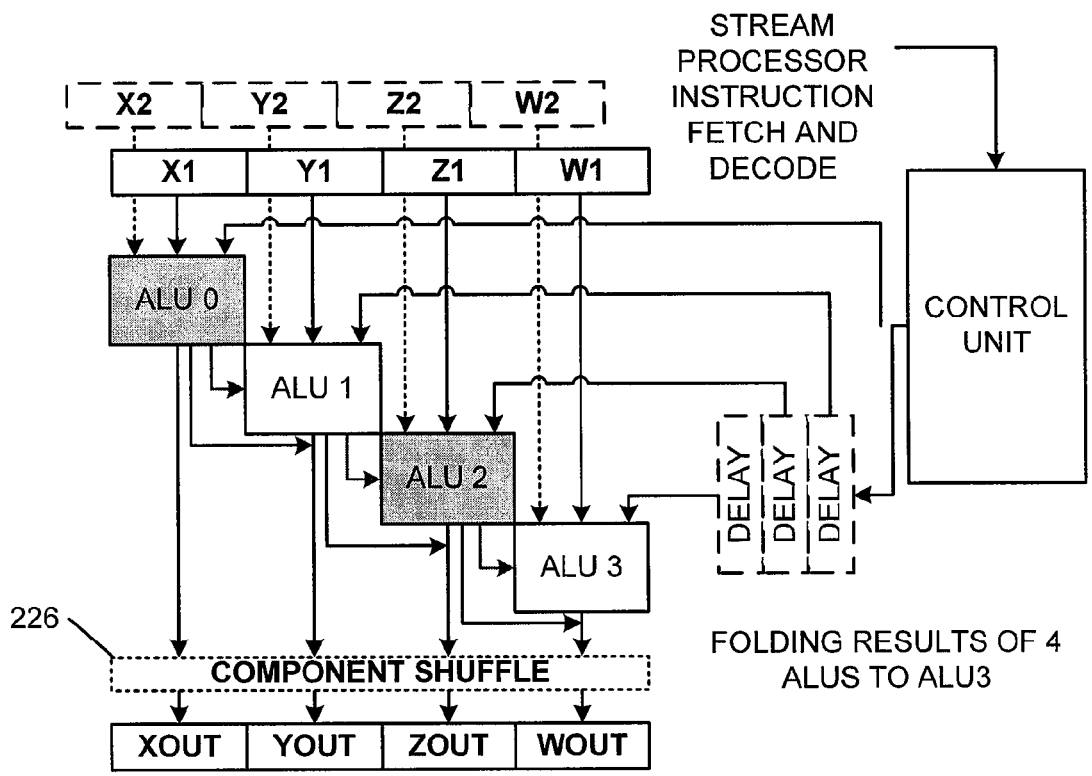

FIG. 2B is a flowchart illustrating steps that can be taken in an exemplary scalar processing unit, similar to the flowchart from FIG. 1, with an SIMD factor 1.

Figure 2C:
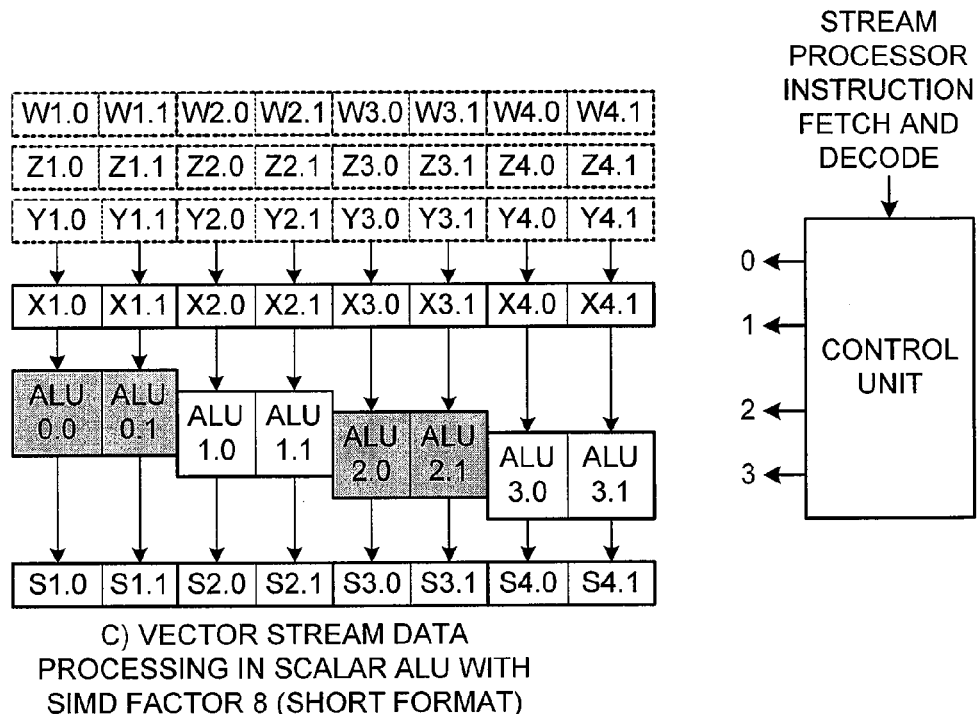

FIG. 2C is a flowchart illustrating steps that can be taken in an exemplary scalar processing unit, similar to the flowchart from FIG. 1, with an SIMD factor 8 for short data format.

Figure 2D:
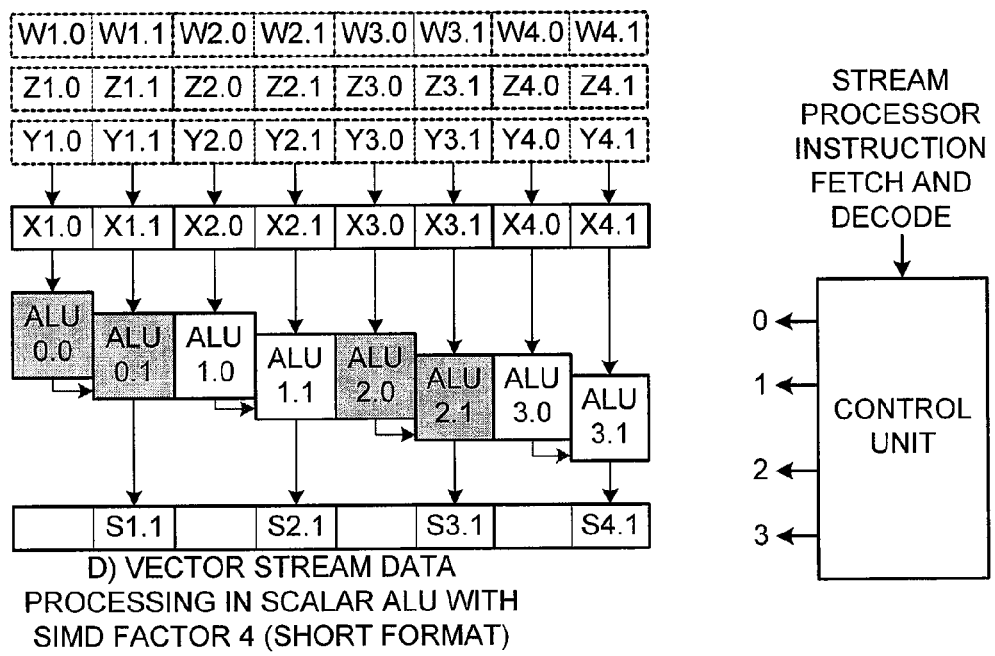

FIG. 2D is a flowchart illustrating steps that can be taken in an exemplary processing unit, similar to the flowchart from FIG. 1, with an SIMD factor 4 for short data format.

Figure 3:
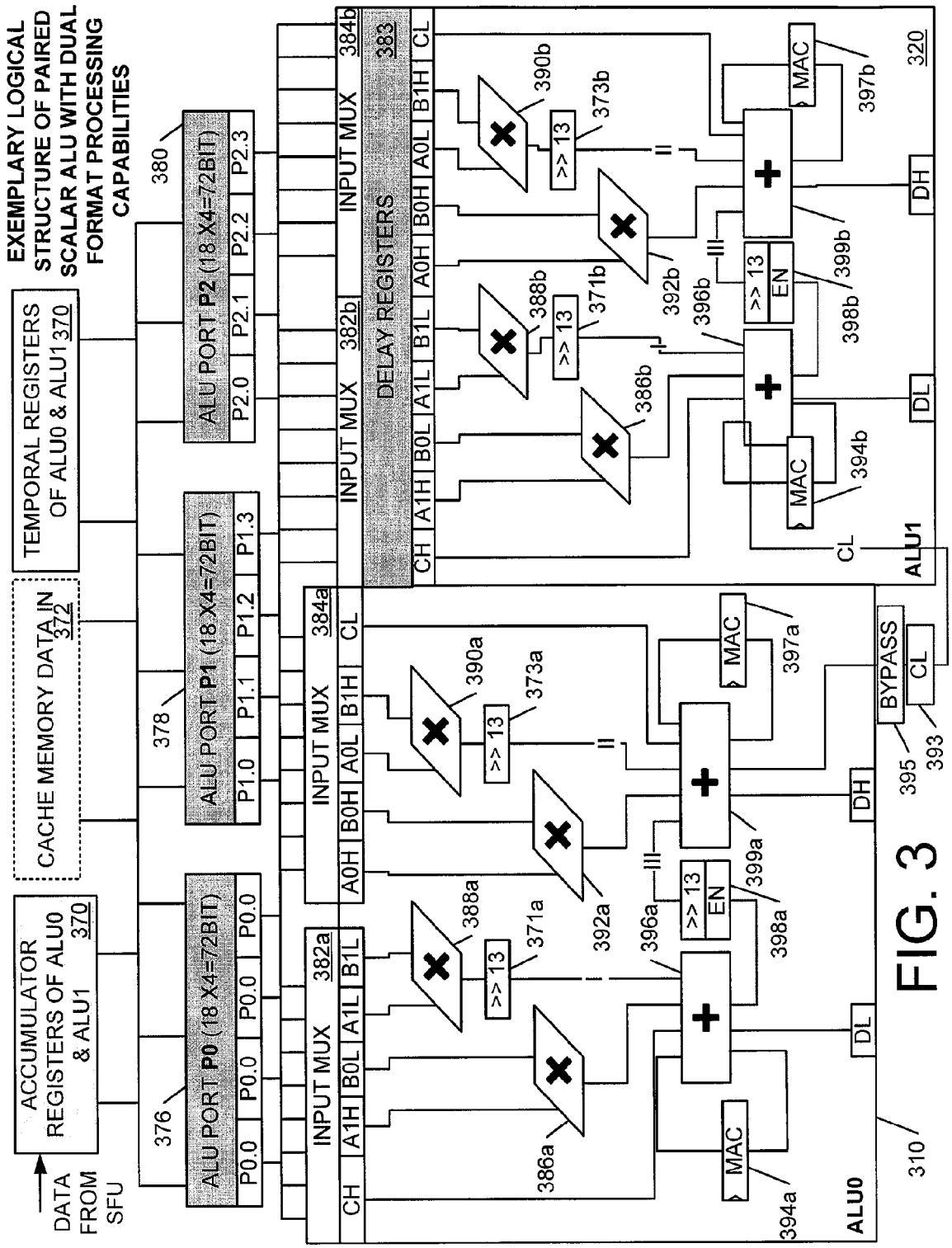

FIG. 3 is an exemplary logical structure of paired scalar ALUs with dual format processing capabilities, illustrating processing characteristics from FIGS. 1 and 2A-2G, illustrating stream ALU functionality.

Figure 4:
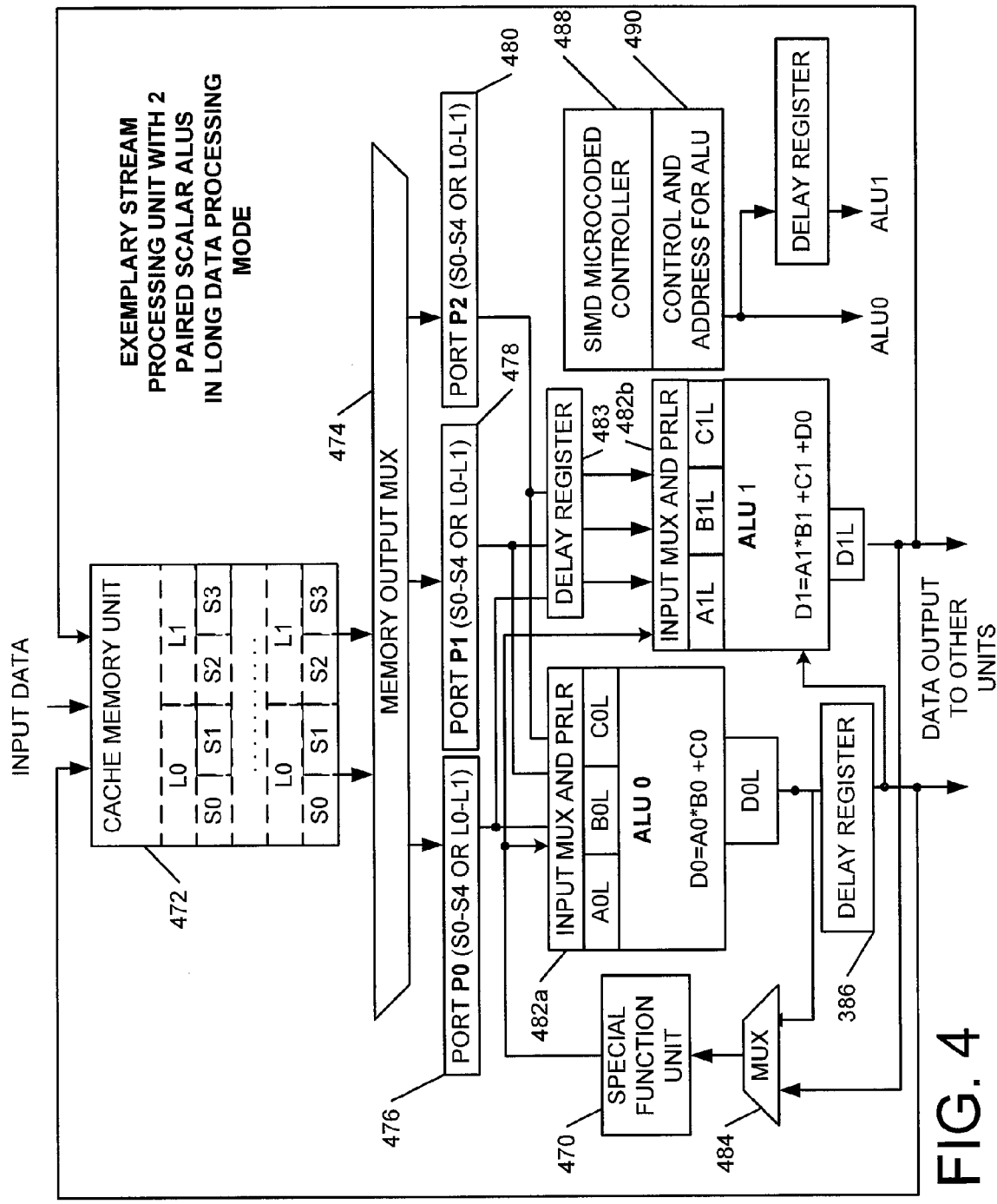

FIG. 4 is an exemplary stream processing unit in long format processing mode with paired scalar ALUs, similar to the structure from FIG. 3, and showing an upper level of control and memory.

Figure 5A:
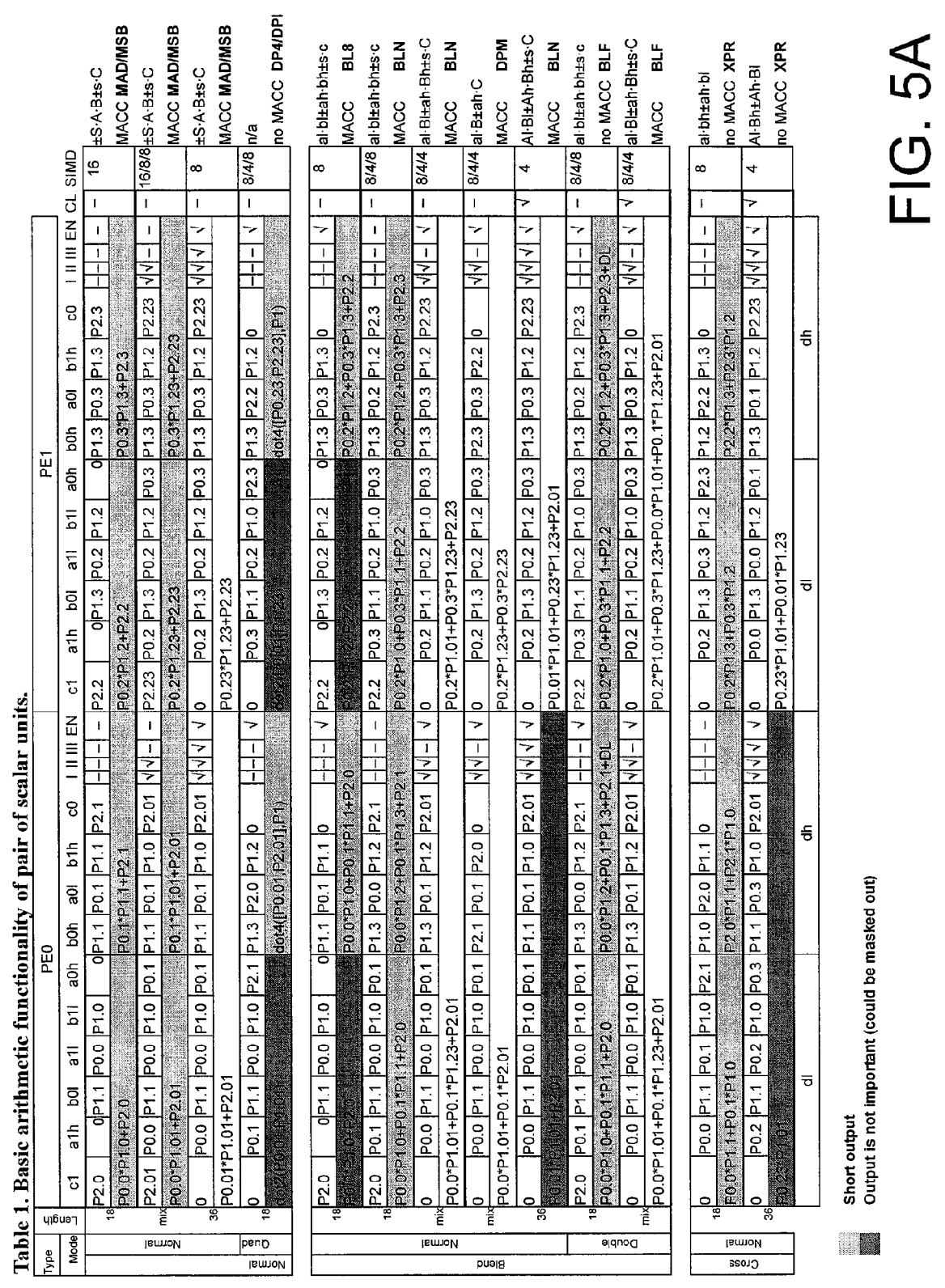

FIG. 5A is a table illustrating exemplary arithmetic functionality of paired scalar ALUs, and can be used as a base for numerical processing instruction set development such as the ALUs illustrated in FIGS. 3 and 4.

Figure 5B:
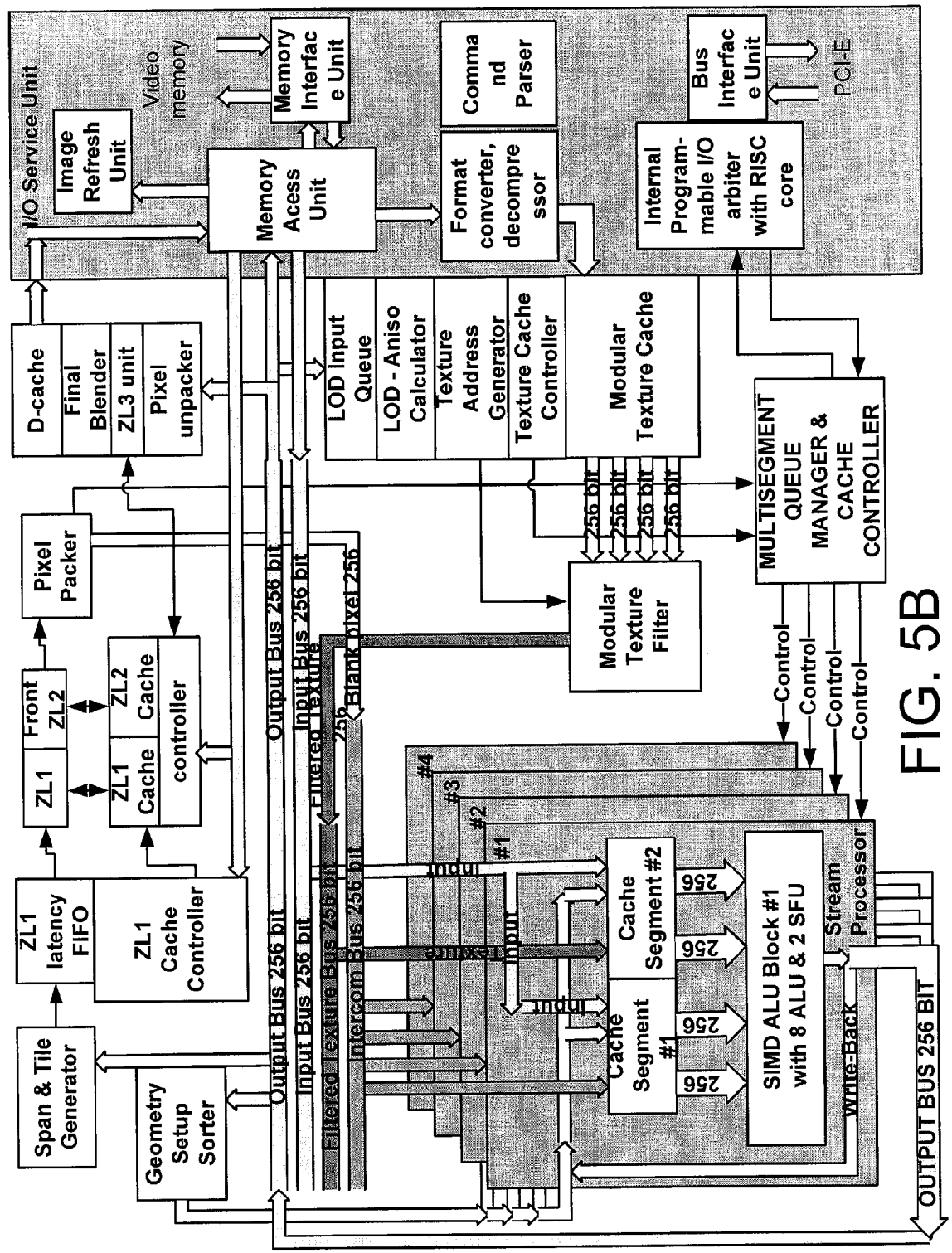

FIG. 5B is a GPU structure where an exemplary stream processor pool is used as a computational core, where the stream processor has a scalable architecture and may contain from 2 to 16 ALUs combined with a reduced number of special function units.

Figure 6:
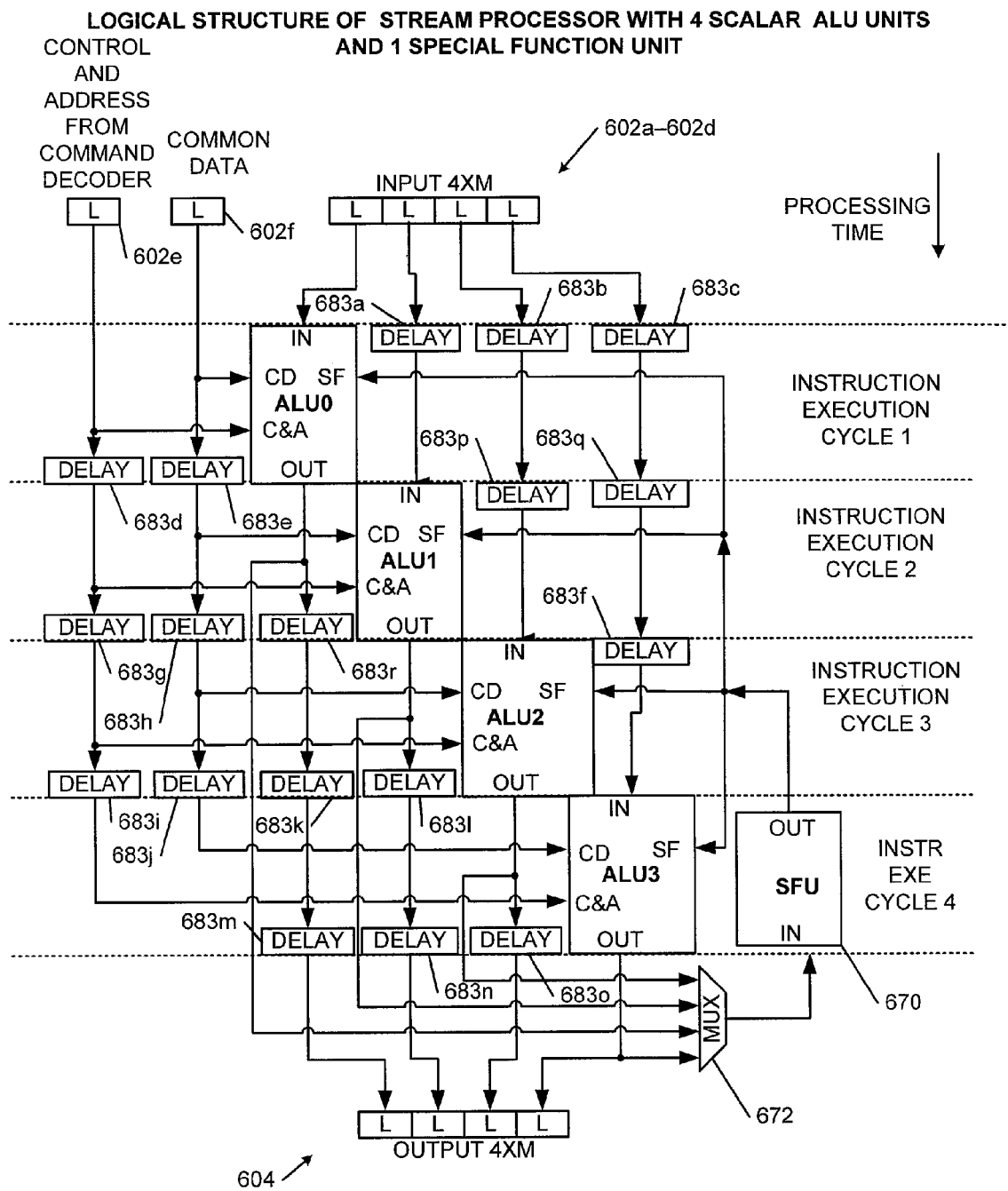

FIG. 6 an exemplary flow diagram and logical structure of a stream processor with 4 scalar ALUs, and SFU interaction, similar to the ALUs from FIGS. 3 and 4.

Figure 7A:
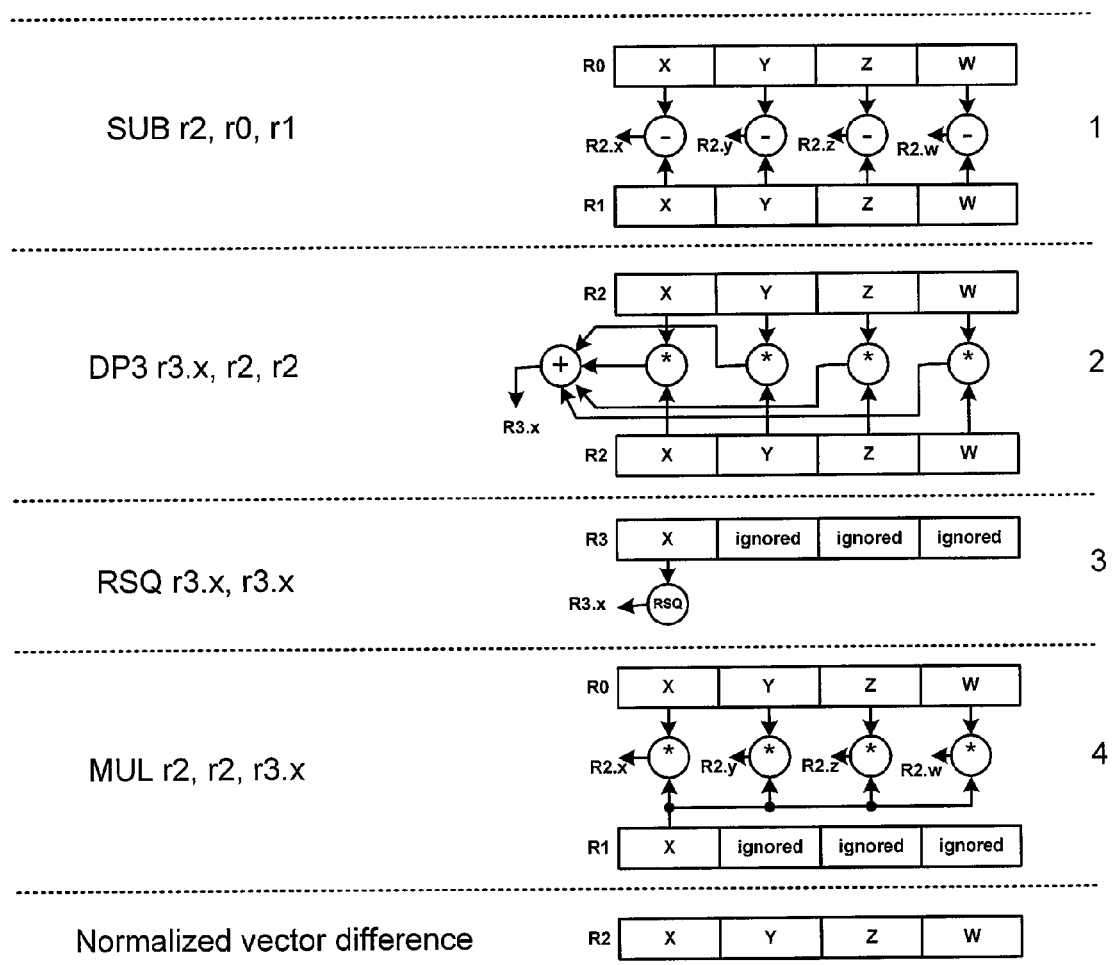

FIG. 7A is a flowchart illustrating an exemplary normalized vector difference processing in a vector ALU.

Figure 7B:
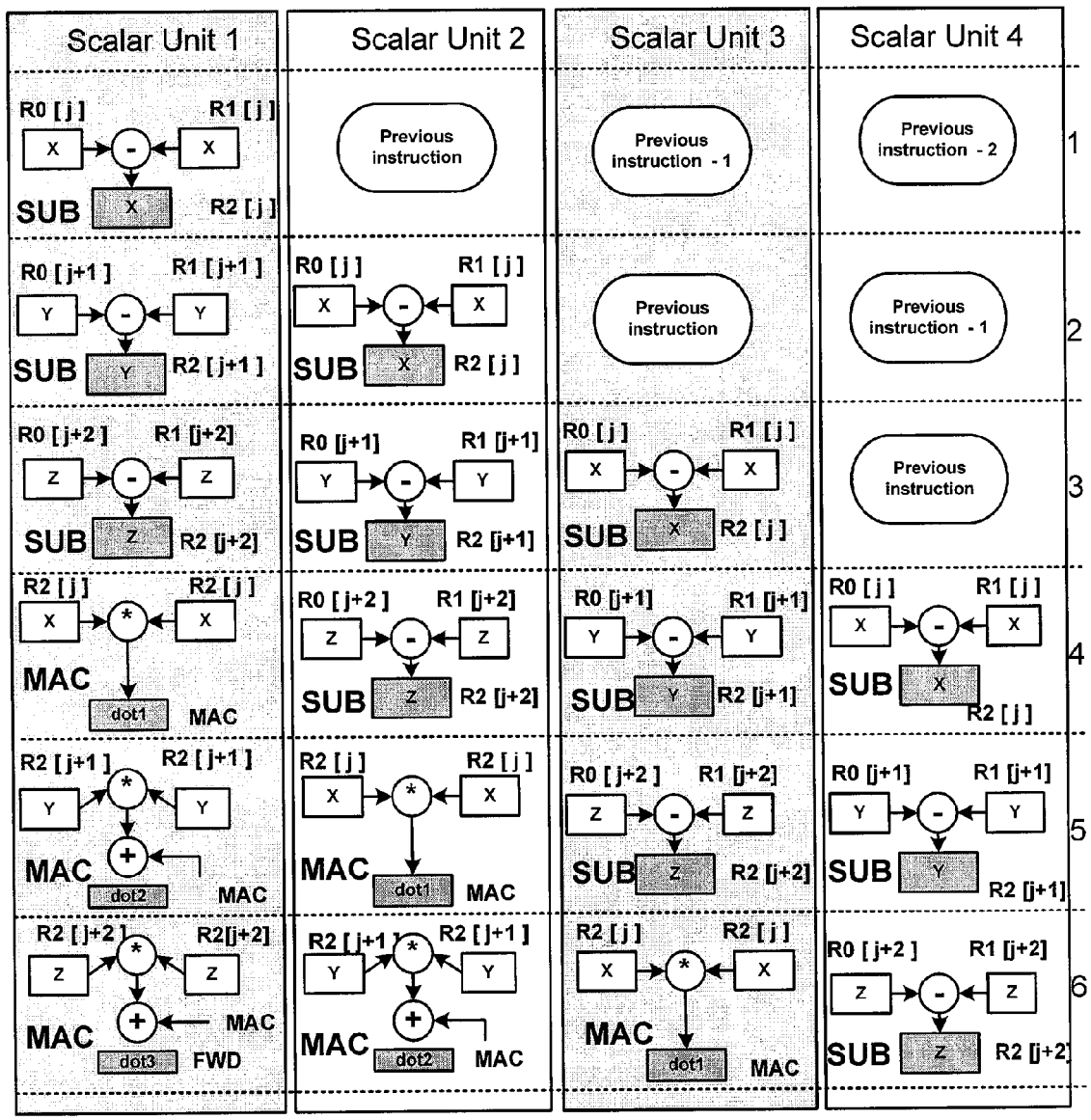

FIG. 7B is a flowchart of an exemplary processing routine in a proposed stream scalar ALU combined with an SFU.

Figure 7C:
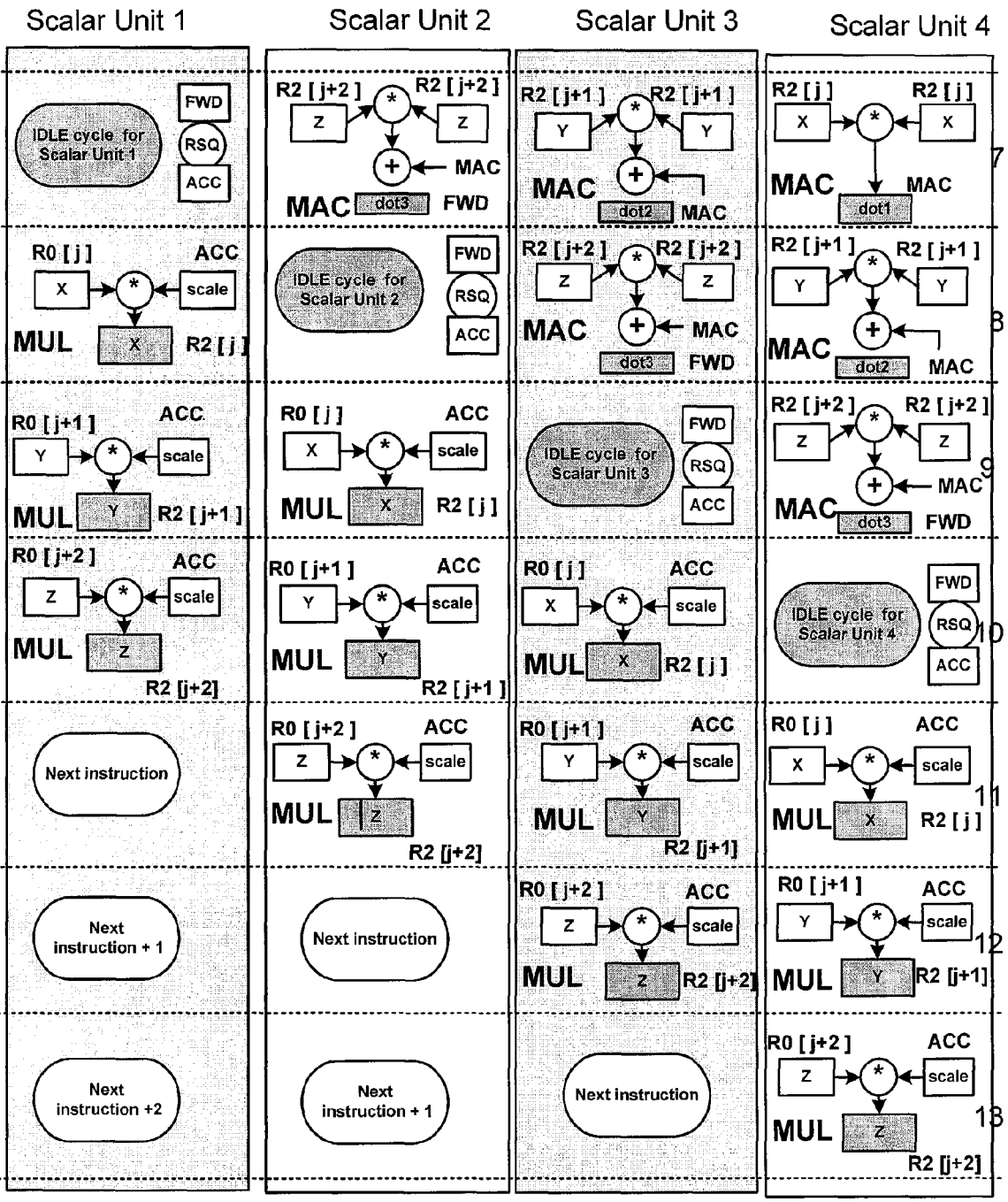

FIG. 7C is a continuation of FIG. 7B.

FIG. 8 is an exemplary ALU module, implementing functionality of the ALUs from FIG. 6.

Figure 9:
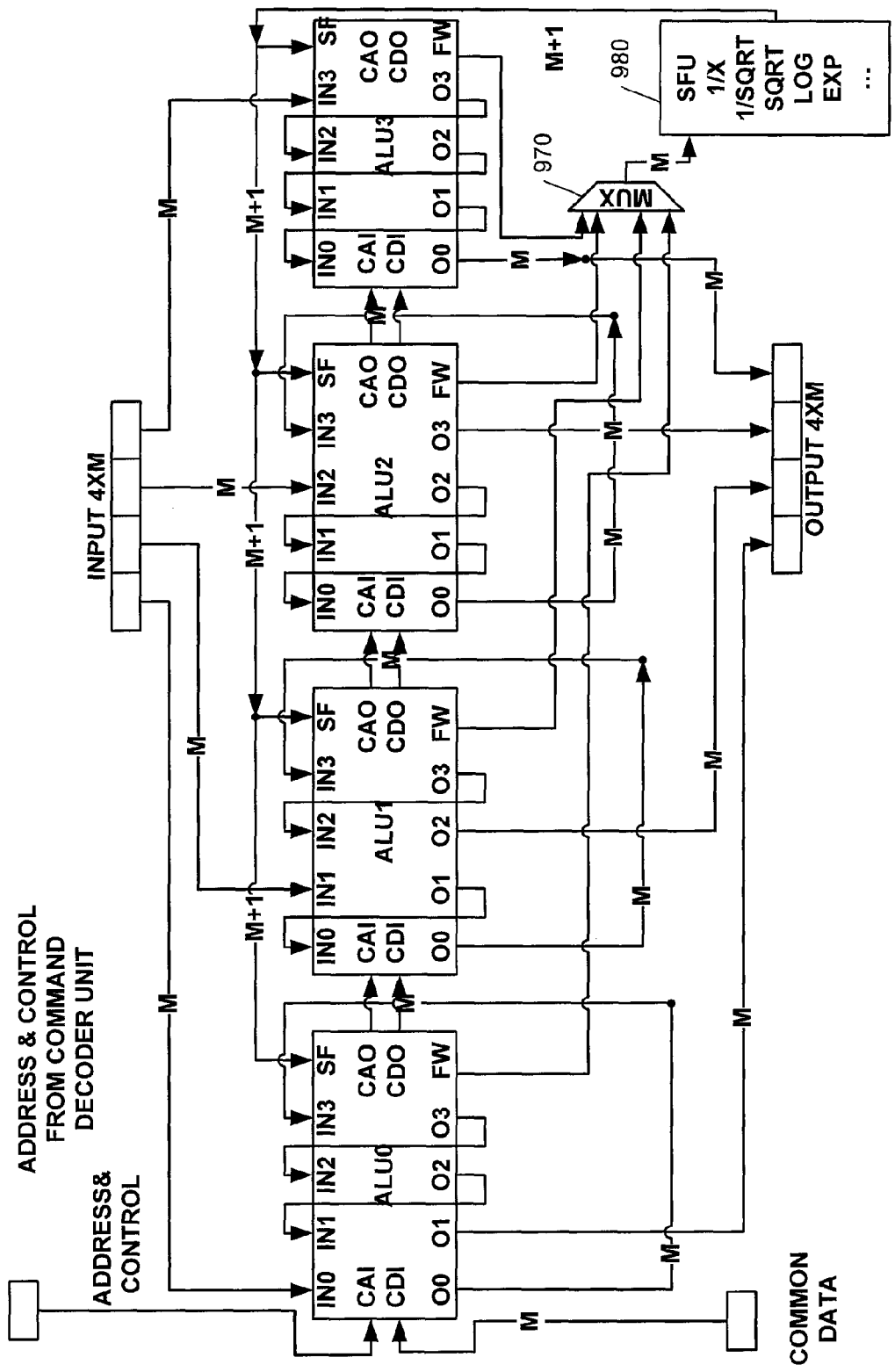

FIG. 9 is an exemplary modular stream processor with a combination of 4 ALU modules, similar to the ALUs from FIGS. 3 and 4.

Figure 10A:
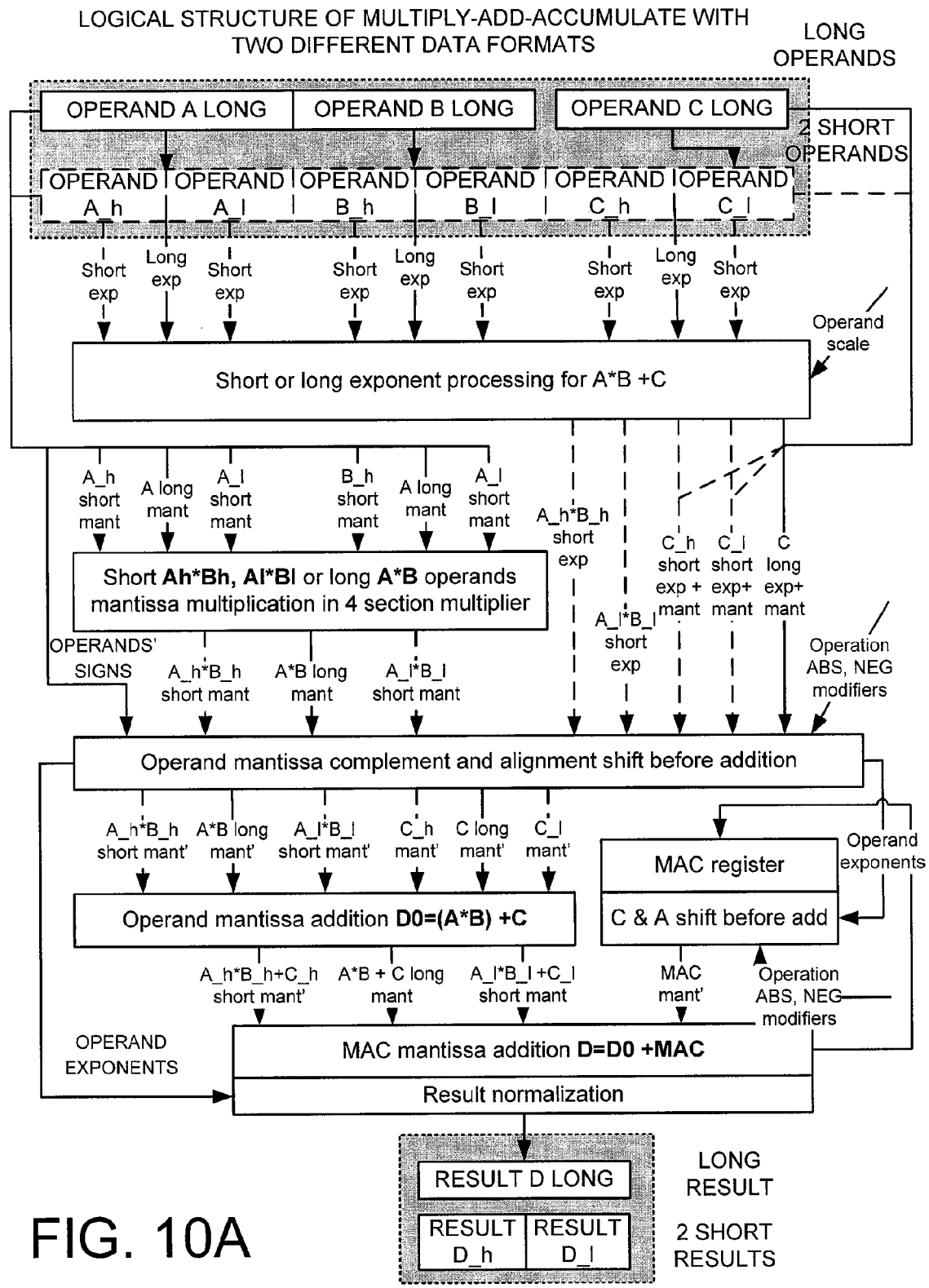
Figure 10B:
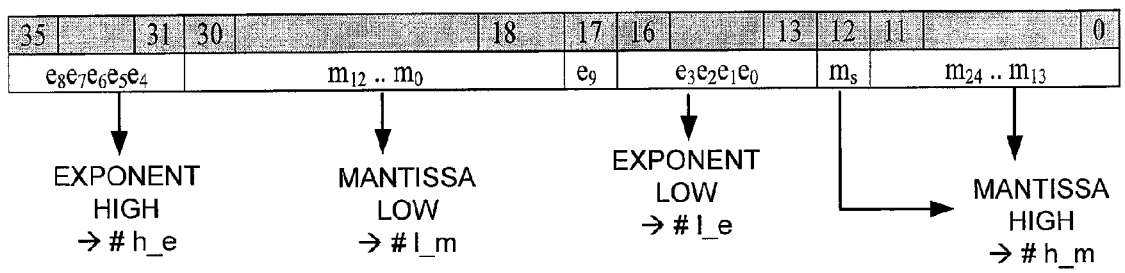
Figure 10C:
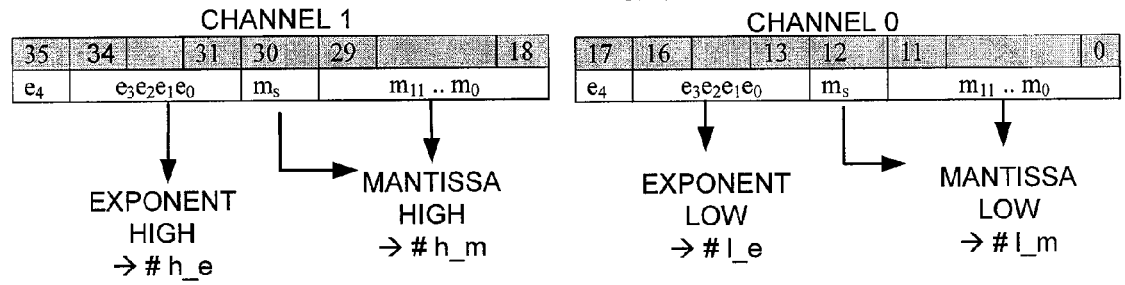

FIGS. 10A-10C are diagrams illustrating exemplary logical structure and data formats for Multiply Accumulate units, such as the Multiply Accumulate Unit from FIG. 8.

Figure 11:
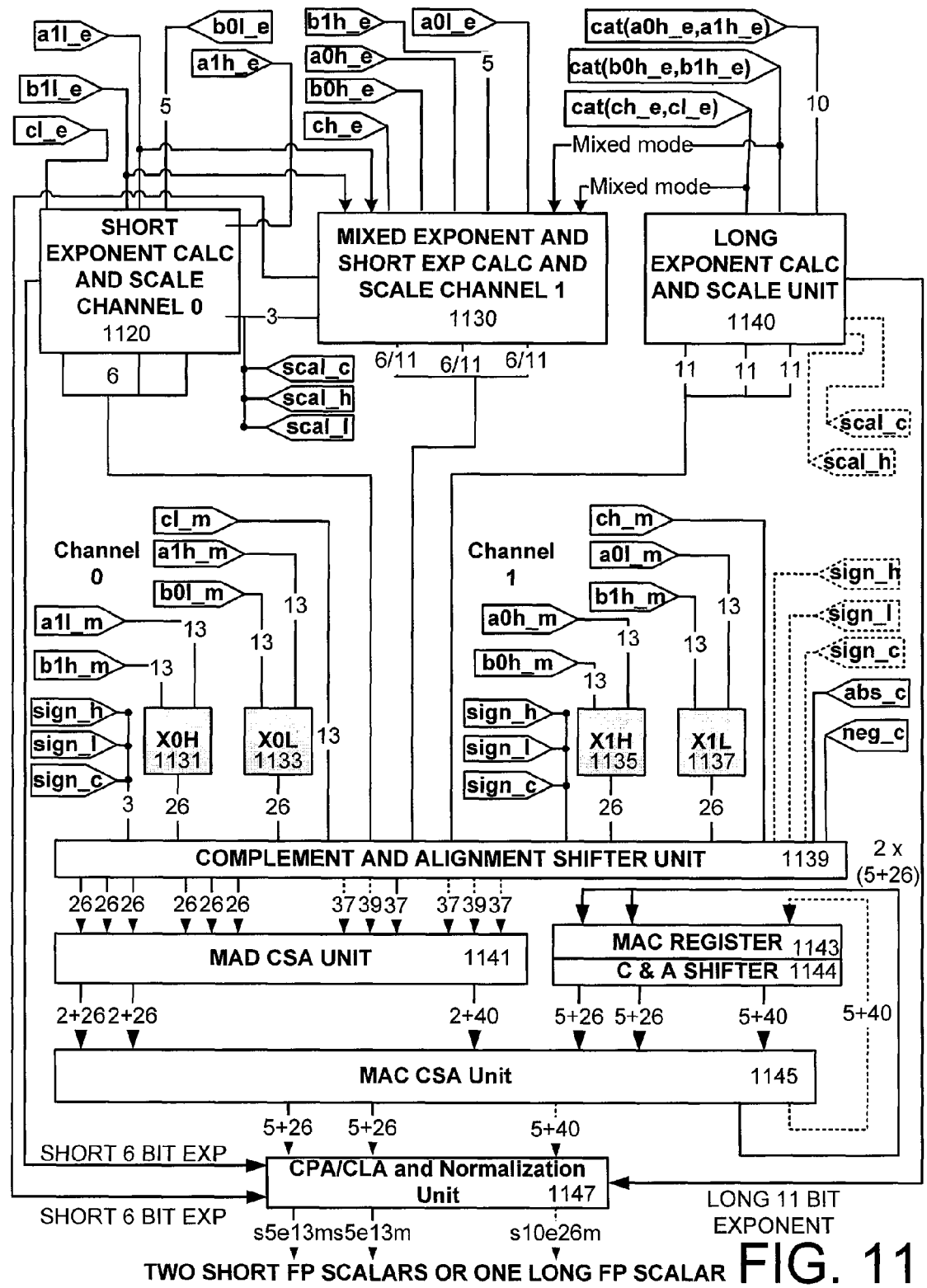

FIG. 11 is an exemplary structure of a MACC unit, similar to the MACC unit from FIG. 8.

Figure 12:
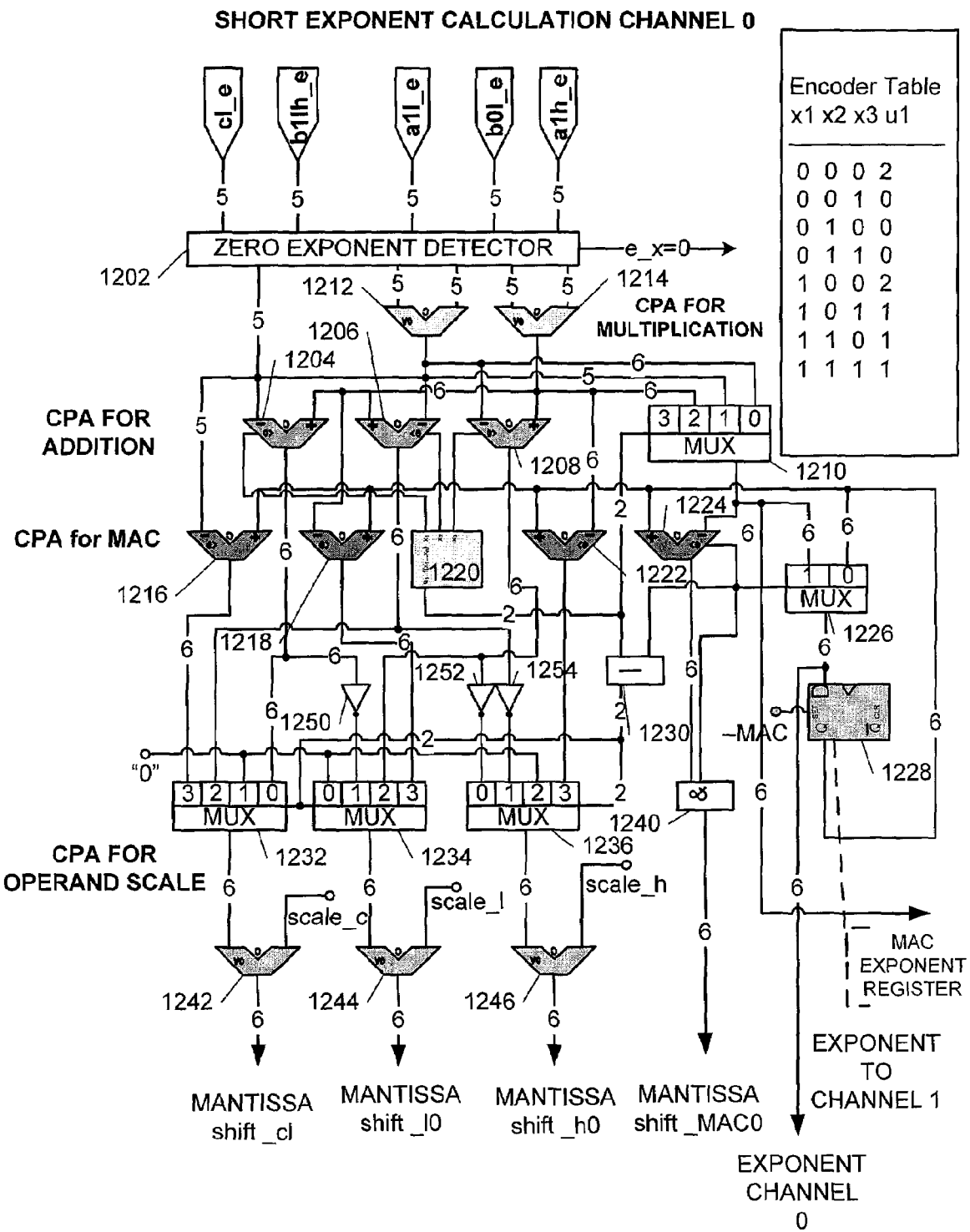

FIG. 12 is an exemplary diagram of a short exponent calculation, similar to the short exponent calculation from FIG. 11.

Figure 13:
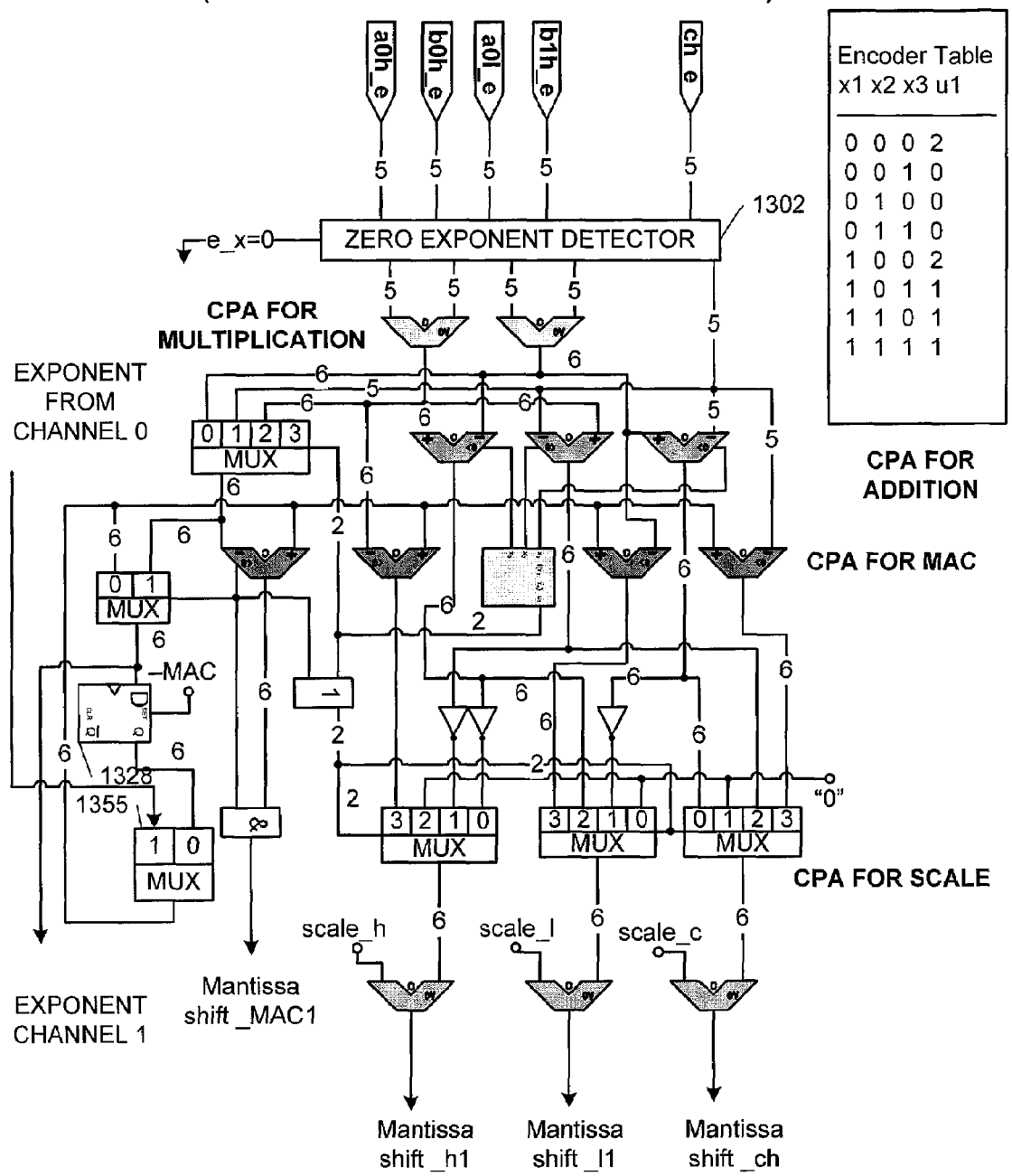

FIG. 13 is an exemplary diagram of a short exponent calculation combined with a mixed exponent, similar to the short exponent calculation from FIG. 11.

Figure 14:
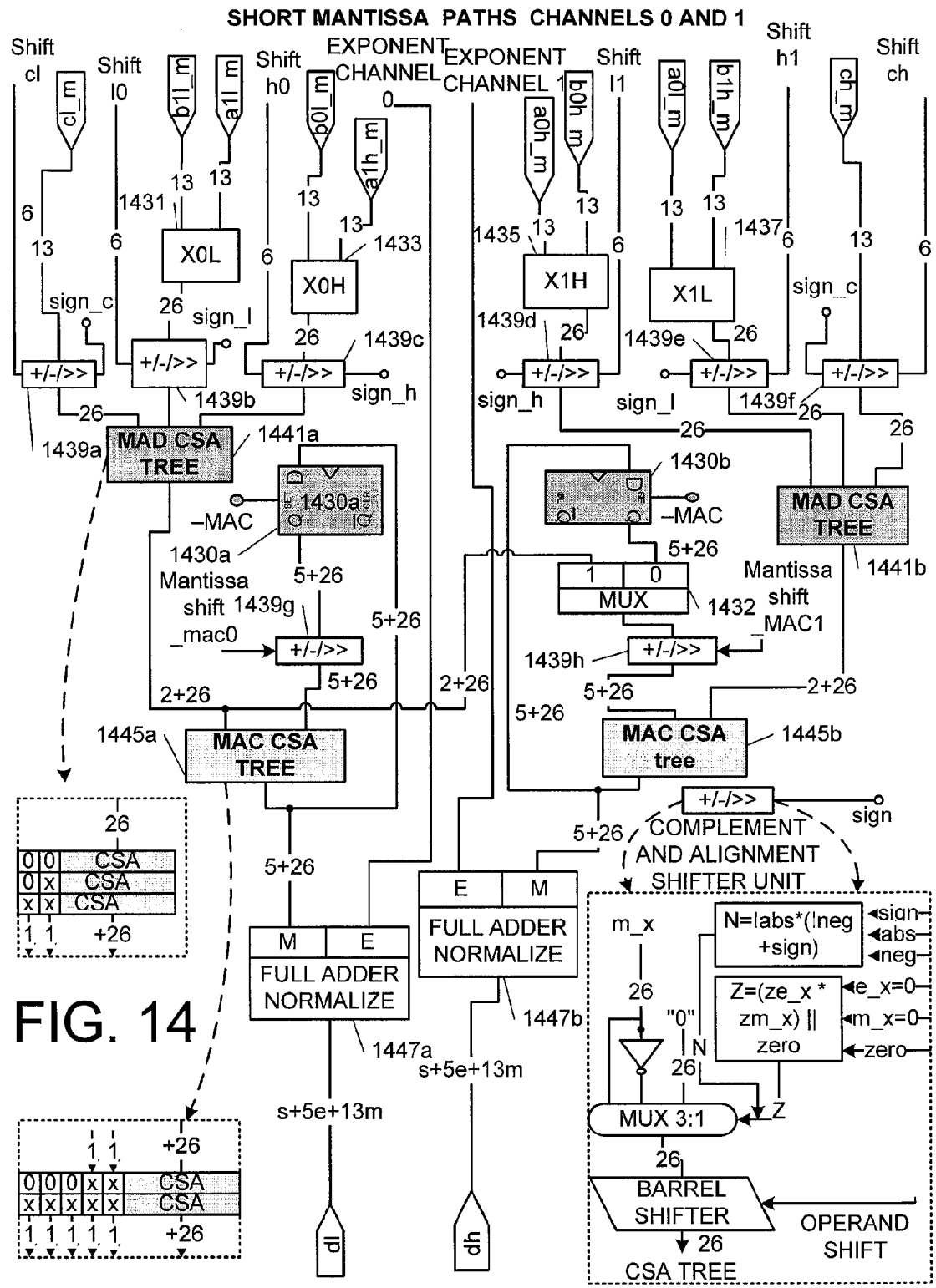

FIG. 14 is an exemplary diagram of a short mantissa path for various channels, describing details of the mantissa path illustrated in FIG. 11.

Figure 15:
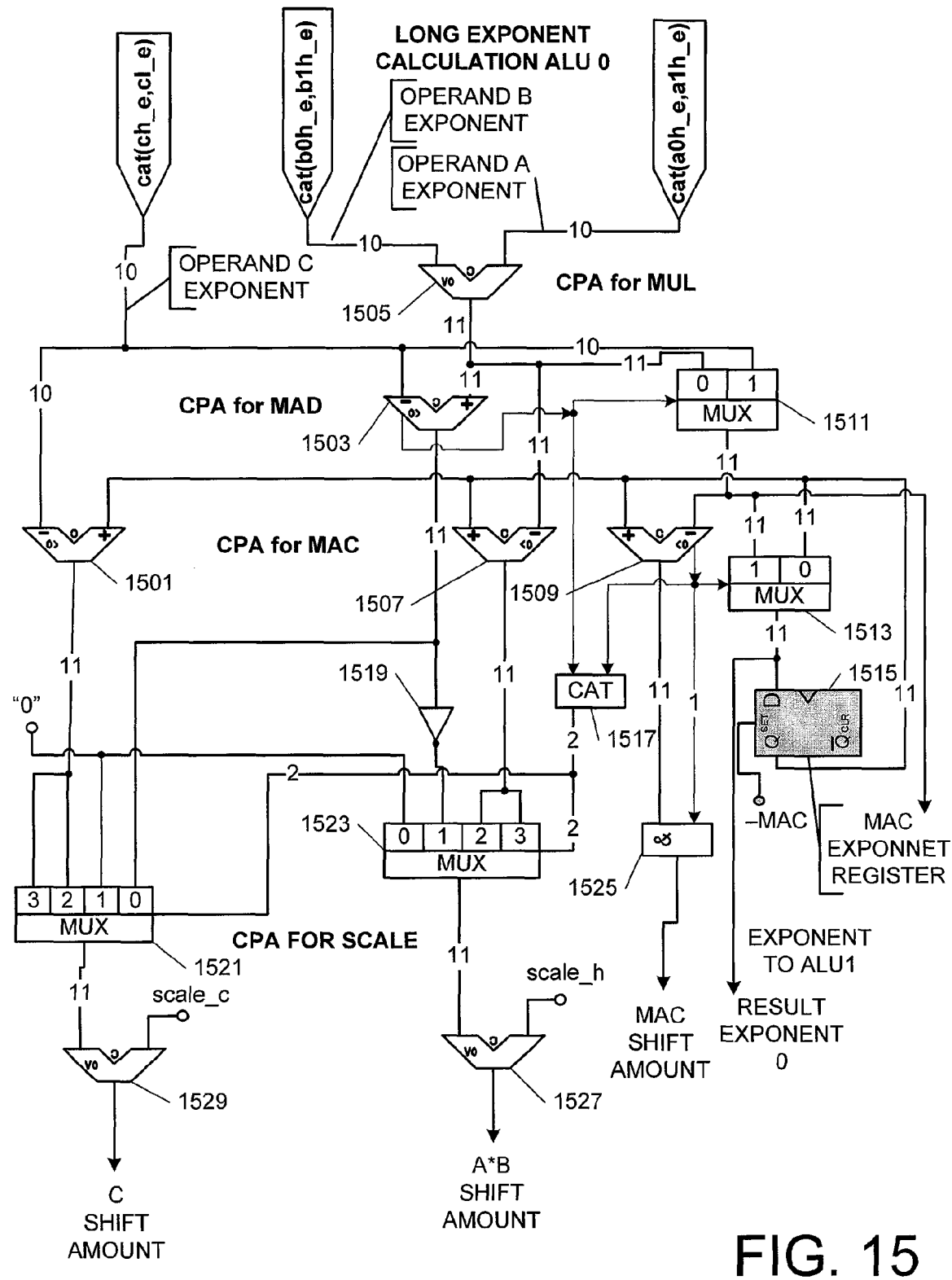

FIG. 15 is an exemplary diagram of a long exponent calculation, describing details of the exponent calculation block from FIG. 11.

Figure 16:
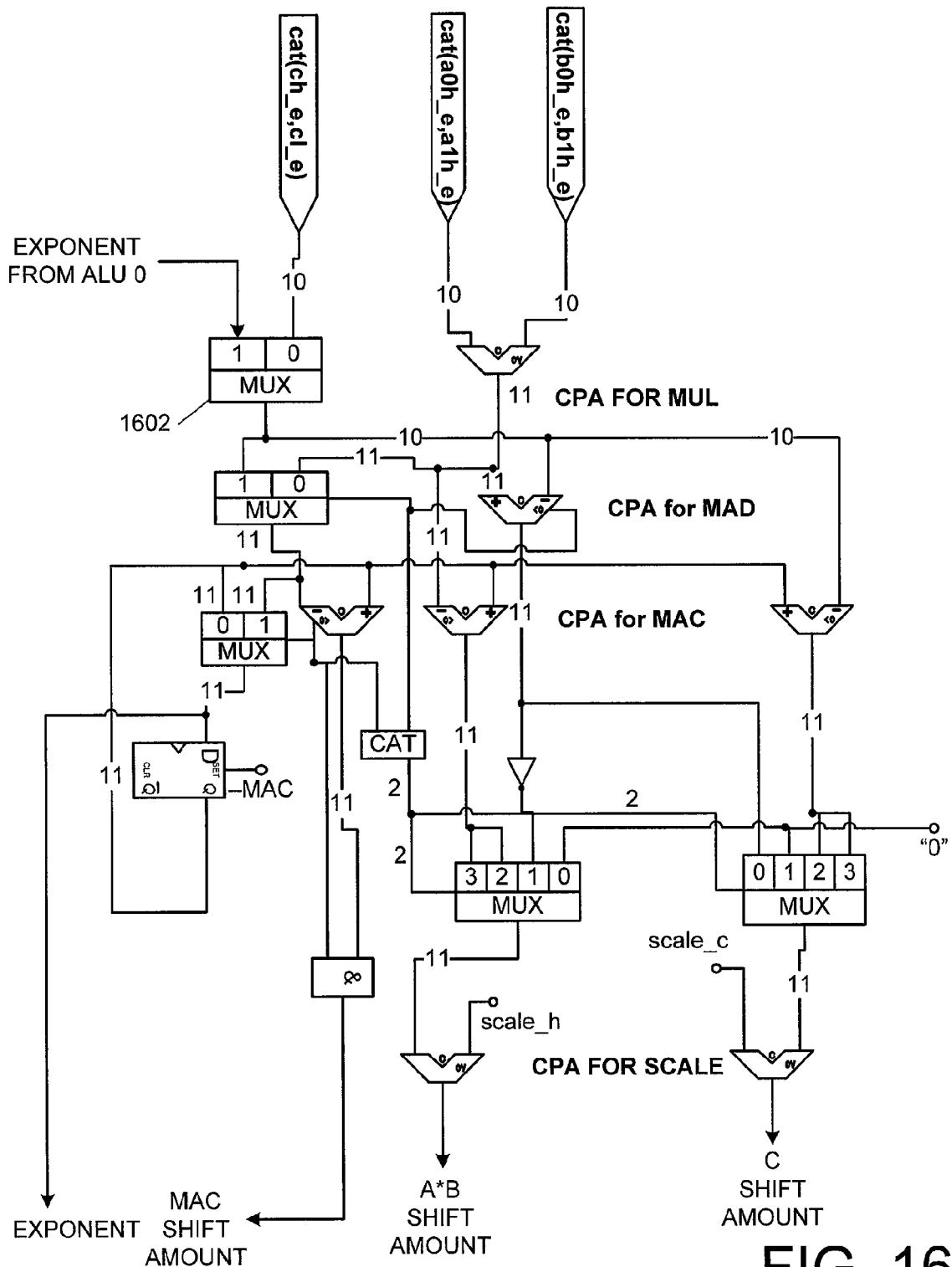

FIG. 16 is an exemplary diagram of a long exponent calculation, for a paired ALU, describing details of the long exponent calculation block from FIG.

Figure 17:
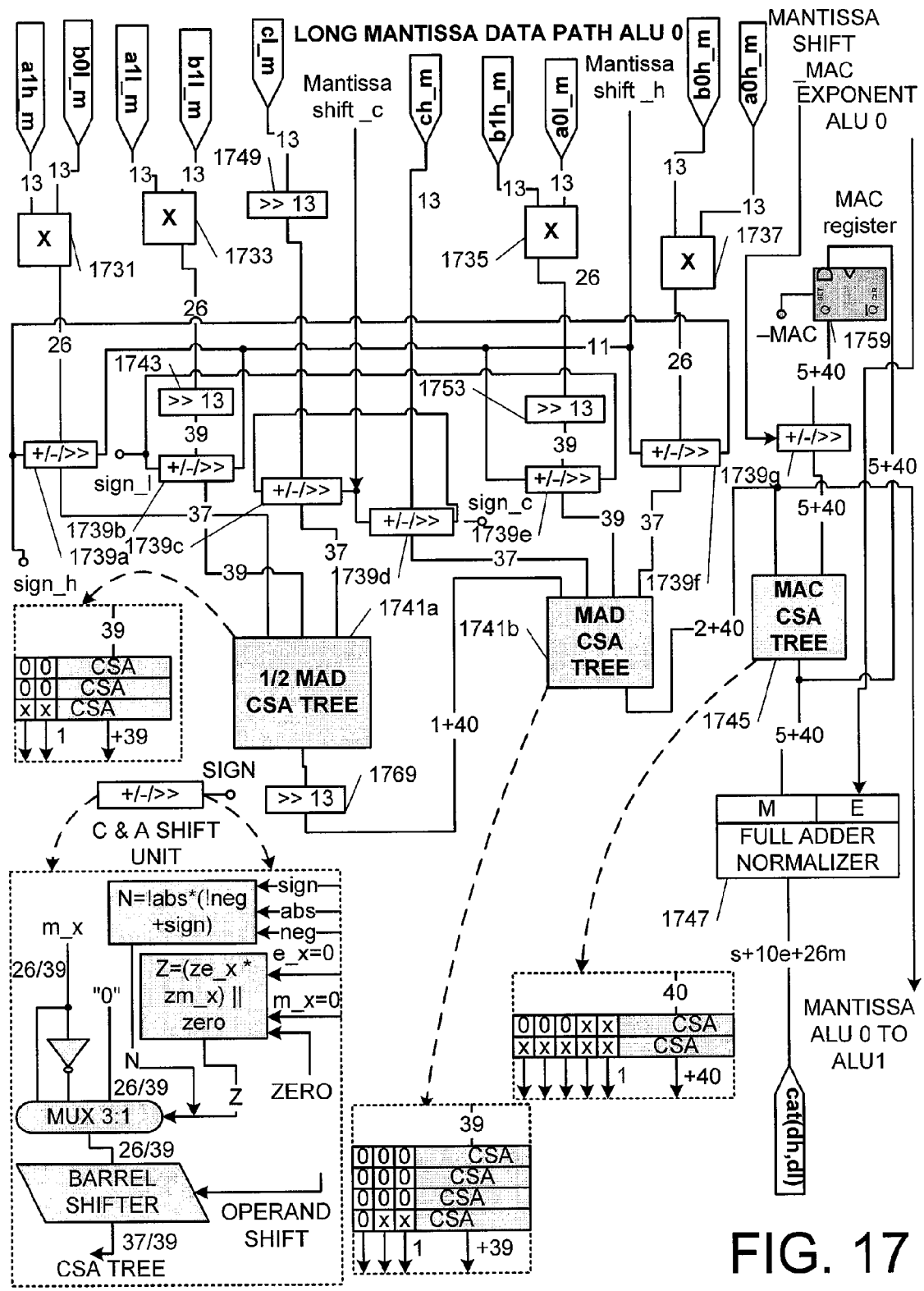

FIG. 17 is an exemplary diagram of a long mantissa data path, describing details of a data path illustrated in FIG. 11.

Figure 18:
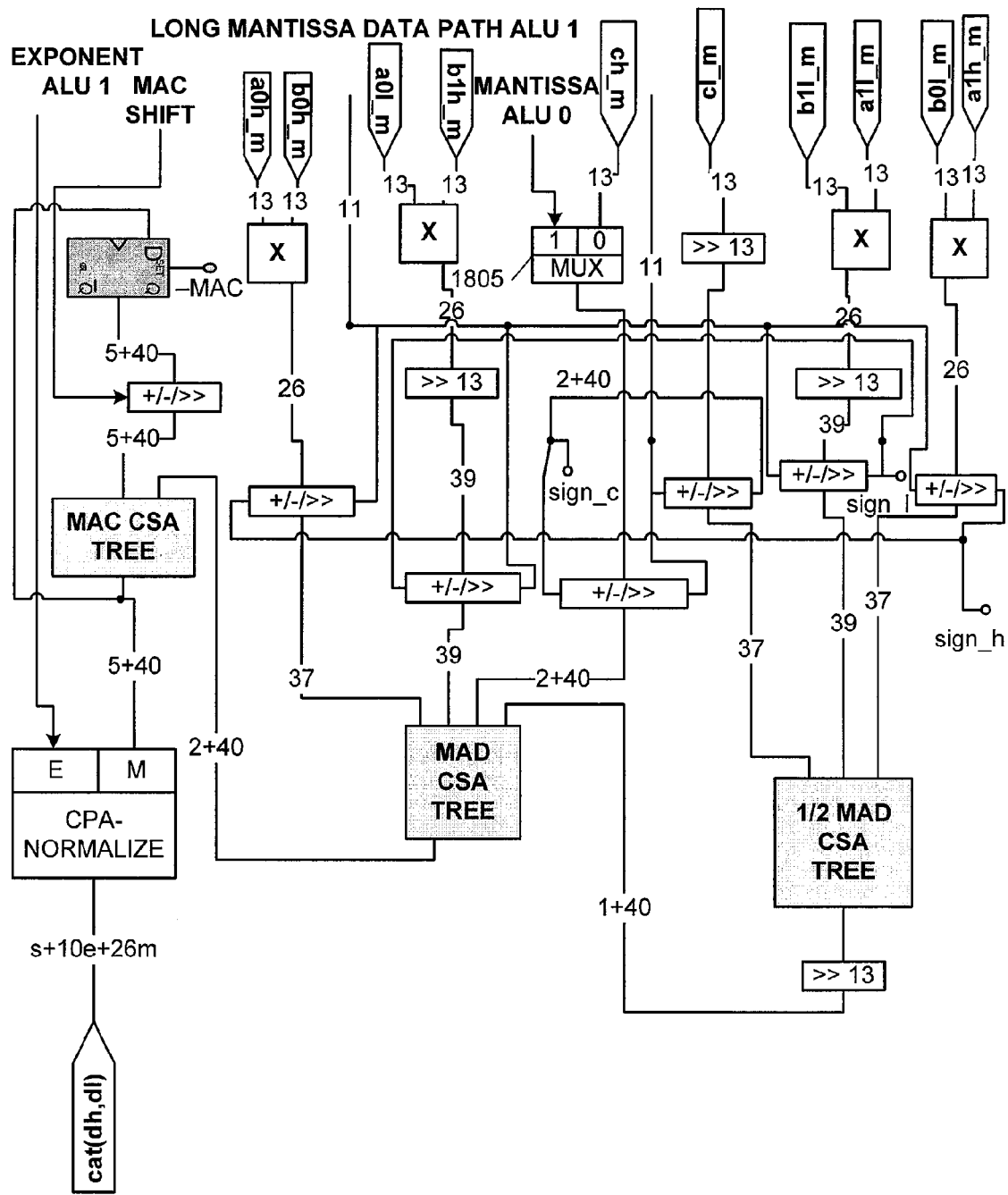

FIG. 18 is an exemplary diagram of a long mantissa data path for a paired ALU, similar to the data path illustrated in FIG. 11.

Figure 19:
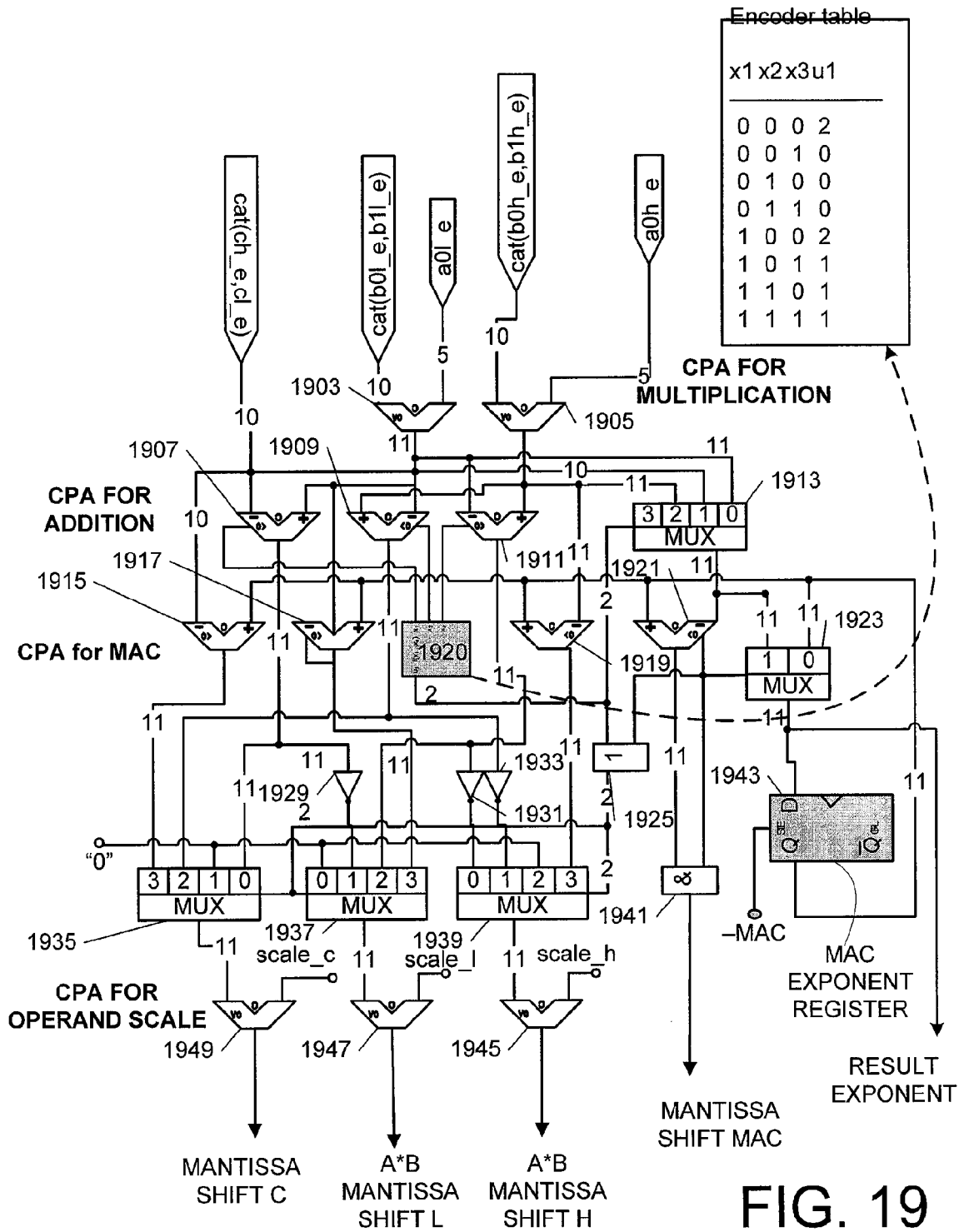

FIG. 19 is an exemplary diagram of a mixed exponent calculation, describing details of the mixed exponent calculation illustrated in FIG. 11.

Figure 20:
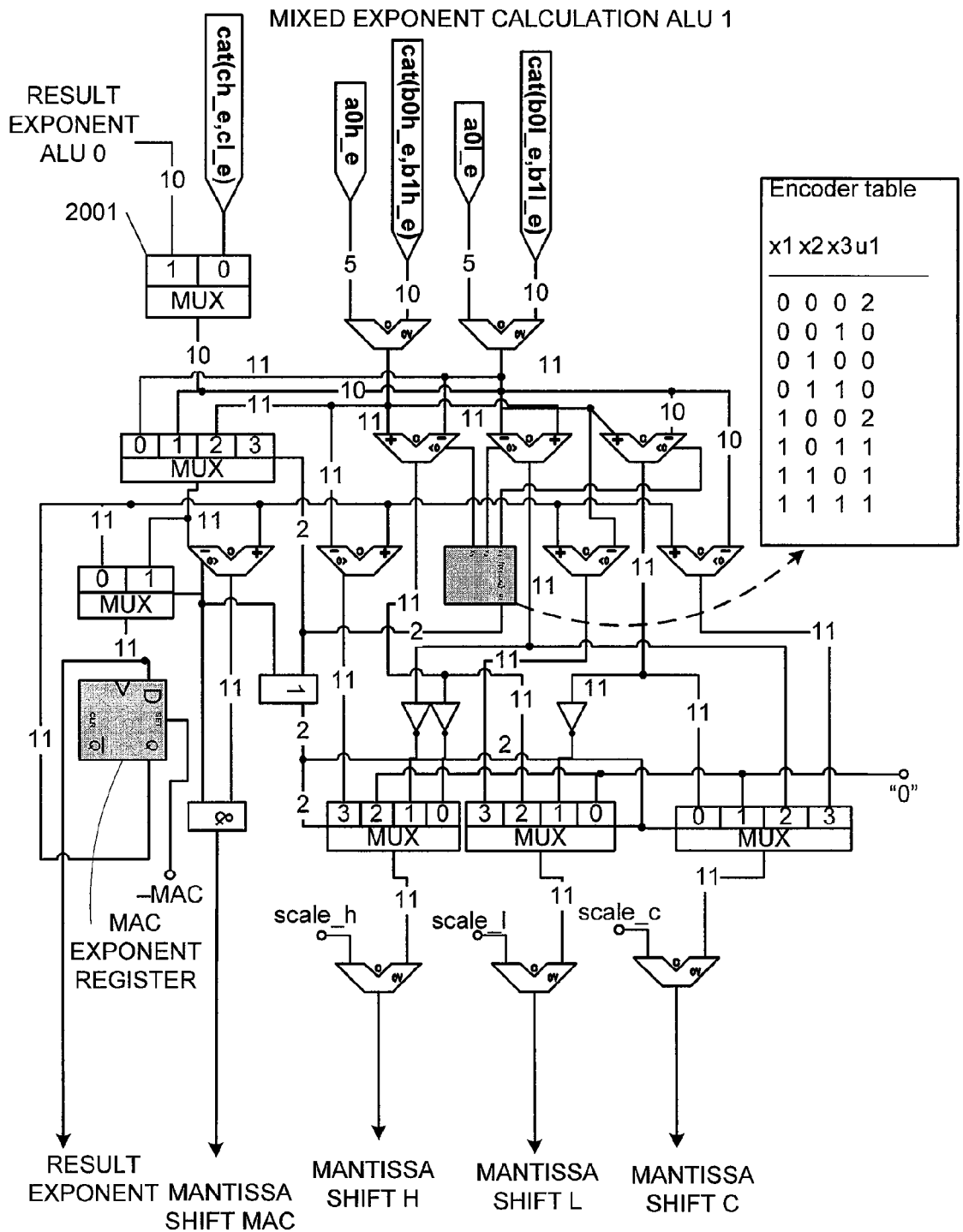

FIG. 20 is an exemplary diagram of a mixed exponent calculation for a paired ALU, similar to a mixed exponent calculation illustrated in FIG. 19.

Figure 21:
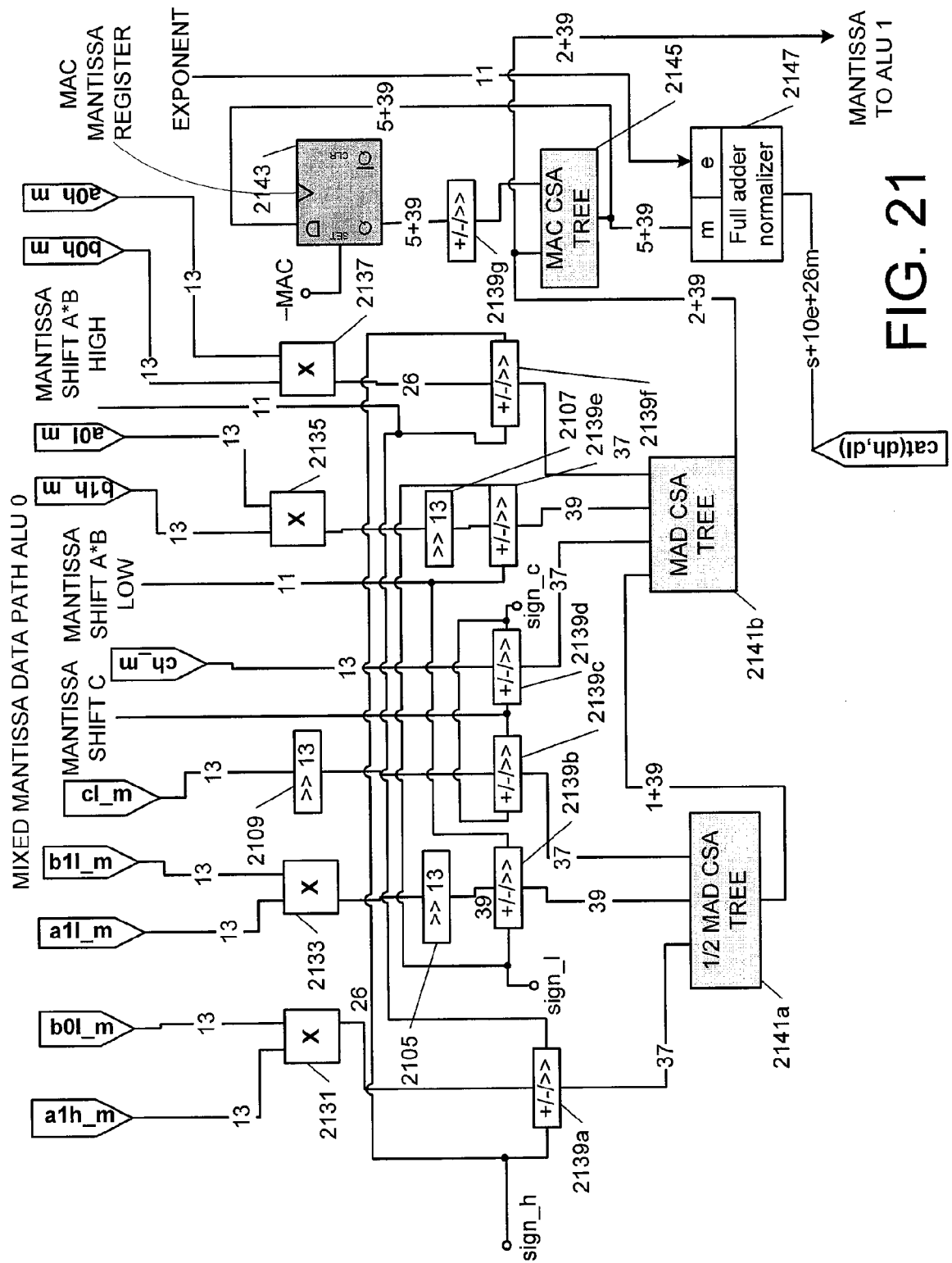

FIG. 21 is an exemplary diagram of a mixed mantissa data path, describing details of the data path illustrated in FIG. 11.

Figure 22:
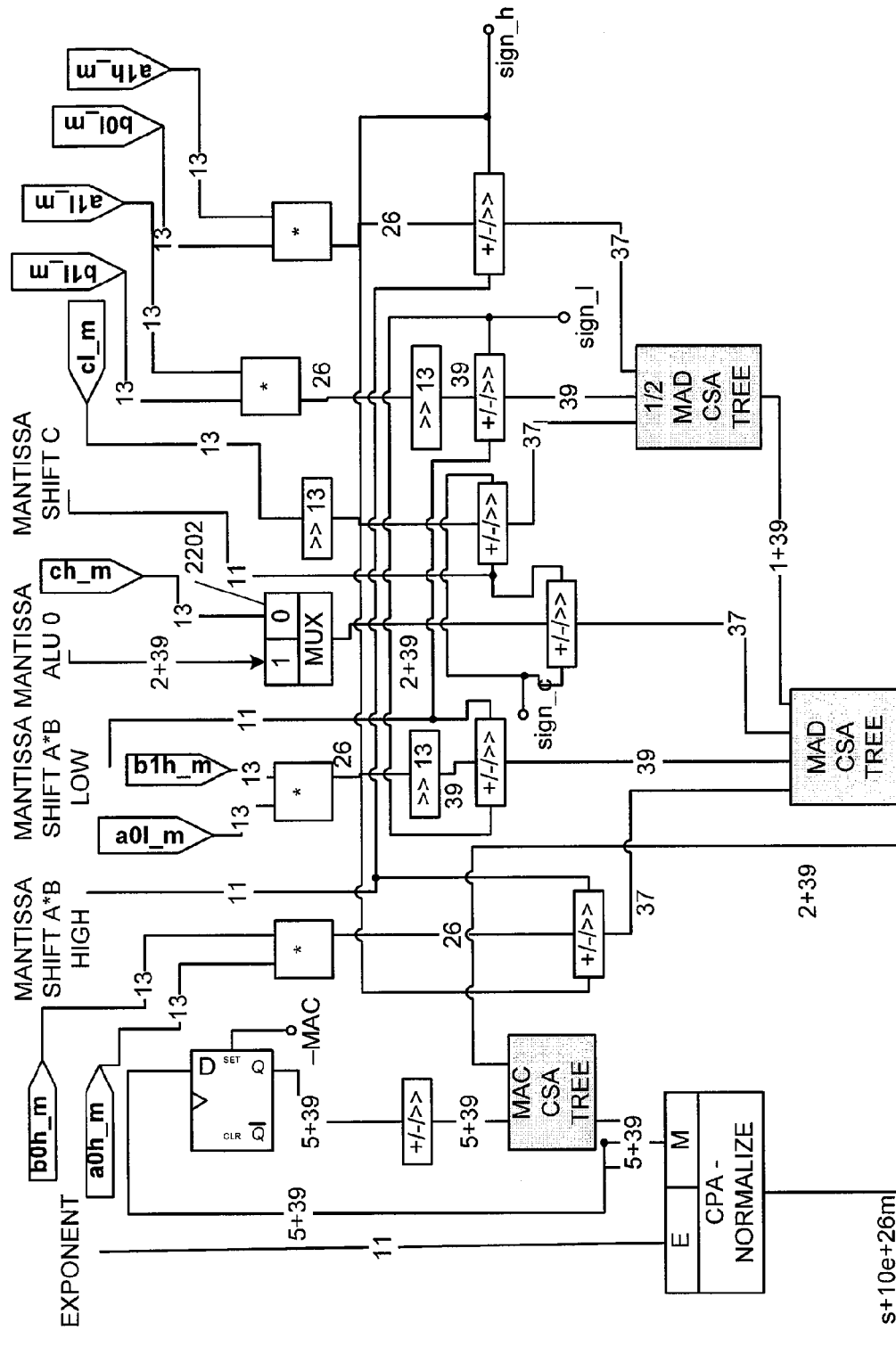

FIG. 22 is an exemplary diagram of a mixed mantissa data path for a paired ALU, similar to a data path illustrated in FIG. 21.

Figure 23:
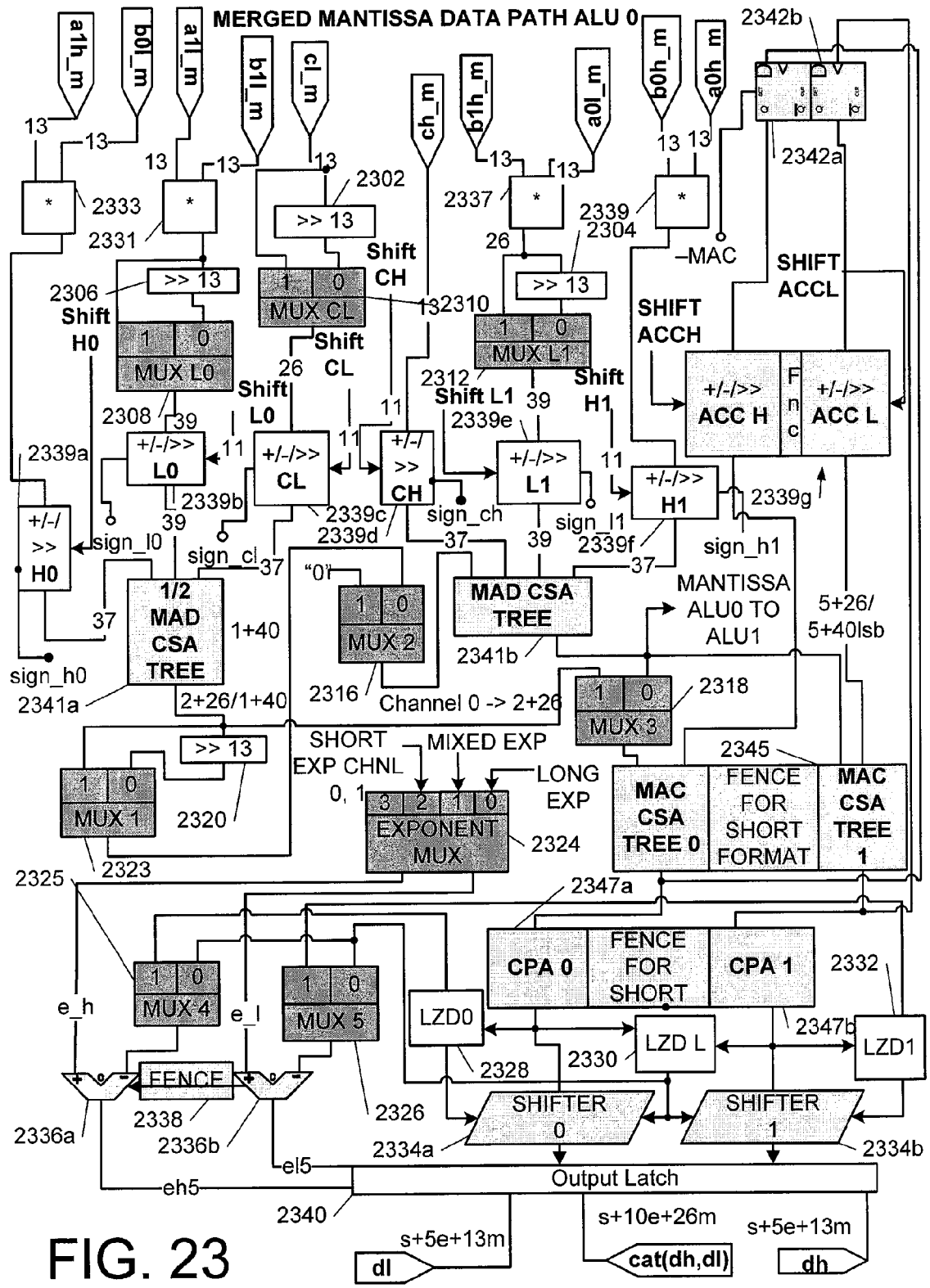

FIG. 23 is an exemplary diagram of a merged mantissa data path, which can process short and long data formats, describing details of a possible implementation of the data path illustrated in FIG. 11.

Figure 24:
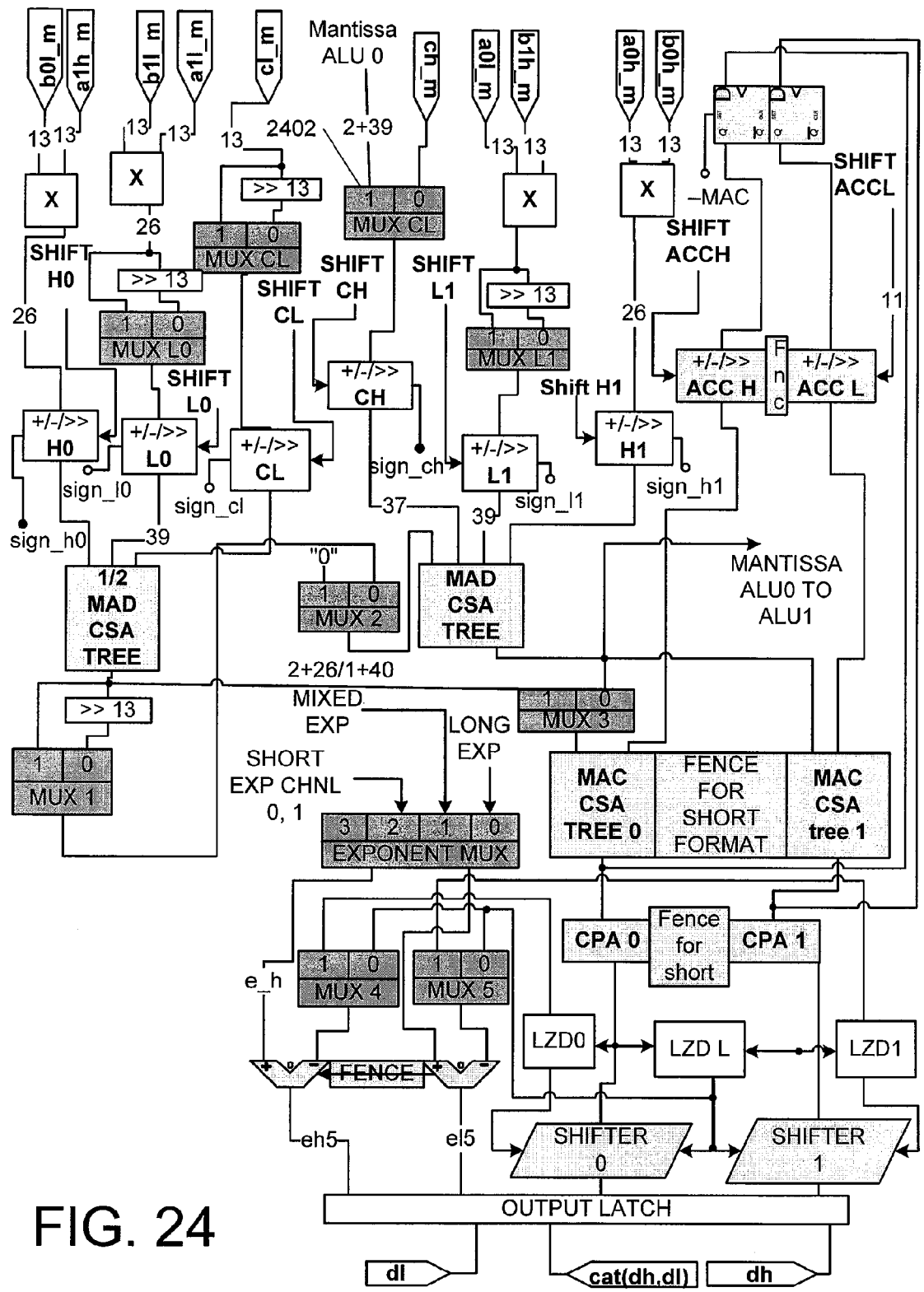

FIG. 24 is an exemplary diagram illustrating a merged mantissa data path, similar to a data path illustrated in FIG. 11.

Figure 25A:
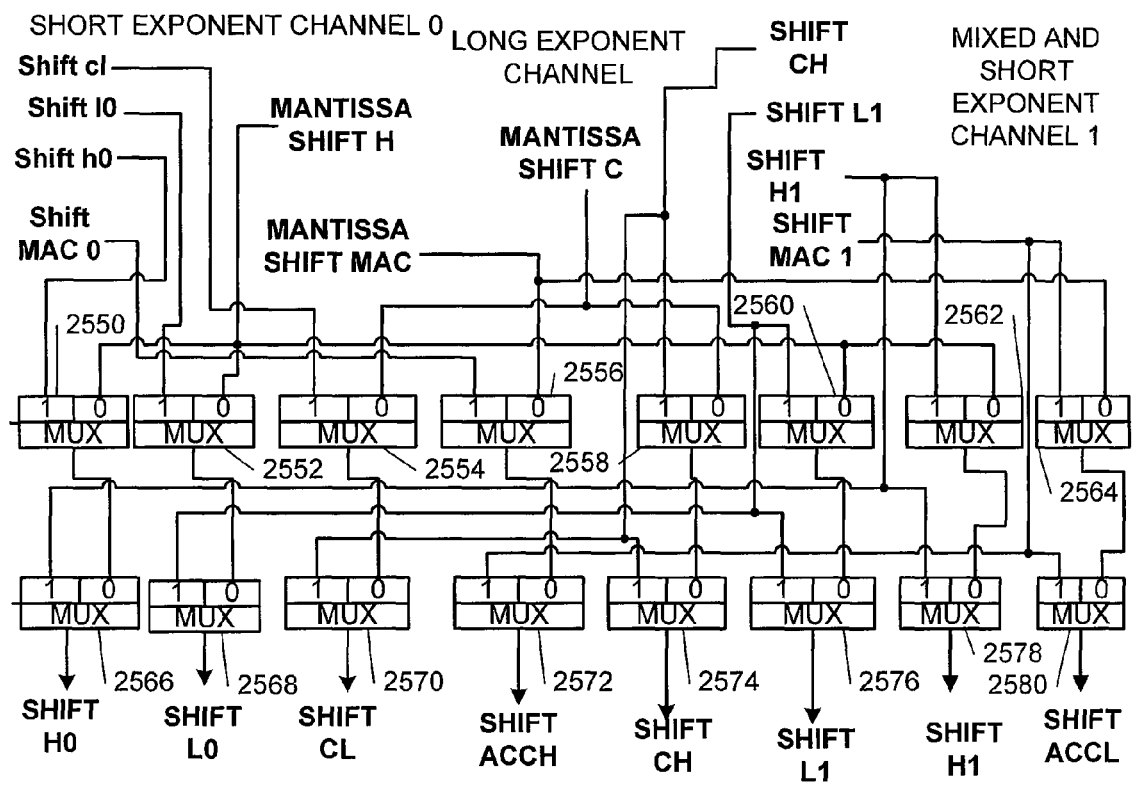

FIG. 25A is an exemplary diagram illustrating merged shift and control logic, which can be applied in the MACC from FIGS. 23 and 24.

Figure 25B:
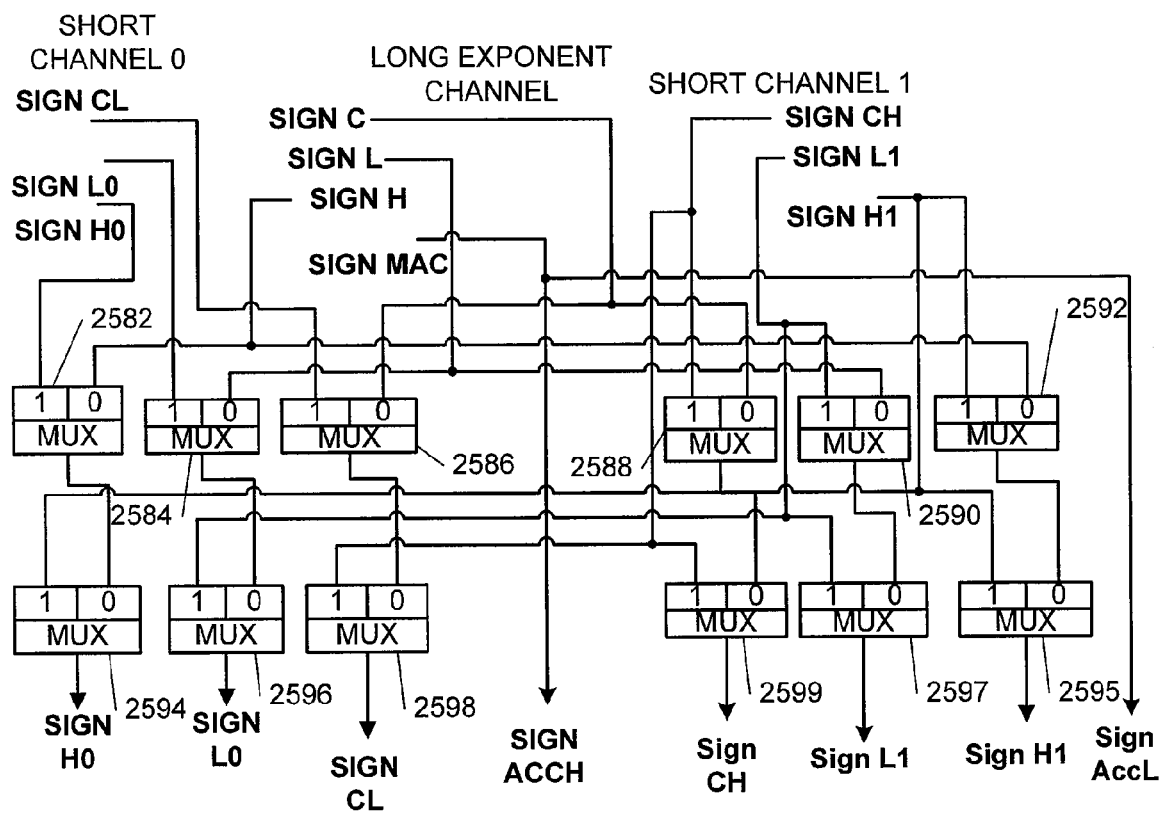

FIG. 25B is an exemplary diagram illustrating sign control logic, which can be applied in the MACC from FIGS. 23 and 24.

Figure 26:
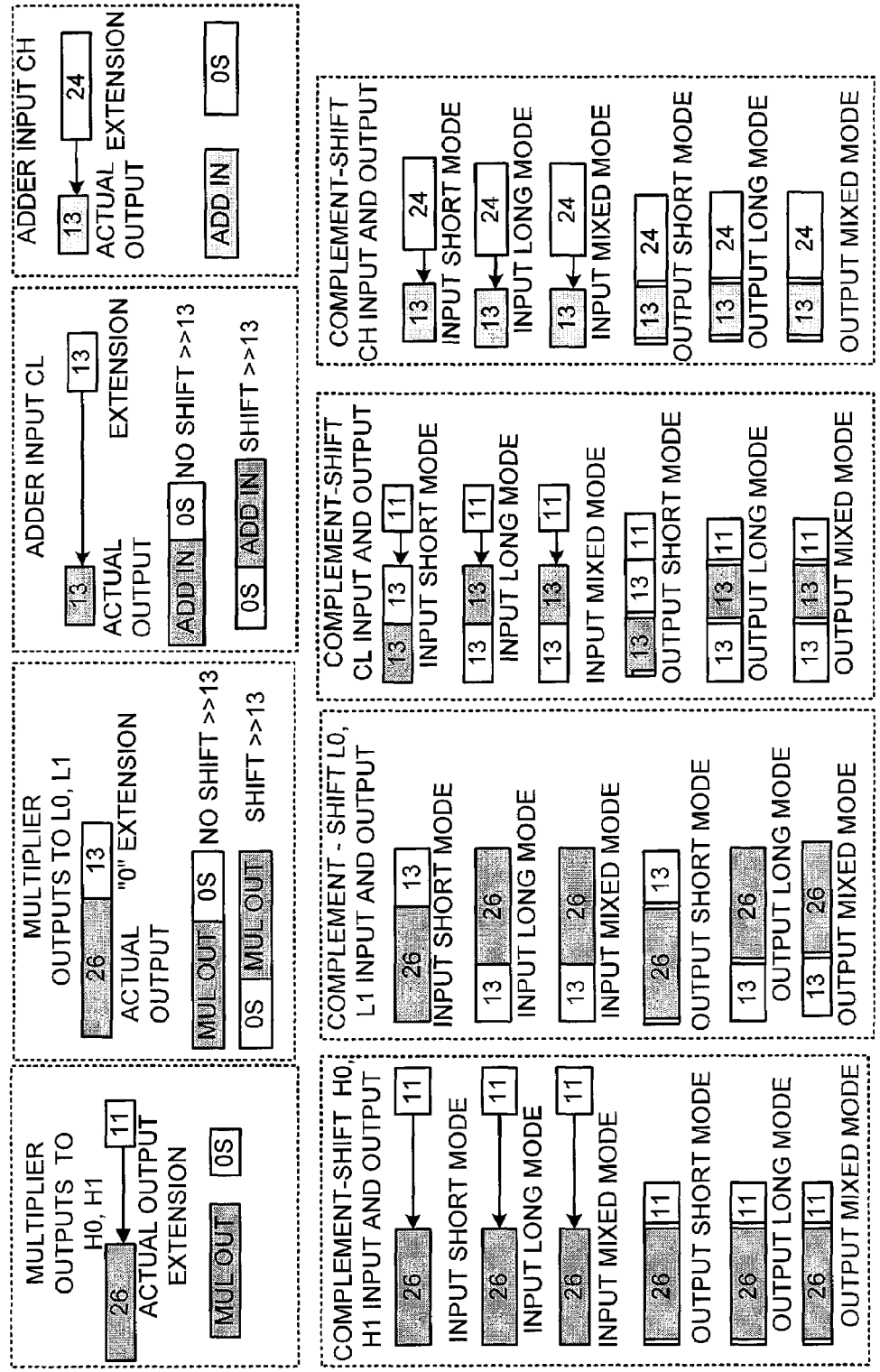

FIG. 26 is an exemplary table of complement shift input and output formats, which may be utilized in the MACC from FIG. 11.

Figure 27A:
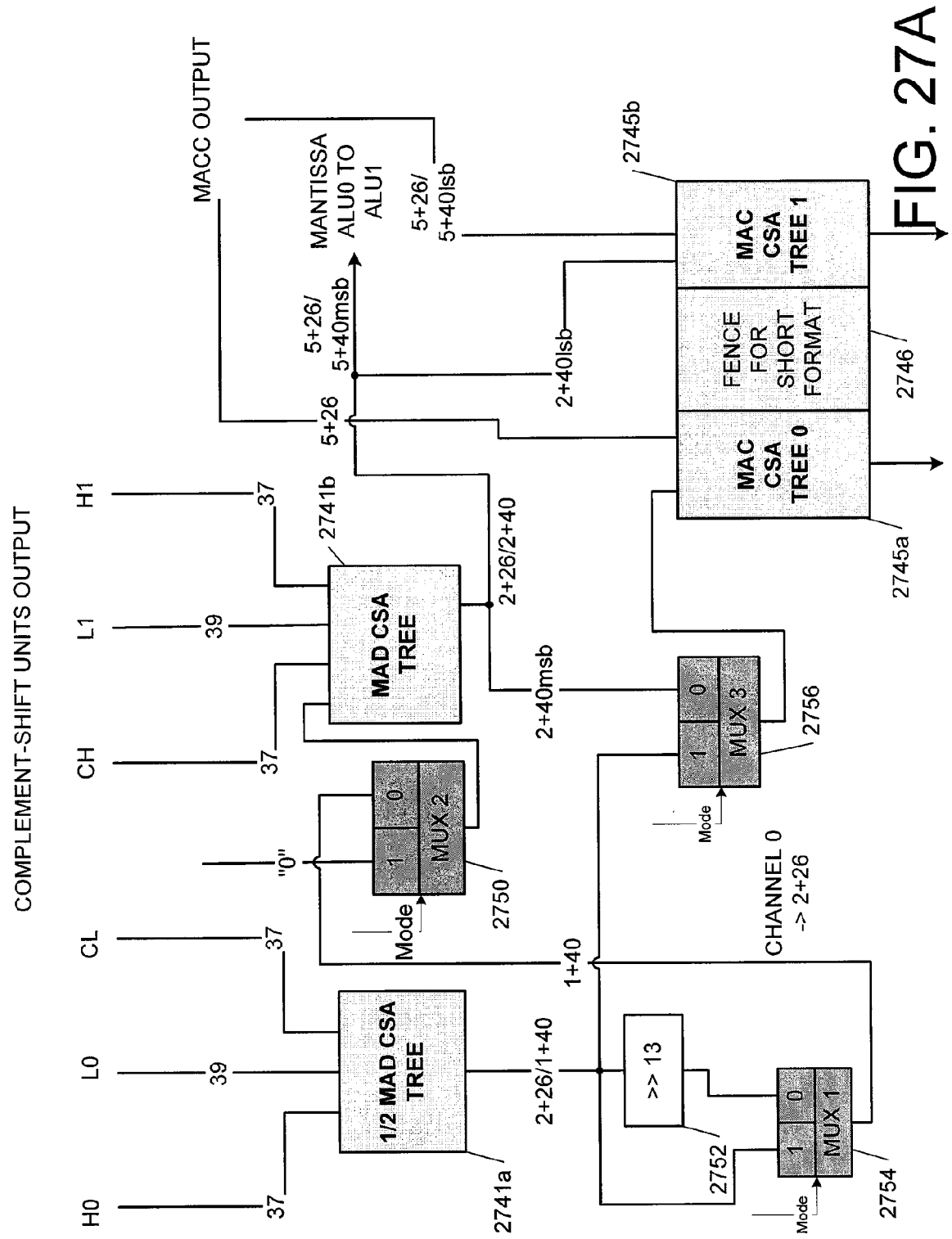

FIG. 27A is an exemplary diagram of a mantissa addition path, which can be utilized in the MACC from FIGS. 23 and 24.

FIG. 27B is an exemplary diagram of processing formats that can be utilized in the MAD carry save adder tree units from FIGS. 23 and 24.

FIG. 27C is a continuation of the processing formats from FIG. 27B.

FIG. 28A is an exemplary diagram of a fence implementation in a CSA adder, which may be utilized in the MACC from FIGS. 23 and 24.

FIG. 28B is an exemplary diagram of a fence implementation in a CPA adder, which may be utilized in the MACC from FIGS. 23 and 24.

Figure 29:
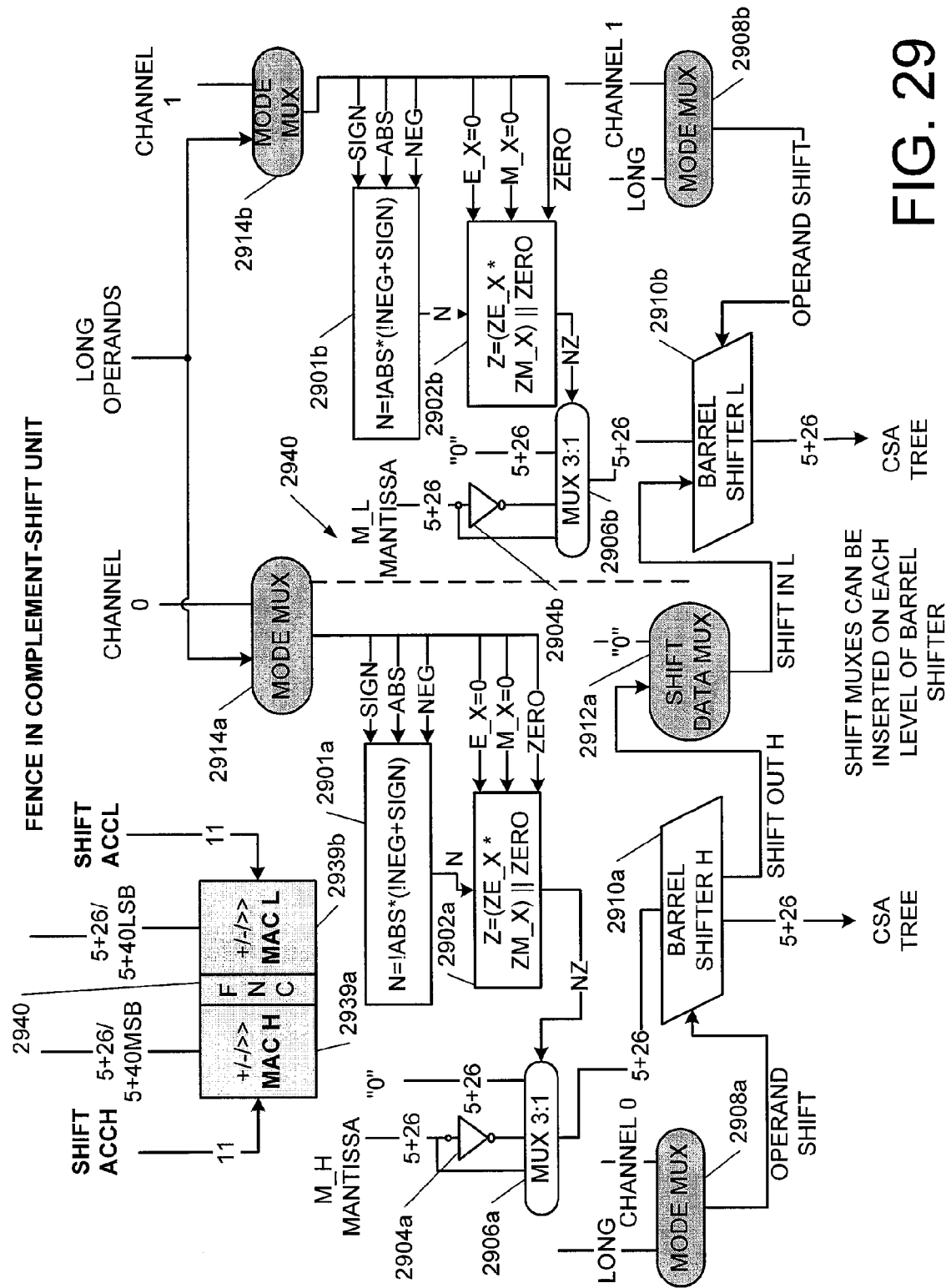

FIG. 29 is an exemplary diagram of a fence implementation in a complement shift unit, which may be utilized in the MACC from FIGS. 23 and 24.

Figure 30A:
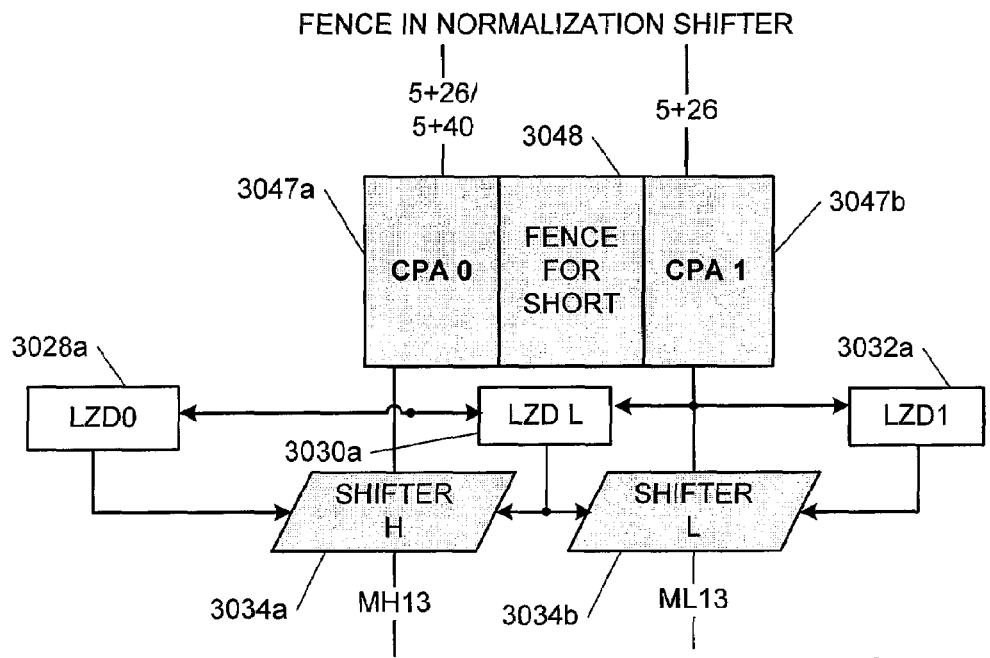

FIG. 30A is an exemplary fence in a normalization shifter, which may be utilized in the MACC from FIGS. 23 and 24.

Figure 30B:
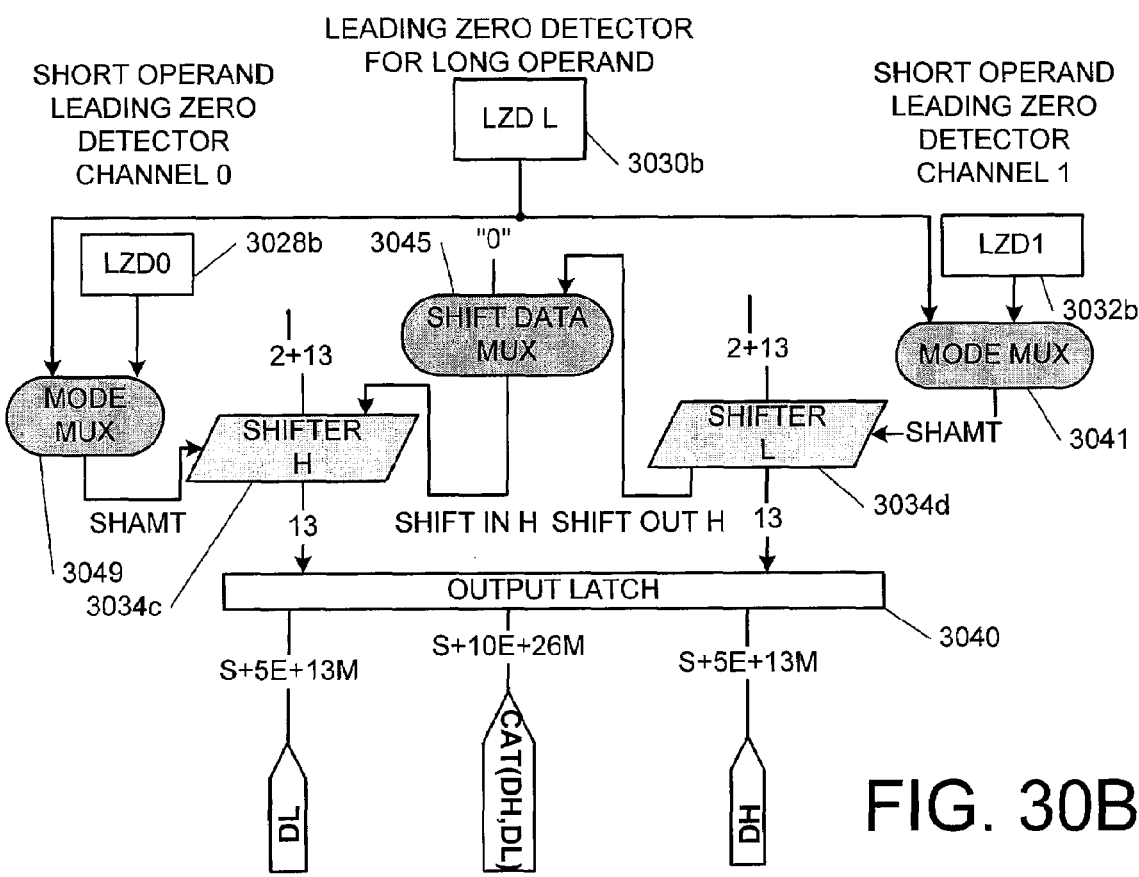

FIG. 30B is a more detailed view of the exemplary fence from FIG. 30A.

Figure 31:
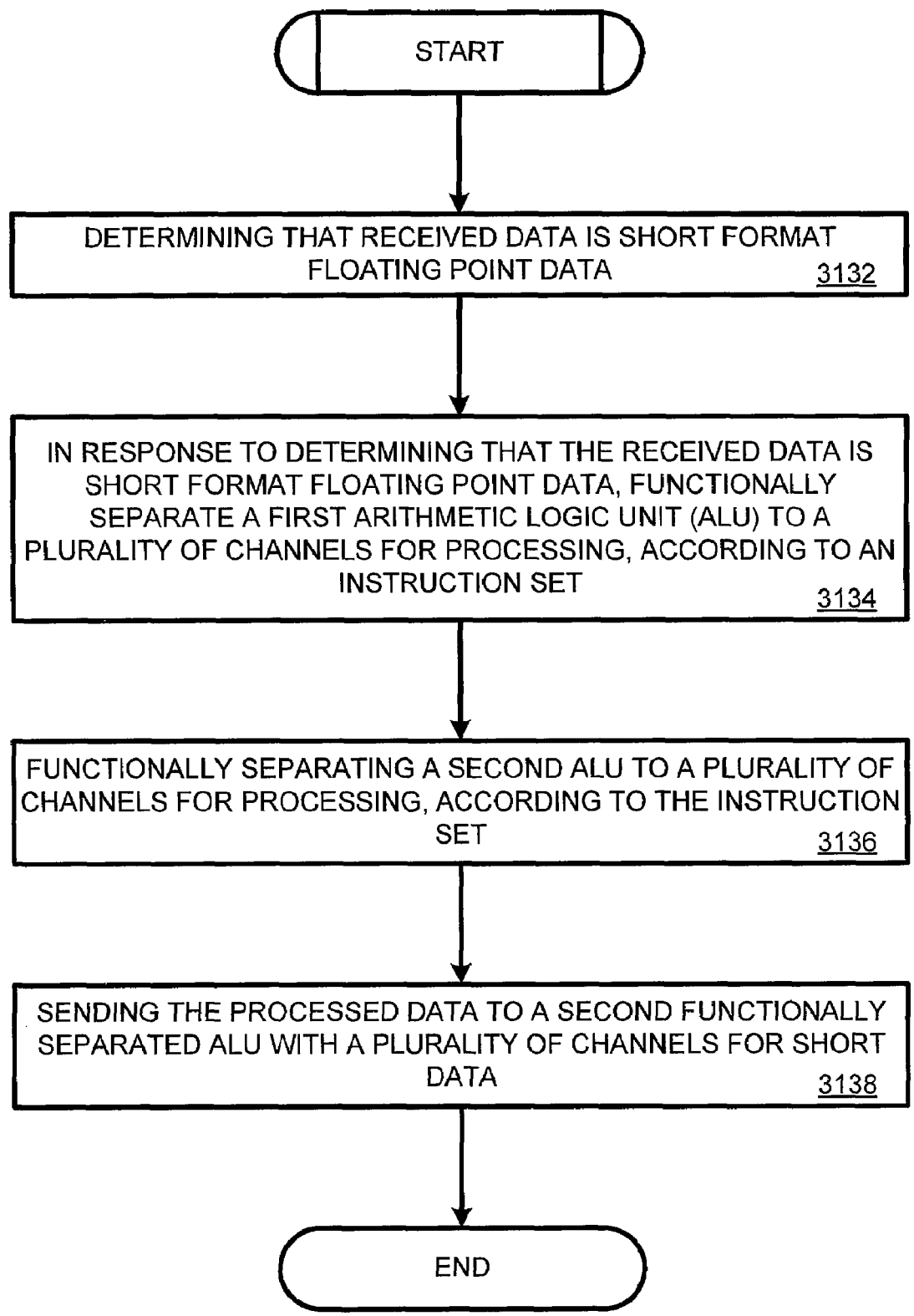

FIG. 31 is a flowchart illustrating an exemplary process that may be utilized for sending data to a functionally separated ALU.

DETAILED DESCRIPTION

FIG. 1A is a flowchart illustrating stream data processing steps that can be taken in an exemplary processing unit using a vector ALU combined with a special function unit. More specifically, the nonlimiting example of FIG. 1A illustrates a stream vector processing unit with a regular architecture 100. As illustrated, an input stream of 3-dimensional graphics data vectors are sent to an input buffer regular memory 102. The input buffer regular memory in this nonlimiting example communicates vector data to the vector arithmetic logic unit (ALU) 104. As illustrated with the sequential instruction cycles, each vector includes four components X, Y, Z, and W. As illustrated, as the vectors are being sent from the input buffer regular memory 102 to the vector ALU 104, the vectors are arranged with each vector being communicated together. The vector ALU 104 and Special Function Unit (SFU) 106 can perform the desired operation to produce outputs for each component of the current vector. An SFU can be configured to process various types of operations such as sine functions, cosine functions, square root functions, fractions, exponentials, etc.

FIG. 1B is a flowchart illustrating steps that can be taken in an exemplary scalar processing unit, similar to the steps illustrated in FIG. 1A. FIG. 1B illustrates a vector data processing using a stream processor with four scalar ALUs 124. More specifically, an input stream of 3-dimensional graphics data vectors is input into input data buffer 4-Bank orthogonal access memory 122. The memory illustrated in this nonlimiting example is configured to provide a vertical access pattern on the data read versus a horizontal access pattern on data write (memory input or output). Such type of memory has a special vector component multiplexor and address generators for one or more of the memory banks, as discussed in U.S. Patent application 20040172517, filed Sep. 19, 2003, which is hereby incorporated by reference in its entirety.

The input data buffer 4-bank orthogonal access memory 122 can then send the rearranged (vertical) vector data to scalar ALUs 124a-124d. More specifically, the input data buffer 4-bank orthogonal access memory sequentially sends the first vector data elements (W1, Z1, Y1, and X1) to scalar ALU 1 124a; sequentially sends second vector data elements (W2, Z2, Y2, and X2) to scalar ALU 2 124b; sequentially sends third vector data elements to scalar ALU 3 124c; and sequentially sends fourth vector data elements to scalar ALU 4 124d. The scalar ALUs 124a-124d and special function unit (SFU) 126 can process the vector data accordingly and send the processed data to buffers S1, S2, S3, and S4, respectively. The output buffers (S1-S4) then send the data to the output orthogonal converter 130, which can convert the received data into a horizontal vector format. More specifically, the orthogonal converter 130 can be configured to convert the processed data from a scalar sequential or vertical representation to a vector horizontal representation. The data can then be output as illustrated with Xout, Yout, Zout, and Wout.

One should note that while the vector processing unit with regular architecture 100 processes vector data one vector at a time, the vector data processing using stream processor with four scalar ALUs 120 does not have this requirement. As illustrated, vector component data can be processed in any order and subsequently rearranged for output. Additionally, while the data in both the vector data processing using stream processor with four scalar ALUs 120 and the vector processing unit with regular architecture 100 receive vector data as a data set, however this is not a requirement. Vector components can be received as scalars in any order and processed in an SIMD manner.

As was mentioned earlier, a SIMD stream processor can be configured to perform complex mathematical operations (special functions) such as square root, sine, cosine and others to provide graphics data processing in modern GPU. A vector ALU may have an attached (or otherwise accessible) SFU and the SFU may be configured to work every time when appropriate command arrives to ALU. This SFU may be considered as separate channel in this nonlimiting ALU.

FIG. 1C is an exemplary stream processing SIMD structure with software implementation of complex mathematical functions. In the situation with a SIMD scalar ALU, the special function implementation may have few options. FIG. 1C illustrates stream processing SIMD structure with software implementation of complex mathematical functions. Each ALU has special attached lookup table and slightly modified data path to perform special function calculation sequence described in special routine (for example Newton-Raphson algorithm for square root). Latency of special function calculation in this case will equal the number of instructions in each special function routine multiplied by SIMD scalar ALU instruction execution cycle time. One problem of such implementation is the latency that would be quite significant depending on number of instruction to be executed in each ALU.

FIG. 1D is an exemplary stream processing SIMD structure with hardware implementation of complex mathematical functions using private SFU for each ALU. As illustrated in FIG. 1D, another approach is to provide a private hardware special function unit for each scalar ALU. The nonlimiting example of FIG. 1D illustrates a stream processing SIMD structure with hardware implementation of complex mathematical functions using private SFU for each ALU. One problem with such implementation is excessive hardware, which (generally) is rarely used. Latency of a special function calculation is minimal and normally equal to average instruction execution cycle.

FIG. 1E is an exemplary stream processing SIMD structure with hardware implementation of complex mathematical functions using common SFU for all ALUs. As illustrated, one can reduce hardware overhead by using a common SFU hardware block that can process requests from multiple scalar ALUs. FIG. 1E illustrates stream processing SIMD structure with hardware implementation of complex mathematical functions using common SFU for all ALUs. One problem of such implementation is significant stall time for all scalar ALUs while the SFU sequentially process requests from all ALUs and calculates values for all streams. One should note that in such SIMD structure all requests to the SFU appear at the same time. Generally speaking, all the ALUs will wait until last ALU receives a value from the SFU. The overall latency on such operation is equal to SFU processing cycle multiplied by number of scalar ALUs combined with this SFU.

FIG. 1F is an exemplary stream processing SIMD structure with implementation of complex mathematical functions using a common SFU with interleaved access to common SFU. The SFU latency for each stream can be reduced using interleaved access to SFU from scalar ALUs. More specifically, the nonlimiting example of FIG. 1F illustrates a proposed embodiment of a stream processing SIMD structure with common SFU. In this configuration, requests from different scalar ALUs are separated in time using special delay registers, which reschedule same SIMD instruction execution in different ALUs. Latency for each stream will be equal to latency of private SFU, the rest of the latency compare to previous structure will be compensated by delay registers.

Another problem which affects SIMD scalar stream processor efficiency is SIMD factor when processing different types of input streams. These streams may contain vertex, triangle, and/or pixel data and accumulation of required input data in the storage may create significant delays as well as increases the time of data life span in local memory.

FIG. 1G is an exemplary illustration of an SIMD factor reduction in the case of a common SIMD structure for both vertex and triangle processing. As illustrated, the nonlimiting example of FIG. 1G illustrates vertex and triangle stream processing on the same SIMD structure with factor 4 when four ALUs process the stream data. The vertex packet to be processed contains data for four vertices. The triangle packet to be processed contains data for 12 vertices and time overhead for accumulation of complete packet may create significant delay on start of triangle processing. This is why a reduction of SIMD factor from 4 to 2 or 1 in same structure with 4 ALUs for triangle processing tasks becomes important issue in modern GPUs.

FIG. 2A is a flowchart illustrating steps that can be taken in an exemplary processing unit, similar to the flowchart from FIG. 1, with an SIMD factor 4. As indicated, FIG. 2A relates to vector stream data processing with scalar ALUs, having an SIMD factor of 4 and a long data format. Similar to the data flow of FIG. 1B, vector data is not constrained to flow as a data set. As each data component reaches the respective ALU (ALU0 204*a*, ALU1 204*b*, ALU2 204*c*, AND ALU3 204*d*), that ALU can process the data accordingly to an ALU command delivered synchronously with delay of data delivery. Additionally, as illustrated, data is received at ALU0 204*a* prior to data being received at ALU1 204*b*. Similarly, ALU2 204*c* is delayed when compared to ALU1 204*b*. ALU3 204*d* is delayed when compared to ALU2 204*c*. After the data is processed, the processed data is sent to output buffers S1, S2, S3, and S4, with synchronization delay, respectively.

One should also note that the nonlimiting example illustrated in FIG. 2A is associated with an SIMD factor of 4 because there are four ALUs that perform substantially the same operation. Additionally, as the nonlimiting example of FIG. 2A illustrates, each ALU is configured to process long format 36 bit data.

FIG. 2B is a flowchart illustrating steps that can be taken in an exemplary processing unit, similar to the flowchart from FIG. 1, with an SIMD factor 1, which is a result of folding results of 4 ALUs to one ALU3. As indicated, FIG. 2B illustrates vector stream data processing with scalar ALUs and an SIMD factor of 1 in long format. While the configuration in FIG. 2A illustrates that vector data is sent to the ALUs in a manner that not consistent with a vector elements data set, the configuration of FIG. 2B illustrates the vector data being communicated to the ALUs as a vector data set. More specifically, FIG. 2B illustrates that data X1 is sent to ALU0. ALU0 can process the data and send at least a portion of the result to ALU1, while also sending output data to component shuffle 226. ALU1, which is delayed from ALU0 receives data Y1 and data from ALU0. ALU1 then sends output data to component shuffle 226 and data to ALU2. ALU2 receives Z1 and data from ALU1. ALU2 then sends output data to component shuffle and data to ALU3. ALU3 receives data W1 and data from ALU2. ALU3 sends output data to component shuffle 226. Component shuffle 226 can send data to one or more of the following outputs: Xout, Yout, Zout, and Wout. As a nonlimiting example, if such operation is a vector dot product, such mode may be desired to process data with a small number of streams, such as triangles versus vertex packets in a fewer number of clock cycles.

One should note that the configuration of FIG. 2B is associated with an SIMD factor of 1 due to the fact that each of the ALUs are performing the same command with a different number of operands. More specifically, because each ALU receives data from the previous ALU, the ALUs are performing different operations depending on the position of the ALU. As a nonlimiting example, in the case of a dot product command, embodiments of the ALU will have the following functionality:

ALU0: D0=A0*B0+0, which implements X1*X2

ALU1: D1=A1*B1+D0, which implements Y1*Y2+X1*X2

ALU2: D2=A2*B2+D1, which implements Z1*Z2+Y1*Y2+X1*X2

ALU3: D3=A3*B3+D2, which implements W1*W2+Z1*Z2+Y1*Y2+X1*X2

Actual results can be in the output of ALU3 and may be shuffled to any vector position for later use. Additionally, as illustrated in FIG. 2A, the configuration of FIG. 2B processes 36 bit (long format) data in each of the ALUs.

FIG. 2C is a flowchart illustrating steps that can be taken in an exemplary scalar processing unit, similar to the flowchart from FIG. 2A, with an SIMD factor 8. The scalar processing unit in this nonlimiting example includes the same number of ALUs as in FIG. 2A, however, in FIG. 2C, each ALU is split to process two streams of short format data (e.g., 18-bit components instead of 36-bit components). As indicated, FIG. 2C includes vector stream data processing with scalar ALUs that is associated with an SIMD factor of 8 in short format. This means that one can process 8 sets of input data and produce 8 results based on the same command sent to the ALUs with respective delays. More specifically, the vector data can take the form of 18 bit (short format) as opposed to the 36 bit data (long format) discussed above. More specifically, the W1 vector component from previous nonlimiting examples now takes the form of two separate components W1.0 and W1.1, each of which is a short format component. Similarly, X, Y, and Z, as well as the other data sets 2, 3, and 4 are also represented in a short format. Additionally, as also illustrated FIG. 2B, data input into the ALUs does not necessarily correlate to a vector element data set. More specifically, the ALUs are not constrained to process vector data sets, as the data input into each ALU need not be related.

Also included in this nonlimiting example are a plurality of divided or split ALUs that can be configured to process short data more efficiently. More specifically, data X1.0 is input into the left side of ALU0, which has been designated ALU0.0. The right side of ALU0, designated ALU0.1 receives data X1.1. The data sent to ALU0.0 and ALU0.1 is processed and sent to output buffers S1.0 and S1.1, respectively. Similarly, data X2.0 and X2.1 are sent to the left side of ALU1 (ALU1.0) and the right side of ALU1 (ALU1.1), respectively. As illustrated, there is a delay in the processing of data in ALU1.0 and ALU1.1, when compared with the processing of ALU0.0 and ALU0.1. Once the data is processed, the ALU1.0 and ALU1.1 send the output data to output buffers S2.0 and S2.1, respectively.

In similar fashion, ALU2.0 and ALU2.1 receive data X3.0 and X3.1, respectively. After processing the received data, ALU2.0 and ALU2.1 send the output data to output buffers S3.0 and S3.1, respectively. In addition, the processing of data in ALU2.0 and ALU2.1 is delayed from the processing of the previous ALUs discussed. As with the previous operations, ALU3.0 and ALU3.1 receives data X4.0 and X4.1 respectively. ALU3.0 and ALU3.1 process the receive data (delayed from that of ALU2.0 and ALU2.1) and send the output data to output buffers S4.0 and S4.1, respectively.

Because all eight ALUs (which can physically take the form of four dual channel ALUs, each logically divided in half) are executing the same command, the SIMD factor of the nonlimiting example of FIG. 2C is 8. Additionally, the ALUs in FIG. 2C can be configured to receive and process 18-bit (short format) data, as well as 36-bit (long format) data.

FIG. 2D is a flowchart illustrating steps that can be taken in an exemplary processing unit, similar to the flowchart from FIG. 2A, with an SIMD factor 4. As indicated, FIG. 2D includes vector stream data processing with scalar ALUs that are associated with an SIMD factor 4 in short format. As illustrated, the data input into the ALUs is similar to that of FIG. 2C, which may or may not be organized according to a data set. Additionally, as in the previous nonlimiting example, data X0.0 is input into ALU0.0 and data X0.1. However, in this nonlimiting example, ALU0.1 is slightly delayed when compared with ALU0.0 and uses a result of ALU0.0. Additionally, ALU0.1 receives input data not only from X1.1, but also from the output of ALU0.0. Similarly, ALU1.0 receives data X2.0, processes the received data, and outputs the processed data to ALU1.1. ALU1.1 receives the output data from ALU1.0 and also receives data X2.1. ALU1.1 processes the received data and outputs the processed data to output buffer S2.1. ALU2.0 receives data X3.0, processes the received data, and outputs the result to ALU2.1. ALU2.1 receives the output data from ALU2.0 as well as the data X3.1. ALU 2.1 processes the received data and outputs the result to output buffer S3.1. ALU3.0 receives input data X4.0. ALU3.0 processes the received data and outputs the processed data to ALU3.1. ALU3.1 receives the output from ALU3.0 as well as data X4.1. ALU3.1 processes the received data and sends the processed data to S4.1.

Embodiments of such ALUs are configured with the following functionality:

ALU0.0: d0.0=a0.0*b0.0+0
ALU0.1: d0.1=a0.1*b0.1+d0.0
ALU1.0: d1.0=a1.0*b1.0+0
ALU1.1: d1.1=a1.1*b1.1+d0.0
ALU2.0: d2.0=a2.0*b2.0+0
ALU2.1: d2.1=a2.1*b2.1+d2.0
ALU3.0: d3.0=a3.0*b3.0+0
ALU3.1: d3.1=a3.1*b3.1+d3.0

As there are eight ALUs processing data and only four are outputting a result, the logic of FIG. 2D is associated with a SIMD factor of four. Additionally, as ALU0.0 sends data to ALU0.1, ALU0.1 is associated with a slight delay in processing when compared with ALU0.0. ALU0.1 can wait for ALU0.0 to process the data X1.0 and then receive the output from ALU0.0. At this point, ALU0.1 can process the received output from ALU0.0 as well as data X1.1. A similar delay and process is also executed for the remaining ALUs.

FIG. 3 is an exemplary logical structure of paired scalar ALUs with dual format processing capabilities, illustrating processing characteristics from FIGS. 1 and 2A-2D. More specifically, FIG. 3 includes embodiments of a stream processor configured to process data in any of a plurality of different formats. At least one embodiment includes a first scalar arithmetic logic unit (ALU), configured to process a first plurality of sets of short format floating point data in response to a received short format control signal from an instruction set and process a first set of long format floating point data in response to a received long format control signal from the instruction set. Additionally, some embodiments include a second arithmetic logic unit (ALU), configured to process a second plurality of sets of short format floating point data in response to a received short format control signal from the instruction set, process a second set of long format floating point data in response to a received long format control signal from the instruction set, receive the processed data from the first arithmetic logic unit (ALU), and process the input data and the processed data from the first ALU according to a control signal from the instruction set. Some embodiments include a special function unit (SFU) configured to provide additional computational functionality to the first ALU and the second ALU. Further, some embodiments are configured such that wherein, in response to receiving short format data, the stream processor is configured to functionally divide at least one pair of the ALUs to facilitate dual format processing with a variable Single Instruction Multiple Data (SIMD) factor for short formats and for long formats. Some embodiments are configured wherein the instruction set includes at least one instruction to process in at least one of the following modes: a short format operand mode, a long format operand mode, and a mixed format operand mode. Some embodiments are configured wherein the instruction set is configured to control variable SIMD folding mode, when output data of the first ALU is sent as an operand to the second ALU in long format mode and wherein the output of one channel of the first ALU is sent as an operand to the second channel of the first ALU in a short format mode.

More specifically, the two ALUs 310, 320 of FIG. 3 may be configured operate in long and short data format with SIMD factor 2 and 4, respectively. The depicted structure illustrates data paths, which includes sectional multipliers and adders combined with sectional Multiply Accumulate (MACC) registers capable to process short and long data. In this nonlimiting example, data from an SFU is received at the accumulator registers of ALU0 and ALU1 (block 370). Coupled to the accumulator is a cache memory data in module 372, as well as an ALU port P0 376. The ALU port P0 can be configured to process 72 bits in four segments. Coupled to the cache memory data in 372 is an ALU port P1 378. Similar to the ALU port P0 376, the ALU port P1 378 is also configured to process 72 bits of data in four 18 bit segments. Coupled to the ALU port P1 is an ALU port P2, configured to process 72 bits in four 18 bit segments.

Coupled to ALU port P0, ALU port P1, and ALU port P2 is ALU0 310, which includes an input multiplexor 382*a* and an input multiplexor 384*a*. The input multiplexor 382*a* includes output ports CH, A1H, B0L, A1L, and B1L, while the input multiplexor 384*a* includes output ports A0H, B0H, A0L, B1H and CL. The output CH is coupled to adder 396*a* while the outputs A1H and B0L are coupled to multiplier 386*a*. Multiplier 386*a* is also coupled to adder 396*a*. Outputs A1L and B1L are coupled to multiplier 388*a*, which is coupled to 13 bit shifter 371*a*, which is coupled to adder 396*a*.

From input multiplexor 384*a*, outputs A0H and B0H are coupled to multiplier 392*a*. Multiplier 392*a* is then coupled to adder 399*a*. Outputs A0L and B1H are coupled to multiplier 390*a*, which is coupled to 13 bit shifter 373*a*, which is then coupled to adder 399*a*. Output CL is coupled to 399*a*. Adders 396*a* and 399*a* are coupled together via 13-bit shifter and enable component 398*a*. A multiply accumulate units (MACC) 394*a* and 397*a* are also coupled to adders 396*a*, and 399*a*, respectively. The output of adders 396*a* and 399*a* are coupled to low output DL and high output DH, respectively.

ALU port P0 376, ALU port P1 378 and ALU port P2 380 are also coupled to ALU1 320 via delay registers 383. Delay registers 383 are coupled to input multiplexors 382*b* and 384*b*. Input multiplexor 382*b* includes output CH, which is coupled to adder 396*b*. Outputs A1H and B0L are coupled to multiplier 386*b*, which is coupled to adder 396*b*. Outputs A1L and B1L are coupled to multiplier 388b, which is coupled to 13 bit shifter 371b, which is then coupled to adder 396b.

Outputs to input multiplexor 384b includes A0H and B0H, which are coupled to multiplier 392b. Multiplier 392b is then coupled to adder 399b. Outputs A0L and B1H are coupled to multiplier 390b, which is coupled to 13 bit shifter 377b, which is then coupled to adder 399b. Output CL is coupled to adder 399b. Adders 396b and 399b are coupled via shifter and enable component 398b. Also coupled to adders 396b and 399b are MACC 394b and 397b. Adder 396b is coupled to low output DL, while adder 399b is coupled to high output DH. Also included in this nonlimiting example is a bypass component 395 outputting CL data component 393, which are coupled between ALU0 310 and ALU1 320, and facilitate a clock cycle delay in the operation of ALU1 320.

One should note that while the components of FIG. 3 are described, the nonlimiting example of FIG. 3 is intended to illustrate an exemplary logical structure of operations. More specifically, the structure depicted with respect to FIG. 3 illustrates principles of design of an ALU with a split data path and a variable SIMD factor.

FIG. 4 is an exemplary stream processing unit with paired scalar ALUs, similar to the structure from FIG. 3. As illustrated, input data is communicated to cache memory unit 472, which includes L0, L1, S0, S1, S2, S3, etc. The cache memory unit 472 communicates stored data to memory out multiplexor 474, which is coupled to port P0 476, port P1 478 and port P2 480. Port P0 476, port P1 478, and port P2 480 are also coupled to input multiplexor and latch 482a, which are coupled to ALU0. ALU0, in this nonlimiting example, is configured to calculate D0 from A0*B0+C0, which is output to D0L.

Port P0 476, port P1 478, and port P2 480 are also coupled to delay register 483, which is coupled to input multiplexor 482b, which is associated with ALU1. ALU1, in this nonlimiting example, is configured to calculate D1 from A1*B1+C1+D0. The solution can be output to D1L. Also coupled to ALU1 is output port D0L from ALU0. As one of ordinary skill in the art will understand, this particular nonlimiting example includes a calculation in ALU1 of a value from ALU0. More specifically, ALU0 calculates a value of D0, which is then sent to delay register 386. From the delay register, D0 is sent to ALU1 for calculation of D1.

Also coupled to the outputs of both ALU0 and ALU1 is multiplexor 484, which is coupled to special function unit 470 shared between two ALUs. The special function unit 470 is also coupled to the inputs of ALU0 and ALU1 via delay register 483. Outputs to ALU0 and ALU1 are also coupled to the input of the cache memory unit 472, as well as sent to other units.

Also included in the nonlimiting example of FIG. 4 is a SIMD microcoded controller 488, which can be configured to determine and communicate the desired operation control signal to the ALU0 and ALU1. Coupled to the SIMD microcoded controller 488 is a control and address for ALU component 490. Delay register 483 can be coupled between control and address for ALU component 490 and ALU1.

One should note that as FIG. 3 is directed to an embodiment where short data is being processed, FIG. 4 is directed to an embodiment where long format is being processed. More specifically, while embodiments of the present disclosure include the ability to process short data, long data, mixed data, etc., various nonlimiting examples described herein can include processing any permutation of data.

FIG. 5A is a table illustrating exemplary arithmetic functionality of paired scalar ALUs, such as the ALUs illustrated in FIGS. 3 and 4. This table describes all possible operations of a pair of ALUs (ALU0 and ALU1). Those operations can be executed with short 18-bit, long 36-bit and mixed 18-36 bit floating point data. All operations are divided on three big groups: regular, blend, and cross operations. In each group there are normal operations and quad/double type operations for 18/36 bit data. Quad/double type operations use data forwarding between sections of the same ALU or ALU0 and ALU 1. On the top of table there are columns which have exactly the same names as inputs of ALU0 and ALU1 in FIG. 3 as well as data path control signals on the same diagram.

Each operation is described by two rows: first row shows input data from ALU ports P0, P1, P2 (particular elements P0.0, P0.1 etc) to be sent to ALU inputs (a, b, c), status of few data path control signals and the second row contains the formula which describes a result sent to outputs dl and dh. The last column contains information about an SIMD factor in this particular operation for the pair of ALUs. This pair of ALUs may be replicated several times to increase overall SIMD factor. The right side of the table contains comments with abbreviated name of operation, arithmetic function of ALU hardware using multiplication sign "S" and addition sign "s" as well as involvement of MAC register in particular operation. Below is a detailed instruction set description may illustrate complete functionality of proposed stream processor.

FIG. 5B includes a GPU where a SIMD stream processor is being used as computational core. This nonlimiting example contains 4 stream processors and each of the processors contains 4 pairs of ALU and 2 SFUs. Embodiments of the stream processor are configured to process different types of data (both geometry and pixel/texel) providing variable SIMD factor for those types of data via using different command from its instruction set.

Stream processor instructions may have length from 3 to 9 bytes depending on instruction types and address modes. Instruction contain following parts: (1) Main body (general instructions and flow control instructions); (2) Instruction prefixes which may forward results of general instructions to SFU or repeat execution of general instruction; and (3) Instruction modifiers which may scale operands, set flags and control write back of result. Instruction encoding principles are listed below:

TABLE 1

| 1st byte of instruction | 2nd byte of instruction | 3rd byte of instruction | Address bytes |
|---|---|---|---|
| General instruction format | | | |
| Opcode | Operand address | Operand address | Operand addresses |
| Instruction prefix (special function unit) | | | |
| Prefix opcode | None | None | None |
| Instruction prefix (instruction repeat control) | | | |
| Repeat opcode | Immediate value | None | None |
| Instruction modifier prefixes | | | |
| Modifier Opcode | Operand modification | None | None |
| Data length prefix | | | |
| Data length opcode 1 | Data length opcode 2 | None | None |
| Control Flow instructions | | | |
| Control flow opcode 1 | Control flow opcode 2 | Displacement 1 | Displacement 2 |

Based on this format stream processor has following instruction set where instructions are grouped according to functionality. An exemplary stream processor Instruction set table is listed below:

TABLE 2

| Function | Format | | | |
|---|---|---|---|---|
| | 1st Byte | 2nd Byte | 3rd Byte | 4–9 Bytes |
| NUMERICAL INSTRUCTIONS General instruction | | | | |
| MAC Multiply-accumulate | 0000 00sD | short address A | short addr B/hign part A | B and D addresses[1] |
| MUL Multiply | 0000 010D | short address A | short addr B/hign part A | B and D addresses[1] |
| ADD Add | 0000 100D | short address A | short addr C/hign part A | C and D addresses[1] |
| SUB Subtract | 0000 101D | short address A | short addr C/hign part A | C and D addresses[1] |
| MAD Multiply-add (no MACC) | 0000 11sD | short address A | short addr B/hign part A | B, C and D addresses[1] |
| MAC Multiply-accumulate long form | 01BB CCsD | D high_part_A7 | short address A | B, C and D addresses[1] |
| MAC Multiply-accumulate short B addr | 0100 0CsD | D high_part_A7 | short address A | B, C and D addresses[1] |
| MAC Multiply-accumulate long B adr | 0101 0CsD | D high_part_A7 | short address A | B, C and D addresses[1] |
| ADD Add long format | 0110 0C0D | D high_part_A7 | short address A | B, C and D addresses[1] |
| SUB Subtract long format | 0110 0C1D | D high_part_A7 | short address A | B, C and D addresses[1] |
| MOV Move | 0110 10xD | D high_part_A7 | short address A | B, C and D addresses[1] |
| ADA ACC Add long format | 0110 110D | D high_part_A7 | short address A | B, C and D addresses[1] |
| SBA ACC Subtract long format | 0110 111D | D high_part_A7 | short address A | B, C and D addresses[1] |
| MAA ACC Multiply-accumulate | 0111 0CsD | D high_part_A7 | short address A | B, C and D addresses[1] |
| MUA ACC Multiply | 0111 10sD | D high_part_A7 | short address A | B, C and D addresses[1] |
| MPA ACC multiply plus ACC | 0111 110D | D high_part_A7 | short address A | B, C and D addresses[1] |
| MMA ACC multiply minus ACC | 0111 111D | D high_part_A7 | short address A | B, C and D addresses[1] |
| Cross product | | | | |
| XRS Cross product | 0001 0SsD | short address A | short addr B/hign part A | B, C and D addresses[1] [2] |
| Blend | | | | |
| BLN Blend | 0010 0SsD | short address A | short addr B/hign part A | B, C and D addresses[1] [3] |
| DP2 Dot product 2 | 0010 1SsD | short address A | short addr B/hign part A | B and D addresses[1] [4] |
| BLF Folded blend | 0011 0SsD | short address A | short addr B/hign part A | B, C and D addresses[1] |
| DPF Folded dot product | 0011 1SsD | short address A | short addr B/hign part A | B and D addresses[1] [4] |
| BL8 Short blend SIMD 8 | 1101 0SsD | short address A | short addr B/hign part A | B, C and D addresses[1] |
| DPM Dot product mixed data | 1101 1SsD | short address A | short addr B/hign part A | B and D addresses[1] [4] |
| Dot Product 4 | | | | |
| DP4 Dot product 4 | 1100 0SsD | short address A | short addr B/hign part A | B, C and D addresses[1] [5] |
| DPI Dot product 4 with IDCT swizzle | 1100 1SsD | short address A | short addr B/hign part A | B, C and D addresses[1] [5] |
| INSTRUCTION PREFIXES SFU Forward prefixes | | | | |
| REC Forward to 1/X | 0001 1001 | | | |
| SQR Forward to SQRT | 0001 1011 | | | |

TABLE 2-continued

| Function | 1st Byte | 2nd Byte | 3rd Byte | 4–9 Bytes |
|---|---|---|---|---|
| RSQ Forward to 1/SQRT | 0001 1011 | | | |
| LOG Forward to LOG | 0001 1101 | | | |
| EXP Forward to EXP | 0001 1110 | | | |
| SIN Forward to SIN | 0001 1111 | | | |

Notes:
[1] Depending on the current operand length for operand B, C and destination
[2] If the instruction format is short the "S" field affects swap only but not write masking
[3] If the instruction format is short or mixed the "S" field affects swap only but not write masking
[4] If dot and cross product instructions sign is applied to $2^{nd}$ partials
[5] If dot product 4 instructions sign is applied to $2^{nd}$ and $4^{th}$ partials; by default the address of the operand C is the address of the operand A plus 1

TABLE 3

| Function | 1st Byte | 2nd Byte | 3rd Byte | 4–9 Bytes |
|---|---|---|---|---|
| Repeat prefixes | | | | |
| REP Repeat instruction short no MACC | 1110 0rrr | | | |
| REP Repeat instruction short MACC | 1110 1rrr | | | |
| REP Repeat instruction up no MACC | 1000 rrrr | repeat_imm8 | | |
| REP Repeat instruction down no MACC | 1001 rrrr | repeat_imm8 | | |
| REP Repeat instruction up MACC | 1010 rrrr | repeat_imm8 | | |
| REP Repeat instruction down MACC | 1011 rrrr | repeat_imm8 | | |
| INSTRUCTION MODIFIERS | | | | |
| Instruction prefix | | | | |
| SCS Set scale | 1111 1100 | set_scale_imm8 | | |
| SCT Toggle scale | 1111 1101 | set_scale_imm8 | | |
| OPS Set operand fields | 1111 1110 | set_ops_imm8 | | |
| OPT Toggle operand fields | 1111 1111 | set_ops_imm8 | | |
| CFS Condition flags set | 1111 0fff | set_cf_imm8 | | |
| WBS Conditional write-back set | 0000 0111 | 0010 set_wb_imm4 | | |
| WBT Conditional write-back toggle | 0000 0111 | 0011 set_wb_imm4 | | |
| Data length prefix | | | | |
| DLS Data length set | 0000 0111 | 0100 11LL | | |
| DLT Data length toggle | 0000 0111 | 0101 11LL | | |
| FLOW CONTROL | | | | |
| Branches and calls | | | | |
| IF Conditional jump with tag toggle rel | 0000 0111 | 0001 00WW | disp8 | |
| IF Conditional jump with tag toggle abs | 0000 0111 | 0001 01WW | disp16_low | disp16_high |
| JC Conditional jump relative | 0000 0111 | 0001 10WW | disp8 | |
| JC Conditional jump absolute | 0000 0111 | 0001 11WW | disp16_low | disp16_high |
| JMP Unconditional jump relative | 0000 0111 | 0000 1000 | disp8 | |

TABLE 3-continued

| Function | 1st Byte | 2nd Byte | 3rd Byte | 4-9 Bytes |
|---|---|---|---|---|
| JMP Unconditional jump absolute | 0000 0111 | 0000 11 00 | disp16_low | disp16_high |
| CALL Unconditional call relative | 0000 0111 | 0000 10 01 | disp8 | |
| CALL Unconditional call absolute | 0000 0111 | 0000 11 01 | disp16_low | disp16_high |
| RET Unconditional return | 0000 0111 | 0000 10 10 | | |
| ENDIF Uncond jump rel set cond off | 0000 0111 | 0000 10 11 | disp8 | |
| ENDIF Uncond jump abs set cond off | 0000 0111 | 0000 11 11 | disp16_low | disp16_high |
| Loop control | | | | |
| FOR Set index counter for a loop | 0000 0110 | set_cnt_imm8 | | |
| LOOP Loop relative short | 0000 0111 | 0000 00 ll | disp8 | |
| LOOP Loop relative long | 0000 0111 | 0000 01 ll | dis16_low | disp16_high |
| Lookup | | | | |
| LKP Lookup at the constant page | 0000 0111 | 0000 11 10 | short address A | hign part A |

Notes:
[1] Depending on the current operand length for operand B, C and destination
[2] In the instruction format is short the "S" field affects swap only but not write masking
[1] MACC featured, repeat initialization from operand C, no initialization when no repeat (operand C is ignored)
[2] no MACC featured, if bit "C" is set the operand C address = operand B address + "cc" + 1
[3] MACC featured and initialized with "0" in repeats, the "cc" field always selects operand C address
operand addresses - in the order {operand A, operand B, operand C, destination} depending on the length and presence

TABLE 4

Field descriptor

| Field | Description |
|---|---|
| A | Operand A |
| B | Operand B |
| C | Operand C |
| D | Destination |
| d | Destination to ACC write enable |
| S | Swap folded parts |
| s | Sign for blend, DP4 and Cross product |
| rrr(r) | Repeat index |
| WW | Conditional branch and write-back control |
| ll | Conditional loop control (same conditions as for branch and write-back) |

TABLE 5

| D | Destination to ACC |
|---|---|
| 0 | Enable write to ACC |
| 1 | Disable write to ACC |

TABLE 6

| S | Swap folded parts |
|---|---|
| 0 | Do not swap |
| 1 | Swap folded parts |

TABLE 7

| WW | Conditional write-back control |
|---|---|
| 00 | Always write |
| 01 | Write if only Zero tag set (=0) |
| 10 | Write if only Sign tag set (<0) |
| 11 | Write if only both Zero and Sign tags set ($\leq 0$) |

TABLE 8

| rrr | Repeat count |
|---|---|
| 000 | Repeat by set |
| 001 | Repeat to 2 |
| 010 | Repeat to 3 |
| 011 | Repeat to 4 |
| 100 | Repeat to loop or fork index |
| 101 | Repeat to 6 |
| 110 | Repeat to 7 |
| 111 | Repeat to 8 |

TABLE 9

| WW or ll | Conditional branch and loop control |
|---|---|
| 00 | Always do |
| 01 | Do if only Zero tag set (=0) |
| 10 | Do if only Sign tag set (<0) |
| 11 | Do if only both Zero and Sign tags set ($\leq 0$) |

TABLE 10

Instruction coding main matrix (first byte of instruction)

| | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | | | MAC | | | | MUL | | FOR | ESC | ADD | | SUB | | MAD | |
| 1x | | | XRS | | | | | | NOP | REC | SQR | RSQ | rsrvd | LOG | EXP | SIN |
| 2x | | | BLN | | | | | | | | | | DP2 | | | |
| 3x | | | BLF | | | | | | | | | | DPF | | | |
| 4x | | | | | | | MAC short B address | | | | | | | | | |
| 5x | | | | | | | MAC long B address | | | | | | | | | |
| 6x | ADD long form | SUB long form | ADD long form | SUB long form | ADD long form | SUB long form | ADD long form | SUB long form | | | | | | | | |
| 7x | | | | | | | MAC ACC multiply-accumulate | | | | | | | | | |
| 8x | | | | | | | REP long format counting up no MACC | | | | | | | | | |
| 9x | | | | | | | REP long format counting down with MACC | | | | | | | | | |
| Ax | | | | | | | REP long format counting up no MACC | | | | | | | | | |
| Bx | | | | | | | REP long format counting down with MACC | | | | | | | | | |
| Cx | | | DP4 | | | | | | | | | | DPI | | | |
| Dx | | | BL8 | | | | | | | | | | DPM | | | |
| Ex | | REP short format without MACC | | | | | | | | REP short format with MACC | | | | | | |
| Fx | | | CFS | | | | | | | | | | SCS | SCT | OPS | OPT |

TABLE 11

Instruction coding main matrix (second byte of instruction)

| 07 | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | NOP | LOOP rel | | NOP | LOOP abs | | | | JMP r | CALL r | RET | ENDIF r | JMP a | CALL a | LKP | ENDIF a |
| 1x | | IF rel | | | IF abs | | | | | JC rel | | | | JC abs | | |
| 2x | | | | | | | | | WBS | | | | | | | |
| 3x | | | | | | | | | WBT | | | | | | | |
| 4x | | | | | | | | | | | | | | | DLS | |
| 5x | | | | | | | | | | | | | | | DLT | |
| 6x | | | | | | | | | | | | | | | | |
| 7x | | | | | | | | | | | | | | | | |
| 8x | | | | | | | | | | | | | | | | |
| 9x | | | | | | | | | | | | | | | | |
| Ax | | | | | | | | | | | | | | | | |
| Bx | | | | | | | | | | | | | | | | |
| Cx | | | | | | | | | | | | | | | | |
| Dx | | | | | | | | | | | | | | | | |
| Ex | | | | | | | | | | | | | | | | |
| Fx | | | | | | | | | | | | | | | | |

FIG. 6 is an exemplary flow diagram and logical structure of a stream processor with 4 scalar ALUs, similar to the ALUs from FIGS. 3 and 4. As illustrated, input data is being sent to four ALUs, labeled ALU0, ALU1, ALU2, and ALU3. More specifically, input data 602a in sent to the input port of ALU0. Additionally, control and address from command decoder 602e is input into ALU0, as well as common data 602f. Also input into ALU0 is data from SFU 670. During instruction execution cycle 1, this data is processed in ALU0.

During execution cycle 1, input data 602b is subjected to delay register 683a, and is then sent to input port of ALU1. Control and address from command decoder 602e is subjected to delay register 683d and is then input into ALU1. Similarly, common data 602f is subjected to delay register 683e and is input into ALU1. Data from SFU 670 is sent to ALU1 without delay. During instruction execution cycle 2 ALU1 processes the received data.

During execution cycle 1, input data 602c is subjected to delay register 683b. During execution cycle 2, this data is subjected to delay register 683p. Input data 602c is then sent to ALU2. ALU2 also receives control and address from command decoder 602e via delay register 683d and via delay register 683g. Similarly, common data is communicated to ALU2 via delay register 683e and 683h. ALU3 receives input data 602d via delay register 683c in instruction execution cycle 1, via delay register 683q in instruction execution cycle 2, and via delay register 683f in instruction execution cycle 3. Similarly, control and address from command decoder 602e is received at ALU3 via delay register 683d in instruction execution cycle 1, via delay register 683g in instruction execution cycle 2, and via delay register 683i in instruction execution cycle 3. Common data is received at ALU3 via delay register 683e in instruction execution cycle 1, via delay register 683h in instruction execution cycle 2, and via delay register 683j in instruction execution cycle 3. The output of ALU3 is sent to output buffer with 4 slots of width M (4×M) 604 and to multiplexor 672, which is coupled to an input port of SFU. Similarly, output from ALU2, ALU1, and ALU0 are sent to multiplexor 672. The output of ALU2 is sent to output buffer 4×M 604 via delay register 683o. The output of ALU1 is sent to output buffer 4×M 604 via delay register 863l and via delay register 683n. The output of ALU0 is sent to 4×M 604 via delay register 683r, via delay register 683k, and delay register 683m. One should note that in at least one embodiment, the configuration illustrated in FIG. 6 can include logic for removing at least one delay from the data path.

FIG. 7A is a flowchart illustrating an exemplary normalized vector difference processing in a vector ALU. More specifically, one can consider a nonlimiting example when calculation of normalized vector difference is executed on traditional vector ALU and stream SIMD scalar ALUs. FIG. 7A shows the data flow for vector normalized difference calculation. Example function: vector Normalized_Difference (Vector V1, vector V2) vector architecture implementation:

//Data allocation: V1→r0.xyzw V2→r1.xyzw (x,y,z,w are components of graphics data vector)
//Program for vector ALU
SUB r2, r0, r1//subtraction of all components
DP3 xr3.x, r2, r2//dot product of three components with result in x-component
RSQ r3.x, r3.x//Reciprocal square root of result in x-component
MUL r2, r2, r3.x//Scaling all components with RSQ result.

To process 4 sets of data, this sequence can be repeated 4 times, taking 16 instruction cycles. One can also consider an implementation of the same task on SIMD stream processor with scalar ALUs illustrated on FIGS. 7B and 7C:

Example function: vector Normalized_Difference (Vector V1, vector V2)

Comparison of traditional implementation with SIMD stream scalar ALU architecture. SIMD with scalar ALUs implementation: V1→r0.xyzw=r0[0], r0[1], r0[2], r0[3] V2→r1.xyzw=r1[0], r1[1], r1[2], r1[3]. (x,y,z,w-components of graphics data vector, r[0-3] addressed as separate scalars)

TABLE 12

| Vector ALU | Stream SIMD scalar ALU | Comment |
| --- | --- | --- |
| SUB r2, r0, r1 | Repl( j < 3 ) SUB r2[ j ], r0[ j ], r1[ j ] | subtraction of all components |
| DP3 r3.x, r2, r2 | Repl( j < 3) MAC Null, r2[ j ], r2[ j ] | dot product of all components with result in x-component, implemented as multiply-accumulate |
| RSQ r3.x, r3.x | Repl( j < 3) RSQ ACC, FWD | Reciprocal square root of result in x-component, forwarded to Special Function unit, paired with MAC |
| MUL r2, r2, r3.x | Repl(j < 3) MUL r2[ j ], r2[ j ], ACC | Scaling all components with RSQ result |
| | Repl(j < 3) SUB r2[ j ], r0[ j ], r1[ j ] | Scalar Address offset j = 0, j = j + 1, . . . |

FIG. 7B is a flowchart of an exemplary processing routine in a proposed stream scalar ALU combined with an SFU, while FIG. 7C is a continuation of FIG. 7B. According to the nonlimiting examples of FIGS. 7B and 7C, SIMD stream processor with scalar ALUs can process 4 sets of graphics vector data simultaneously and it takes 10 instruction cycles (9+1) versus 16 cycles in traditional vector architecture. The efficiency grows with reduction of vector size, with 2-element vectors the same data can be processed in 8 cycles versus same 16 cycles in traditional vector ALU.

FIG. 8 is an exemplary ALU module, implementing functionality of the ALUs from FIG. 6. More specifically, the nonlimiting example of FIG. 8 can be viewed as an exemplary embodiment of ALU0 from FIG. 6. Embodiments of the ALU include four main parts: a data path with a dual format multiply-accumulate unit 872 and necessary input and output multiplexors 870, 874; a register pool containing delay registers 883a, a write-back register 876, a plurality of accumulators 878 for each thread; a temporary SRAM with a local ALU temporal register file 880; and a local control unit with necessary state machine and address generator 882.

As illustrated, input data IN0 is sent to multiplexor 870 in the data path portion of the ALU. Input data IN1, IN2, and IN3 are sent to delay register 883c, delay register 883d, and delay register 883e, respectively, and then to output. Control and address signal CAI is sent to delay register 883a and then to output, as well as to an input port of the control state machine and address generator 882 in the local control portion of the ALU. The common data input CDI is sent to delay register 883b. From delay register 883b, the common data CDI is sent to output, as well as to an input port of mulitplexor 870.

Also received at multiplexor 870 is data RD0 and RD1 from SRAM register file 880, as well as data from writeback register 876, and data from thread accumulator registers 878. The multiplexor 870 is illustrated as having three output ports, each configured to communicate "M" bits of data. The output ports of multiplexor 870 are coupled to dual format multiply accumulate (MACC) unit 872, discussed in more detail below. The output of the dual format MACC unit 872 is coupled to the second input port of multiplexor 874, as well as to the input of writeback register 876. The output of the writeback component 876 is, as discussed above, is coupled to the input of multiplexor 870, as well as to input port WDATA of SRAM register file, output O0, and output FW. Output from multiplexor 874 is coupled to thread accumulator registers 878, which, as discussed above, is coupled to the input of multiplexor 870. Also discussed above, address and control CAI is coupled, via delay register 883a, to control state machine and address generator 882. The control state machine and address generator outputs data to SRAM register file at ports RA0, RA1, WA and WE.

FIG. 9 is an exemplary modular stream processor with 4 ALUs, similar to the ALUs from FIGS. 3 and 4, but built using a scalar processor module described in FIG. 8. The structure shows an SIMD stream multiprocessor using the same scalar processor module described on FIG. 8. Such approach simplifies design and verification efforts, which can be applied to one machine module that will be used to build scalable SIMD stream processor. Also, similar to FIG. 8, address and control signal (CAI from FIG. 8) is input into CAI of ALU0. Common Data (CDI from FIG. 8) is input into CDI of ALU0. As illustrated in FIG. 6, ALU0 receives input from input buffer 4×M directly to IN0. ALU0 then processes the received data, but the data is subjected to three delays (illustrated as delay register 683r, 683k, and 683m in FIG. 6). In FIG. 8, the delays are represented via the coupling of outputs to inputs within ALU0. More specifically, the data is received at IN0, processed, and output to O0. O0 is coupled to In3, which processes the data (representing the first delay) and outputs to O3. O3 is coupled to IN2, which processes the data (representing the second delay) and outputs to O2. O2 is coupled to IN1, which processes the data (representing the third delay) and outputs to O1. The output from O1 is coupled to Output buffer 4×M.

With respect to ALU1, the control and address signal and the common data signal are received at CAI and CDI of ALU1, respectively. As illustrated in FIGS. 6 and 8, these signals are subjected to a delay prior to being received at ALU1. This delay is represented by being input through ALU0, output to CA0 and CD0, respectively, and then being sent to CAI and CDI of ALU1. Input data from Input buffer 4×M is received at IN1 of ALU1. As illustrated in FIG. 6, input data is subjected to a delay (delay register 683a in FIG. 6) prior to being processed by ALU1. This delay is implemented in FIG. 9 via the coupling of output O1 being coupled to IN0. The data is then processed and output to O0. Output O0 is coupled to IN3 for creating the output delays, as illustrated in FIG. 6. The two output delays are created via the processing from IN3 to O3 (delay register 683l) and the processing from IN2 to O2 (delay register 683n). Once subjected to the two delays, the output data can be sent to output buffer 4×M.

With respect to ALU2, the control and address signal and the common data signal are subjected to two delays via ALU0 and ALU1, and then input at CAI and CDI of ALU2. Input data is received from input buffer 4×M at input port IN2 of ALU2. To facilitate the two input delays, illustrated in FIG. 6, the received signal is processed (delay register 683b in FIG. 6) and output to O2. The signal is then received at IN1, processed (delay register 683p) and output to O1. The input data is then received at IN0, processed to achieve the desired output data, and sent to output O0. To facilitate the output delay, the output data is sent to IN3, processed (delay register 683o) and output to Output buffer 4×M.

With respect to ALU3, the control and address signal and the common data are received at CAI and CDI of ALU3, after being subjected to three delays (ALU0, ALU1, and ALU2). The input data is sent to IN3 and subjected to three input delays. The first input delay occurs through processing in ALU3 between IN3 and O3 (delay register 683c). The input signal is sent from O3 to IN2, and then subjected to a second delay (delay register 683q) in ALU3. The input data is then output to O2 and sent to IN1. The input data is then delayed (delay register 683f) and output to O1. The input data is then sent to IN0, processed and output to O0. The output data is then sent to Output buffer 4×M.

Additionally, as also illustrated in FIG. 8, the output data is coupled to output port FW to be sent to the special function unit (SFU) 980. The output data can then be sent to multiplexor 970. Multiplexor 970 is coupled to SFU which can further process the output data, for input to input port SF on each ALU.

One part of the stream ALU module is the Multiply Accumulate unit, which can be configured to support a variable SIMD factor processing, which can require dual floating point data formats and the ability to fold (reduce) the SIMD factor and process data horizontally. One should note that in this disclosure, the acronym "MAC" is reserved for Multiply Accumulate registers, while "MACC" and "Multiply Accumulate Unit" refer to a dual format Multiply Accumulate Unit, such as component 872 from FIG. 8.

Additionally, as illustrated in FIG. 9, embodiments may be configured such that ALU0, ALU1, ALU2, and ALU3 are configured to receive operation data from the Special Function Unit (SFU), where the operation data is configured to indicate an operation to perform on the received data. Similarly, some embodiments are configured such that ALU0, is configured to send common data to ALU1. ALU1 may be configured to send common data to ALU2. ALU2 may be configured to send common data to ALU3.

FIGS. 10A-10C are diagrams illustrating exemplary data flow and formats for Multiply Accumulate (MACC) units, such as the MACC unit from FIG. 8. More specifically, referring back to FIG. 8, the MACC unit 872 can be configured to process long data (floating point, integer, etc.), short data (floating point, integer, etc.), and mixed data (floating point, integer, etc.) with increased performance when processing operands with short data.

FIG. 10A is an exemplary logical data flow structure of a Multiply Accumulate Unit and illustrates the ability to operate with two different data formats, which can be referred to as long and short floating point formats. Described below steps that can be taken in floating point data processing according to a floating point arithmetic algorithm:

1) Short and/or long exponent processing when exponents for multiplicands are added and exponents for addition operands are subtracted.

2) Multiplication of mantissas for short and/or long operands in sectional multiplier.

3) Short and/or long mantissa complement according to a sign of operation and operand modifiers defining addition or subtraction.

4) Short and/or long mantissa alignment before their addition/subtraction, which requires shift according to exponent difference.

5) Short and/or long mantissa addition/subtraction for multiply-add operands.

6) Short and/or long mantissa addition/subtraction with pre-aligned MACC register content.

7) Normalization of result which may require mantissa shift with related exponent update before sending it to output buffer.

As illustrated in FIG. 10B, long floating point data can be implemented in 36 bits, with bits 35-31 being associated with exponent high bits $e_8$-$e_4$. Bits 30-18 represent mantissa high, which include $m_{12}$-$m_0$. Bit 17 represents exponent value $e_9$. Bits 16-13 represent exponent low, bits $e_3$-$e_0$. Bit 12 represents mantissa sign ms, which is part of mantissa low, as well as bits 11-0, which represent $m_{24}$-$m_{13}$.

FIG. 10C illustrates short floating point data, beginning with short floating point data for channel 1. These two short data items may be on the place of long format data described in FIG. 10B. More specifically, bit 35 is associated with exponent bit $e_4$. Bits 34-31 are associated with exponent high bits $e_3$-$e_0$. Bits 29-18 are associated with mantissa high, bits $m_{11}$-$m_0$. For the short floating point data associated with channel 0, bit 17 is associated exponent bit $e_4$. Bits 16-13 are associated with exponent low, bits $e_3$-$e_0$. Mantissa sign bit ms is associated with bit 12, and bits 11-0 are associated with mantissa low bits $m_{11}$-$m_0$.

FIG. 11 is an exemplary detailed internal logical structure of a floating point datapath of a MACC unit, similar to the MACC unit from FIG. 8 and implementing data flow from FIG. 10A. More specifically MACC unit 872, as illustrated in FIG. 8 can be configured to process both short and long floating point (FP) data. The exemplary floating point datapath illustrated in FIG. 11 includes the following main parts, which can be configured to process one set of long operands (ABC) or two sets of short operands (2×abc).

1) Exponent processing part where long and short exponents are processed in appropriate channels;

2) Mantissa processing part where long and short mantissas are processed. The exemplary floating point datapath of FIG. 11 is implemented according to a floating point multiply-add algorithm with additional accumulator unit.

MACC unit 872 can include a short exponent calculation and scale unit for channel 0 (SECS0) 1120. SECS0 receives the five bits associated with the high exponent bits for operand "A" from channel 1 (hereinafter "a1"). Additionally, SECS0 receives the five low exponent bits for operand "B" from channel 0 (hereinafter "b0"), the five low exponent bits for operand a1, the five low exponent bits for operand b1, and the five exponent bits associated with third operand cl (where cl denotes the operation ab+c). Also received at SECS0 are scale coefficients for operands C, B and A scal_c, scal_h, and scal_l. Outputs from SECS0 include a short 6-bit exponent, which is sent to the complement and alignment shifter unit (CASU) 1139 operand mantissa alignment before addition. The SECS0 also outputs a short 6-bit exponent to final adder (CPA or CLA) and Normalization Unit 1147 to output final values of exponent and provide a desired final output from the FP datapath.

The Long Exponent Calculation and Scale unit (LECS) 1140 receives combined 10-bit input from the exponent data associated with operand a0 and a1, the combined 10-bit input from the exponent data associated with operand a0 and a1, and the combined 10 bit input from third operand ch and cl. Also received are operand scale coefficients scal_c and scal_h. Output from LECS 1040 include three 11-bit outputs that are sent to CASU 1139, as well as a long 11-bit exponent sent to final adder and Normalization Unit 1147.

The mixed exponent and short exponent calculation and scale unit channel 1 (MESEC1) 1130 receives five bits from operand a0 low exponent. Additionally, MESEC1 receives five bits from operand bq high exponent, five bits from operand a0 high exponent, operand b0 high exponent, and ch_e, operand b0 low exponent, operand b1 low exponent, as well as the 10 bits from b0 and b1 high exponent and cat(ch_e, cl_e). The MESEC1 also receives scal_c, scal_h, and scal_l. Output from MESEC1 are three sets of data (either 6 bits or 11 bits, depending on the particular operands) to CASU 1139, as well as a short 6 bit exponent to CPA/CLA and Normalization Unit 1147.

With regard to the mantissa associated with channel 0, multiplier 1131 receives operand a1 low mantissa (13 bits) and operand b1 high mantissa (13 bits). Multiplier 1133 receives operand a1 high mantissa (13 bits) and operand b0 low mantissa (13 bits). Both multiplier 1131 and multiplier 1133 output 26 bits to CASU 1139. Additionally received at CASU 1139 for channel 0 are cl_m (13 bits), as well as sign bits sign_h, sign_l, and sign_c. Similarly, for channel 1, multiplier 1135 receives operand a0 mantissa high (13 bits) and operand b0 mantissa high (13 bits). Multiplier 1137 receives operand a1 mantissa low (13 bits) and operand b1 mantissa high (13 bits). Sign bits sign-h, sign_l, and sign_c (for long format), as well as operation modifiers abs_c and neg_c are also received at CASU 1139 for channel 1.

Output from CASU 1139 include six 26-bit outputs for short format operands to multi-input adder (MAD CSA unit) 1141, which implements a step of multiply-add (MAD). This unit 1141 can be configured to be implemented using carry-save adders (CSA) with multiple inputs including four 37-bit signals (for long format operands) sent to MAD CSA Unit 1141 and two 39-bit signals sent to MAD CSA Unit 1141 from CASU 1139. MAD CSA unit 1141 outputs two 2+26 bit outputs to multiply accumulate (MACC) carry save adder (CSA) unit 1145 or 2+40 bits to MAC CSA unit 1145 (long format). The MAC CSA unit operand 1145 can be configured to output two 5+26 bit outputs for short format and a 5+40 bit output (long format) to Final Adder and Normalization Unit 1147. The MAC CSA unit 1145 also outputs 5+40 bits (long format) and two sets of 5+26 bits (short format) to MAC register 1143, which is coupled to the complement and alignment shifter 1144. The complement and alignment shifter 1144 outputs two 5+26 bit signals and a 5+40 bit signal for long format back to MAC CSA unit 1145. Final Adder and Normalization unit 1147 outputs two short format results with the form of one sign bit, five exponent bits, and 13 mantissa bits (s5e13m). Additionally, in at least one embodiment, the Final Adder and Normalization unit 1147 can output a long format operand in the form s10e26m.

Described below are two possible implementations of dual format multiplication-add-accumulate operation described on FIG. 11: separate data paths for short data formats and long data formats when we use separate circuits to process different data formats and share only output data/result buffer; and a combined data path when we use same circuits with some extra logic to process both short and long format data in interleaved manner.

FIG. 12 is an exemplary diagram of a separate short exponent calculation, similar to the short exponent calculation channel from FIG. 11. This short exponent channel receives exponents of three short operands and exponent of MACC to calculate the resulting exponent and number of shifts for operand mantissa alignment units. The short channel contains 4 levels of exponent adders: adders for multiplication 1212 and 1214, adders for addition 1204, 1206 and 1208, adders for MACC 1216, 1218, 1222, 1224 and adders for operand scale 1242, 1244, 1246 (2×, 4× etc). The short channel also contains multiplexors 1210, 1226, 1232, 1234, 1236 to select correct input for mentioned above adders and MAC exponent register 1228. Additionally, the short channel contains priority encoder 1220 which generates control signal for multiplexors based on negative or positive results on the output of selected adders. As the result of operation short mantissa channel generates few signals to be used in short mantissa channel. These signals include the following: exponent for channel 0 and a group of mantissa shift signals for alignment units including shift of short operand c, shift of short operands a and b, shift for MACC register value. Table 13 describes output control functionality with CPA 1208 sign outputs defining the condition for routing for each output signal (see encoder table x1 x2 x3 inputs in FIG. 12):

TABLE 13

| Condition 0 x1<br>CPA 1208A | Condition 1 x2<br>CPA 1208B | Condition 2 x3<br>CPA 1208C | Output<br>control<br>code |
|---|---|---|---|
| NOT(cl > a1h * b0l) | NOT(a1l * b1h > a1h * b0l) | a1h * b0l > a1l * b1h | 0 |
| NOT(cl > a1h * b0l) | a1l * b1h > a1h * b0l | NOT(a1h * b0l > a1l * b1h) | 0 |
| NOT(cl > a1h * b0l) | a1l * b1h > a1h * b0l | a1h * b0l > a1l * b1h | 0 |
| cl > a1h * b0l | NOT(a1l * b1h > a1h * b0l) | a1h * b0l > a1l * b1h | 1 |
| cl > a1h * b0l | a1l * b1h > a1h * b0l | NOT(a1h * b0l > a1l * b1h) | 1 |
| cl > a1h * b0l | a1l * b1h > a1h * b0l | a1h * b0l > a1l * b1h | 1 |
| NOT(cl > a1h * b0l) | NOT(a1l * b1h > a1h * b0l) | NOT(a1h * b0l > a1l * b1h) | 2 |
| cl > a1h * b0l | NOT(a1l * b1h > a1h * b0l) | NOT(a1h * b0l > a1l * b1h) | 2 |
| MAC operation only | MAC operation only | MAC operation only | 3 |

More specifically, as discussed above, SECS0 1120 receives input from cl_e, operand b1_e high exponent (5 bits), operand a1_e low exponent (5 bits), operand b0_e low exponent (5 bits) and operand a1_e high exponent (5 bits). These inputs are coupled to zero exponent detector 1202. Zero exponent detector 1202 can be configured to output a signal if the exponent equals 0. Additionally, zero exponent detector 1202 outputs 5 of cl_ebits to carry propagate adder (CPA) 1204, which is part of the CPA for addition, as well as to the 1 input to multiplexor 1210. Two sets of five bits are also sent to another CPA 1212, and two sets of five bits are sent from zero exponent detector 1202 to CPA 1214. CPA 1212 sends data (6 bits) to CPA for addition 1204, to CPA for MAC 1218 as well as to the 0 input to multiplexor 1210. CPA for multiplication 1214 sends output to CPA for addition 1206, CPA 1208, CPA for MAC 1222, and input 2 for multiplexor 1210.

CPA for addition 1204 sends 6 bits of data to the 0 input of multiplexor 1232, as well as to inverter 1250, which inverts the signal and sends the inverted signal to input 1 of multiplexor 1234. CPA for addition 1204 also generates a negative result (<0) signal for encoder 1220, which controls multiplexors 1230, 1232, 1234, and 1236. CPA for addition 1206 sends 6 bits to input 2 of multiplexor 1232, as well as inverter 1254, which inverts the signal and sends the inverted signal to input 1 of multiplexor 1236. CPA for addition 1206 also generates a negative result (<0) signal for encoder 1220. CPA for addition 1208 sends a negative result (<0) signal to encoder 1220, as well as six bits to input 2 of multiplexor 1234 and input 0 of multiplexor 1236, via inverter 1252. Multiplexor control input 1210 is coupled an output of to "or" block 1230, as well as encoder 1220. Additionally, multiplexor 1210 outputs 6 bits to "and" block 1240, as well as six bits of data to channel 1.

CPA for MAC 1216 sends six bits of data to multiplexor 1232. CPA for MAC 1218 sends 6 bits to input 3 of multiplexor 1234. CPA for MAC 1222 sends 6 bits to input 3 of multiplexor 1236. CPA for MAC 1224 sends 6 bits to AND block 1240. Multiplexor 1226 receives 6 bits from multiplexor 1210 into input 1, as well as 6 bits from MAC exponent register 1228. Output from multiplexor 1210 is sent to the input of MAC exponent register 1228, as well as to channel 0 output.

Multiplexor 1242 outputs 6 bits to CPA for operand scale 1242, which also receives scale_c, where scale_c represents scale operand 2×, 4× and scale_1 represents scale 2×, 4×, etc. of a result in the multiplication operation before addition with c_l. CPA 1242 outputs data of mantissa shift_cl value, which can be used by alignment shifter. CPA for operand scale 1244 receives the output from multiplexor 1234, as well as scale_l (scaling the result of multiplier X_l), and outputs 6 bits to mantissa shift_l0. CPA for operand scale 1246 receives 6 bits of input from multiplexor 1236, as well as scale_h (scaling the result of multiplier X_h), and outputs 6 bits to mantissa shift_h0, which can be used in mantissa alignment shifter. AND gate 1240 receives output from CPA for MAC as well as 6 bits from multiplexor 1210. AND gate 1240 outputs 6 bits to mantissa shift_macc0 output, which can between used in MAC alignment shifter.

FIG. 13 is an exemplary diagram of a short exponent calculation, similar to the short exponent calculation from FIG. 11. Short exponent channel 1 is almost symmetrical to exponent channel 0 from FIG. 12 and has similar functionality except the possibility to add channel 0 short exponent value to the final output exponent. This feature can support variable SIMD factor in short operand processing mode. More specifically, as shown, inputs include operand a0 high exponent (5 bits), operand b0 high exponent (5 bits), operand a0 low exponent (5 bits), operand b1 high exponent (5 bits) and exponent short operand ch_e. While the circuitry of the short exponent calculation channel 0 (FIG. 12) and the short exponent calculation channel 1 (combined with mixed exponent channel) of FIG. 13 are similar, one notable distinction is the presence in FIG. 13 of multiplexor 1355. Multiplexor 1355 receives exponent from channel 0 (FIG. 12 output), as well as output from MAC component register 1328. Multiplexor 1355 outputs data to the CPAs for MAC of FIG. 12. This data (along with the input data can be processed to provide signals with exponent value channel 1, mantissa shift_mac1, mantissa shift_h1, mantissa shift_l1, and mantissa shift_ch.

FIG. 14 is an exemplary diagram of a short mantissa path for various channels, explaining in detail, the mantissa path the path illustrated in FIG. 11. One purpose of this structure is to provide operations on mantissa parts of short floating point operands. This structure can be configured to implement the same operation d=a*b+c+MAC and contains necessary hardware blocks. The short mantissa datapath includes two almost symmetric parts: short mantissa channel 0 and channel 1 (left and right side of FIG. 13 respectively). They contain sectional multipliers 1431, 1433, 1435, 1437 sending their output to complement and alignment shifter units 1439a, b, c, d, e, f, g, h, marked by (+/−/>>), which aligns operand mantissa according to selected exponent value. These units also complement or negate input mantissa values according to operation signs (addition versus subtraction). These units are combined with adders 1441a, 1441b and 1445a, 1441b implemented as carry-save adder trees, which add multiplication results with operand c_low and c_high as well as addition with macc_low and macc_high. MAC short mantissa registers 1430a and 1430b contain accumulated short mantissa value. Full adders and normalizers 1447a and 1447b generate final values of short mantissa and exponent for both channels.

More specifically, as discussed above, a multiplier X0L 1431 receives 14 bits of input associated with operand b1_low mantissa, as well as 14 bits associated with operand a1_low mantissa. Multiplier 1433 receives 13 bits associated with operand b0_low mantissa and 13 bits from operand a1_high mantissa. CASU 1439a receives 6 bits associated with shift cl and 13 bits associated with cl_m, as well as a bit associated with sign_c. CASU 1439b receives the 26 bit output from multiplier 1431, as well as 6 bits for prealignment shift control from shift 10, which in output of short exponent channel output (FIG. 12), and sign value sign_l. CASU 1439c receives 26-bit product mantissa from multiplier X0H 1433, 6 bits for prealignment shift control from with shift h0 output of short exponent channel and sign value sign_h.

The output from the CASUs (1439a, 1439b, 1439c) are input to MAD CSA tree 1441a, (with corresponding table showing a number of CSA levels and extra bits). MAD CSA tree 1441a outputs 2+26 bits of data to MAC CSA tree 1445a and to multiplexor 1432. Extra bits are configured to catch up overflow of the mantissa in the MAC loop before alignment and normalization. CPA adder and normalize unit 1447a receives 5+26 bits of mantissa data from MAC CSA tree 1445a and exponent value from short exponent 0, as well. The extra 5 bits are added to catch up possible mantissa overflow in MAC loop. Full Adder and Normalizer unit 1447a converts the mantissa from CSA format to regular binary encoding form, normalizes the result, and outputs the result. The result includes a sign bit, 5 exponent bits, and 13 mantissa bits (s5e13m) and goes to dl output.

Also as discussed above, multiplier X1H 1435 receives operand a0 high mantissa and operand b0 high mantissa. Multiplier X1L 1437 receives operand a0 low mantissa and operand b1 high mantissa. CASU 1439d receives the output from multiplier X1H 1435 (26 bit product mantissa) as well as 6 bits from shift l1 (exponent channel output) for operand mantissa alignment and one bit with sign value from sign_h. CASU 1439e receives 26 bits from multiplier 1437, 6 bits from shift h1, and one bit from sign_l. CASU 1439f receives 13 bits from ch_m, 6 bits from shift ch, and one bit from sign_c. MAD CSA tree 1441b is configured to receive 26 bit prealigned mantissa from CASU 1439d, 26 bits from CASU 1439e, and 26 bit mantissa from CASU 1439f.

Additionally MAC_h register 1430b receives data (5+26 bits) from MAC CSA tree 1445b. Multiplexor 1432 receives data (5+26 bits) from MAC_h 1430b, as well as data from MAD CSA tree 1441a from channel 0. CASU 1439h receives 5+26 bits of data from multiplexor 1432, as well as mantissa shift_macc1 signal from exponent channel. MAC CSA tree 1445b receives data from CASU 1439h (5+26 bits) as well as 2+26 bits of data from MAD CSA tree 1441b. Full adder and Normalizer 1447b receive data exponent from exponent channel 1, as well as 5+26 bits of data from MAC CSA tree 1445b. Full Adder and Normalizer 1447b sends s5e13m result bits of data to output dh.

FIG. 15 is an exemplary diagram of a long exponent calculation, similar to the exponent calculation from FIG. 11. The nonlimiting example of FIG. 15 includes four adder levels with appropriate multiplexors similar to short exponent channel on FIGS. 11 and 12. The difference is that this channel processes a set of 10-bit long exponents of versus set of 5-bit short exponents in FIGS. 11, 12. Long exponent processing channel suppose to generate all operands shift signals for mantissa alignment in mantissa processing channel and result exponent for further normalization.

Table 14 presents routing functionality of long exponent channel

TABLE 14

| Condition 0<br>Sign output of CPA<br>1503 | Condition 1<br>Sign output of CPA 1509 | Output MUX control<br>for<br>C shift amount and<br>A * B shift amount |
|---|---|---|
| NOT(C > A * B) | NOT((A * B or C) > MAC) | 0 |
| NOT(C > A * B) | (A * B or C) > MAC | 1 |
| C > A * B | NOT((A * B or C) > MAC) | 2 |
| C > A * B | (A * B or C) > MAC | 3 |

CPA for multiplication (MUL) 1505 receives 10 bit exponents multiplicands A and B as the combination of operand a0 high exponent and a1 high exponent, as well as the combination of operand b0 high exponent and b1 high exponent. CPA for MAD 1503 receives 10 bit exponent of operand C as the combination of ch_e, and cl_e, as well as 11 bit result exponent from the output of CPA for MUL. Multiplexor 1511 receives data from CPA for MUL as well the exponent of operand C, which includes the combination of ch_e and cl_e. CPA for MAC 1501 receives operand C exponent from the input combination of ch_e and cl_e, as well as output from MAC exponent register 1515. CPA for MAC 1507 receives data from MAC exponent register 1515, as well as data from CPA for MUL 1505. Multiplexor 1513 receives data from register 1515 data from multiplexor 1511. Data from multiplexor 1511 is also sent to output exponent to ALU1. Output from multiplexor 1513 is sent to register 1515, as well as output (exponent). CAT component 1517 sends data to clock input CPA for MAD 1503, multiplexor 1511, multiplexor 1513, CPA for MAC 1509, multiplexor 1523, and multiplexor 1523. The CAT component merges two bit fields into one (h and l to one of double width, in this case a negative result flag from adder 1509 and the same flag from adder 1503). Multiplexor 1523 receives "0" at input port 0, an inverted shift amount from CPA for MAD 1503 at input port 1, and output from CPA for MAC 1507 at input ports 2 and 3. CPA for Scale 1527 receives output (11 bits) from multiplexor 1523, as well as coefficient scale_h and outputs A*B result shift amount. Multiplexor 1521 receives output from CPA for MAC at input ports 3 and 2, "0" at input port 1, and receives output from CPA for MAD 1503 at input port 0. Multiplexor 1521 outputs 11 bits to CPA for scale 1529, which also receives scale_c. CPA for scale 1529 outputs C shift amount.

FIG. 16 is an exemplary diagram of a long exponent calculation, similar to the long exponent calculation from FIG. 11. While the long exponent calculation of ALU0 (FIG. 15) is similar to the long exponent calculation of ALU1 in FIG. 16, one notable difference is that multiplexor 1602 receives exponent input from ALU0, along with combined input ch_e and cl_e. Additionally long exponent calculation of ALU1 generates outputs for exponent, MAC shift amount, A*B shift amount, and C shift amount. One should note that the functionality table for FIG. 16 is the same as the functionality table for FIG. 15.

FIG. 17 is an exemplary diagram of a long mantissa data path, describing in detail a datapath illustrated in FIG. 11.

One purpose of this structure is to provide operations on mantissa parts of long floating point operands. The structure can be configured to implement the operation D=A*B+C+MAC on mantissa values and contains necessary hardware blocks. Long mantissa datapath has two almost symmetric implementations: long mantissa datapath for ALU 0 (FIG. 17) and datapath for ALU 1 (FIG. 18). Long mantissa data path of ALU 0 contains 4 sectional multipliers 1731, 1733, 1735, 1737 with preshifters 1743, 1749, 1753; complement and alignment shifter units 1739a, b, c, d, e, f, g marked by (+/−>>), which aligns operand mantissa according to selected exponent value. These units also complement or negate input mantissa values according to operation signs (addition versus subtraction). These units are combined with adders 1741a, 1741b, and 1745 implemented as carry-save adder trees, which add multiplication results with operand C, as well as addition with MAC register content. MAC mantissa register 1759 contains accumulated long mantissa value. Full Adder and Normalizer 1747 generates final values of short mantissa and exponent for both channels.

More specifically, similar to above, multiplier 1731 receives data from operand a1 high mantissa and operand b0 low mantissa. Multiplier 1733 receives data related to operand a1 low mantissa and operand b1 low mantissa. Multiplier 1735 receives operand b1 high mantissa and operand a0 low mantissa. Multiplier 1739 receives operand b0 high mantissa and operand a0 high mantissa.

More specifically, similar to above, multiplier 1731 receives data from operand a1 high mantissa and operand b0 low mantissa. Multiplier 1733 receives data related to operand a1 low mantissa and operand b1 low mantissa. Multiplier 1735 receives operand b1 high mantissa and operand a0 low mantissa. Multiplier 1739 receives operand b0 high mantissa and operand a0 high mantissa.

Multiplier 1731 sends 26 bits of data to CASU 1739a, which also receives sign_h and mantissa shift_h. CASU 1739b receives 39 bits of data from multiplier 1735 via 13-bit shifter 1743. CASU 1739c receives input data (13-bit) cl_m via 13-bit shifter 1749. One feature of this nonlimiting structure is that this structure includes a two step MAD adder containing two parts: ½ MAD adder and Mad adder. This feature is coming from using sectional multipliers for long mantissa processing. ½ MAD CSA Tree 1741a receives data from CASUs 1739a, 1739b, and 1739c. MAD CSA Tree 1741b receives 1+40 bits of data from ½ MAD CSA Tree 1741a (which have been shifted via 13-bit shifter 1769), 37 bits of data from CASU 1739d, 39 bits of data from CASU 1739e, which received the data from 13-bit shifter 1753, which received data from sectional multiplier 1735. Additionally, MAD CSA Tree 1741b receives 37 bits of data from CASU 1739f, which receives data from multiplier 1737.

MAD CSA Tree 1741b sends ALU0 mantissa data to mantissa ALU1 output, as well as to MAC CSA Tree 1745. MAC CSA Tree 1745 receives mantissa shift_macc data via CASU 1739g. MAC CSA Tree 1745 sends 5+40 bits of data to Full Adder and Normalizer 1747, which also calculated the exponent for further adjustment during normalization. The extra bit in the mantissa can be configured to catch up mantissa overflow in the MAC loop. Full Adder and Normalizer 1747 sends long format operand in format s10e26m bits of data to output port cat(dh, dl), which combines both halves dh and dl into D.

FIG. 18 is an exemplary diagram of a long mantissa data path, similar to a data path illustrated in FIG. 17. More specifically, long mantissa data path ALU1 is symmetric to long mantissa data path ALU0, with a few exceptions. Most notably, mantissa from ALU0 channel is received by multiplexor

1805. Additionally, multiplexor 1705 receives ch_m, which is part of mantissa of operand C in ALU1.

FIG. 19 is an exemplary diagram of a mixed exponent calculation, describing in more detail, a mixed exponent calculation illustrated in FIG. 11. A mixed exponent issue comes when one uses two different operand formats in the command. As a nonlimiting example, one of the multiplicands may be in short format while all other operands in long format (See FIG. 5 table). The structure is very similar to short exponent calculation except it is processing long exponent values as well. Embodiments of the structure have the same 4 levels of exponent adders/subtractors with appropriate multiplexors controlled by encoder. MAC exponent register size is also 11 bits for long exponent value. More specifically, CPA 1903 receives combined data associated with operand b0 low exponent and operand b1 low exponent. CPA 1903 also receives operand a0 low exponent. CPA 1905 receives combined data of operand b0 high exponent and b1 high exponent, as well as short format operand a0 high exponent. CPA 1907 receives combined data ch_e and cl_e, as well as output data from cl_e 1903. CPA 1909 receives output data from CPA 1905, as well as input data ch_e, cl_e. CPA 1911 receives output data from CPA 1903 as, well as output data from CPA 1905. Encoder 1920 provides clock signals to CPAs 1907, 1909, and 1911, as well as control signal to multiplexor 1913 and multiplexors 1923, 1935, 1937, and 1939 via "or" logic block 1925.

Multiplexor 1913 receives data from CPA 1903 at input port 0, output from input ch_e, cl_e at input port 1, and output from CPA 1905 at input port 2. CPA 1915 receives input data ch_e, cl_e, as well as data from register 1943. CPA 1917 receives data from CPA 1903, as well as output from register 1943. CPA 1919 receives data from register 1943, as well as CPA 1905. CPA 1921 receives data from register 1943, as well as multiplexor 1913. Multiplexor 1923 receives output data from multiplexor 1913, as well as register 1943 and outputs signal result "Exponent." MAC exponent register 1943 receives data from multiplexor 1923. Multiplexor 1935 receives output data from CPA 1915 at input port 3, output from CPA 1909 at input port 2, "0" at output port 1, and output from CPA 1907 at output port 0. Similarly, multiplexor 1937 receives "0" at input port 0, output from CPA 1907, inverted by inverter 1329 at input port 1, output from CPA 1911 at input port 2, and output from CPA 1917 at input port 3. Multiplexer 1939 receives output from CPA 1911, inverted by inverter 1931 at input port 0, output from CPA 1909, inverted by inverter 1933 at input port 2, and output from CPA 1919 at input port 3. CPA 1949 receives data from Multiplexor 1935, as well as coefficient scale_c to output operand exponent shift C. CPA 1947 receives output from multiplexor 1937, as well as coefficient scale_l to output half product mantissa shift L. CPA 1945 receives output from multiplexor 1939 as well as coefficient scale_h to output half product mantissa shift H.

FIG. 20 is an exemplary diagram of a mixed exponent calculation, similar to a mixed exponent calculation illustrated in FIG. 11. The circuitry illustrated in FIG. 20 is symmetric to the circuitry of FIG. 19, with a few differences. One notable difference is that the circuitry of FIG. 19 includes multiplexor 2001, which can be configured to receive combined ch_e, ch_e fields of input data and the resulting exponent from ALU0 exponent channel.

FIG. 21 is an exemplary diagram of a mixed mantissa data path, showing a more detailed representation of the data path illustrated in FIG. 11. Mixed mantissa data path is similar to long mantissa datapath presented in FIG. 17. More specifically, similar to FIG. 17, multiplier 2131 receives short format input data operand a1 high mantissa, and b0 low mantissa. Multiplier 2133 receives a1 low mantissa and b1 low mantissa. Multiplier 2135 receives b1 high mantissa and a0 low mantissa. Multiplier 2137 receives b0 high mantissa and a0 high mantissa. CASU 2139a receives data from multiplier 2131, as well as signal bit mantissa shift A*B high. CASU 2139b receives data from multiplier 2133 that has been shifted 13 bits by shifter 2105, as well as mantissa shift A*B high and signal_l as input. CASU 2139c receives input data cl_m that has been shifted 13 bits by shifter 2109, as well as mantissa shift c, and sign_c. CASU 2139d also receives sign_c and mantissa shift C, as well as ch_m. CASU 2139e receives data from multiplier 2135 that has been shifted 13 bits by shifter 2107, as well as mantissa shift A*B low and sigh_l. CASU 2139f receives data from multiplier 2137, as well as mantissa shift A*B high and sign_h. ½ MAD CSA Tree 2141a receives output from CASUs 2139a, 2139b, and 2139c. MAD CSA Tree 2141b receives output from ½ MAD CSA Tree 2141a, as well as CASUs 2139d, 2139e, and 2139f. MAD CSA Tree sends mantissa data to ALU1, as well as MAC CSA Tree 2145. MAC CSA tree 2145 also receives data from CASU 2139g, which receives data from register 2143. Full Adder and Normalizer 2147 receives data from exponent input, as well as MAC CSA Tree 2145. Full Adder and Normalizer 2147 outputs a result mantissa to combined dh and dl.

FIG. 22 is an exemplary diagram of a mixed mantissa data path, symmetric to a data path illustrated in FIG. 21. The circuitry from FIG. 22 is similar to the circuitry from FIG. 21, with a few exceptions. Most notably, mixed mantissa data path ALU 1 (FIG. 21) includes multiplexor 2202, which receives input ch_m, as well as mantissa from ALU0 data from the circuitry of FIG. 20. The circuitry of FIG. 21 outputs result mantissa to dh and dl.

To process dual format floating point data on the same set of hardware one can use separate exponent calculation channels because of their relative small size. Additionally, one can merge short mantissa and long mantissa processing paths in a single hardware structure because it can be difficult to replicate the hardware blocks of both short and long mantissa data paths without significant growth of hardware expenses. One can generally merge most of hardware blocks used in both short and long mantissa datapaths and add some extra logic to provide correct operation execution in both short and long modes as well in mixed one.

Potential modifications to this configuration can include (but are not limited to):

1) Selecting as basic structure for modification the long exponent datapath.

2) Adding additional multiplexors on operand and result paths to select correct data for processing in each mode.

3) Splitting all complement and alignment shift units to two parts using special fence logic controlled by data format selection.

4) Splitting the MACC register into two parts.

5) Splitting the MAC CSA and final adder with normalizer into two parts separated by special fence logic.

Additionally, the following referred diagrams describe potential modifications in an implementation of dual mode ALU.

FIG. 23 is an exemplary diagram of a merged mantissa data path, similar to a data path illustrated in FIG. 11. More specifically, multiplier 2333 receives operand a1 high mantissa and operand b00 low mantissa. Multiplier 2331 receives operand a1 low mantissa and operand b1 low mantissa. Multiplier 2337 receives operand b1 high mantissa and operand a0 low mantissa. Multiplier 2335 receives b0 high mantissa and a0 high mantissa. CASU 2339a receives output from multiplier 2333, as well as shift H0 and sign_h0. CASU 2339b receives data from multiplexor 2308, which receives input from multiplier 2331 13-bit shifter 2306. CASU 2339c receives data from multiplexor 2310, which receives data from cl_m as well as 13-bit shifter 2302. CASU 2339c also receives sign_cl and shift CL. CASU 2393*d* receives data from ch_m, as well as shift CH and sign_ch. CASU 2339*e* receives data from multiplexor 2312, as well as shift L1 and sign_l1. Multiplexor 2312 receives data from multiplier 2337, as well as 13-bit shifter 2304. CASU 2339*f* receives data from multiplier 2335, as well as shift H1 and sigh_h1. CASU 2339*g* includes a high side and a low side with a fence separating the two. The high side of CASU receives a shift ACCH signal, as well as data from register 2342*a*. The low side of CASU 2339*g* receives shift ACCL signal, as well as data from register 2342*b*. Register 2342 receives-MAC, as well as data from MAC CSA Tree 0 2345, and a clock signal from MAC CSA Tree 1 2345.

½ MAD CSA Tree 2341*a* receives data from CASUs 2339*a*, 2339*b*, and 2339*c*, and sends the processed data to 13 bit shifter 2320. Multiplexor 2322 receives the shifted data, as well as the data that was not shifted, and outputs to multiplexor 2316. Multiplexor 2316 also receives data "0." MAD CSA Tree 2341*b* receives data from multiplexor 2316, and from CASUs 2339*d*, 2339*e*, and 2339*f*, and outputs the processed data to MAC CSA Tree 1 (2345). MAC CSA Tree 1 (2345) also receives data from the low side of CASU 2339*g*.

MAC CSA Tree 0 (2345) is separated from MAC CSA Tree 1 (2345) via a fence for short format. MAC CSA Tree 0 (2345) receives data from the high side of CASU 2339*g*, as well as from multiplexor 2318. Multiplexor 2318 receives data from ½ MAD CSA Tree 2341*a*, as well as mantissa ALU0 to ALU1. MAC CSA Tree 0 2345 is sends data to CPA0 2347*a*, which is separated from CPA 1 2347*b* by fence for short. CPA 1 receives data from MAC CSA Tree 1 2345. CPA 1 outputs data to Leading Zero Detector (LZD) L 2330 and LZD1 2332, as well as shifter 12334*b*. CPA 0 (2347*a*) outputs data to LZDL 2330, LZD0 (2328), and shifter 0 (2334*a*). LZD0 (2328) sends data to shifter 0 2334*a*, as does LZDL 2330. LZD0 2328 also sends data to multiplexor 2325. LZDL 2330 also sends data to shifter 1, as well as multiplexors 2325 and 2326. LZDL 2332 also sends data to shifter 1 (2334*b*) and multiplexor 2326. Shifter 0 (2334*a*) and shifter 1 (2334*b*) send data to output latch 2340.

CPA 2336*a* receives data from exponent multiplexor 2324, which receives data from short exponent channels 0 and 1, mixed exponent, and long exponent. CPA 2336*a* also receives data from multiplexor 2325, and CPA 2336*b*. Fence 2338 separates CPA 2336*a* and CPA 2336*b*. CPA 2336*a* and 2336*b* send data to output latch 2340. Output latch 2340 outputs s5e13m data to dl, s10e26m data to (dh, dl), and s5e13m data to dh.

Additionally, various control signals are depicted to illustrate an exemplary configuration for multiplexors L0, CL, L1, and MUX1-MUX 5 in Table 15, whose outputs can be switched every time a different data format is being processed in the ALU.

TABLE 15

Multiplexor Control signal values for different data format processing

| | Mux | | | | | | | | |
|---|---|---|---|---|---|---|---|---|---|
| Mode | L0 | CL | L1 | Mux1 | Mux2 | Mux3 | Mux4 | Mux5 | ExpMX |
| Long | 0 | 0 | 0 | 0 | 0 | 0 | 0 | 0 | 0 |
| Mixed | 0 | 0 | 0 | 1 | 0 | 0 | 0 | 0 | 1 |
| Short | 1 | 1 | 1 | 1 | 1 | 1 | 1 | 1 | 2 | modes:

FIG. 24 is an exemplary diagram illustrating a merged mantissa data path for ALU 1, symmetric to a data path of ALU 0 illustrated in FIG. 23. More specifically, the circuitry in FIG. 24 is similar to the circuitry in FIG. 23, with a few exceptions. One difference is that the circuitry in FIG. 24 includes multiplexor 2302, which receives result mantissa data from ALU0, as well as own operand ch_m. The circuitry outputs result data (dh, dl). Multiplexor control is generally the same as in table for merged ALU 0. These multiplexors can be configured to select particular input in case of different data format being processed in ALU 1 merged mantissa data path, as illustrated in table 16.

TABLE 16

Multiplexor Control signal values for different data format processing

| | Mux | | | | | | | | |
|---|---|---|---|---|---|---|---|---|---|
| Mode | L0 | CL | L1 | Mux1 | Mux2 | Mux3 | Mux4 | Mux5 | ExpMX |
| Long | 0 | 0 | 0 | 0 | 0 | 0 | 0 | 0 | 0 |
| Mixed | 0 | 0 | 0 | 1 | 0 | 0 | 0 | 0 | 1 |
| Short | 1 | 1 | 1 | 1 | 1 | 1 | 1 | 1 | 2 | modes:

FIG. 25A is an exemplary diagram illustrating merged shift and control logic, which can be applied in the exponent and shift control signals for merged mantissa datapath in FIGS. 23 and 24. As discussed above, many of the changes being made introduce special multiplexors which will provide routing outputs from separate exponent processing channels for short, mixed and long processing to merged mantissa processing. More specifically multiplexor 2550 receives shift h0 and mantissa shift h. Multiplexor 2552 also receives l0, as well as mantissa shift h. Multiplexor 2554 receives shift cl, as well as mantissa shift c. Multiplexor 2556 receives Shift MAC 0, as well as mantissa shift MAC. Multiplexor 2558 receives shift ch, as well as mantissa shift c. Multiplexor 2560 receives shift 1, as well as mantissa shift h. Multiplexor 2562 receives shift h1, as well as mantissa shift h. Multiplexor 2564 receives Shift MAC 0, as well as mantissa shift MAC.

Multiplexor 2566 receives shift h1, as well as output from multiplexor 2550. Multiplexor 2566 outputs Shift H0. Multiplexor 2568 receives shift h1, as well as output from multiplexor 2552, and outputs Shift L0. Multiplexor 2570 receives shift ch, as well as output from multiplexor 2554, and outputs Shift CL. Multiplexor 2572 receives Shift MAC1, as well as output from multiplexor 2556, and outputs Shift AccH. Multiplexor 2574 receives shift ch, as well as output from multiplexor 2558, and outputs Shift CH. Multiplexor 2576 receives input from Shift l1, as well as output from multiplexor 2560, and outputs Shift L1. Multiplexor 2578 receives Shift h1, as well as output from multiplexor 2562, and outputs Shift H1. Multiplexor 2580 receives Shift MAC1, as well as output from 2564, and is configured to output Shift AccL.

Table 17 shows multiplexor control signals to be applied to each channel of shift control. As it can be seen, those signals are pretty uniform and we can adjust two wires to control the multiplexors from the instruction decode state machine

TABLE 17

| Mode | Shift H0 | Shift L0 | Shift CL | Shift AccH | Shift CH | Shift L1 | Shift H1 | Shift AccL |
|------|----------|----------|----------|------------|----------|----------|----------|------------|
| Short | 2550: 0 | 2552: 1 | 2554: 1 | 2556: 1 | 2558: 1 | 2560: 1 | 2562: 1 | 2564: 1 |
|       | 2566: 1 | 2568: 0 | 2570: 0 | 2572: 0 | 2574: 0 | 2578: 0 | 2578: 0 | 2580: 0 |
| Mixed | 2550: x | 2552: x | 2554: x | 2556: x | 2558: x | 2560: x | 2562: x | 2564: x |
|       | 2566: 1 | 2568: 1 | 2570: 1 | 2572: 1 | 2574: 1 | 2578: 1 | 2578: 1 | 2580: 1 |
| Long  | 2550: 0 | 2552: 0 | 2554: 0 | 2556: 0 | 2558: 0 | 2560: 0 | 2562: 0 | 2564: 0 |
|       | 2566: 0 | 2568: 0 | 2570: 0 | 2572: 0 | 2574: 0 | 2578: 0 | 2578: 0 | 2580: 0 |

FIG. 25B is an exemplary diagram illustrating sign routing logic, which can be applied to convert sign signals generated by separate channels to sign signal for a merged dual format mantissa datapath from FIG. 23. Multiplexor 2582 receives sign h0, as well as sign h. Multiplexor 2584 receives sign l0, as well as sign 1. Multiplexor 2586 receives sign cl, as well as sign C. Multiplexor 2588 receives sign ch, as well as sign C. Multiplexor 2590 receives sign l1, as well as sign 1. Multiplexor 2592 receives sign h1, as well as sign h.

Multiplexor 2594 receives sign h1, as well as output from multiplexor 2582, and outputs sign H0. Multiplexor 2596 receives data from sign l1, as well as output from multiplexor 2584, and outputs Sign L0. Multiplexor 2598 receives Sign ch, as well as output from multiplexor 2586, and outputs Sign CL. Sign AccH is received from Sign MAC. Multiplexor 2599 receives data from Sign ch, as well as output from multiplexor 2588, and outputs Sign CH. Multiplexor 2597 receives data from sign l1, as well as output from multiplexor 2590, and outputs Sign L1. Multiplexor 2595 receives data from Sign h1, as well as output from multiplexor 2592, and outputs Sign H1. Sign AccL is received directly from Sign MAC.

To generate switch signals for these multiplexors one may need to provide special state machine which generates switch signals for each multiplexor depending on processed data formats in a particular instruction, which is presented on Table 18. As can be seen, all multiplexors may be controlled by the same signals from the state machine.

TABLE 18

| Mode | Sign H0 | Sign L0 | Sign CL | Sign AccH | CH | Shift L1 | Shift H1 | Shift AccL |
|------|---------|---------|---------|-----------|-----|----------|----------|------------|
| Short | 2582: 1 | 2584: 1 | 2586: 1 | Direct | 2588: 1 | 2560: 1 | 2562: 1 | 2580: 1 |
|       | 2594: 0 | 2596: 0 | 2598: 0 |        | 2599: 0 | 2576: 0 | 2578: 0 | 2564: 0 |
| Mixed | 2582: x | 2584: x | 2584: x | Direct | 2588: x | 2560: x | 2562: x | 2580: x |
|       | 2594: 1 | 2596: 1 | 2596: 1 |        | 2599: 1 | 2576: 1 | 2578: 1 | 2564: 1 |
| Long  | 2582: 0 | 2584: 0 | 2584: 0 | Direct | 2588: 0 | 2560: 0 | 2562: 0 | 2580: 0 |
|       | 2594: 0 | 2596: 0 | 2596: 0 |        | 2599: 0 | 2576: 0 | 2578: 0 | 2564: 0 |

FIG. 26 is an exemplary table of complement shift input and output formats, which may be utilized in the merged mantissa datapath from FIGS. 23 and 24. This table shows how actual output or input data can be treated, extended, interpreted, and/or modified in short, long, and mixed modes. Description of data format blocks from the left to the right and from top to bottom. All signal names are referred to merged datapaths in FIGS. 23 and 24. This input-output data format manipulation is desired to provide proper processing all data in CSA adders in datapath.

Multiplier actual 26-bit outputs H0 and H1 can be extended 11 least significant bits (LSBs) with 0 value. Another two multiplier outputs L0 and L1 can be extended 13-LSBs and might be shifted right by 13 positions with filling most significant bits (MSBs) by zero value. Data on adder input CH can be extended by 24 LSBs for further use. Blocks in the second row show data formats in datapath complement-shift units inputs and outputs for short, long and mixed mode.

FIG. 27A is zoomed fragment of mantissa addition datapath from FIGS. 23 and 24. This nonlimiting example shows in detail, data format transfer between units and multiplexors providing correct processing of different data formats in the chain of CSA adders ending in fenced MAC CSA tree. More specifically, the circuitry of FIG. 26 includes a ½ MAD CSA tree 2741a. The ½ MAD CSA tree 2741a receives 37 bits from H0, 39 bits from L0, and 37 bits from CL. ½ MAD CSA tree 2741a outputs 2+26 bits or 1+40 bits to 13-bit shifter 2752. After shifting the received data, the 13-bit shifter 2752 sends data to multiplexor 2754, which also receives data from ½ MAD CSA tree 2741a. Multiplexor 2750 receives data from multiplexor 2754, and also receives "0" at the other input port. Multiplexor 2750 sends output data to MAD CSA Tree 2751b, which also receives 37 bits from CH, 39 bits from L1, and 37 bits from H1. MAD CSA Tree 2741b sends 5+26 bits or 5+40 bits, most significant bits first (msb) to mantissa to ALU1, as well as 2+40 (msb) to multiplexor 2756. Multiplexor 2756 also receives data from ½ MAD CSA 2741a. Multiplexor 2756 outputs data to MAC CSA Tree 0 2756, which also receives data from Register-Accumulator output. A fence for short format 2746 separates MAC CSA Tree 0 2745a from MAC CSA Tree 1 2745b providing processing of two short format operands instead of one long format. MAC CSA Tree 1 2745b receives data from MAD CSA Tree 2741a, as well as MACC output.

FIG. 27B is an exemplary diagram of processing formats for short, long, and mixed modes that can be utilized in the CSA units from FIG. 27A. More specifically, diagram 2780a illustrates short mode processing formats for ½ MAD CSA. As shown, data H0 includes 26+11 bits that are input into ½ MAD CSA Tree 2741a. L0 includes 26+13 bits, CL includes 13+13+11 set of bits, and ½ MAD CSA Tree 2741a outputs 26+13 set of bits, with 2+26 bits as valid bits and 13 invalid bits. Diagram 2780b illustrates short mode processing for MAD CSA 2741b. As shown, H0 includes 26+11 bits that are input to MAD CSA Tree 2741b, L0 includes 26+13 bits, CL includes 13+13+11 set of bits. Additionally, 2 MAD includes 00+00+00+0 set of bits. MAD CSA Tree 2741b outputs 2+26 valid bits, and 13 invalid bits.

Diagram 2780c illustrates long mode processing formats. More specifically, H0 includes 26+11+0 bits input to ½ MAD CSA Tree 2741*a*. L0 includes 13+26 bits, and CL includes 13+13+11+0 bits input. ½ MAD CSA Tree 2741*a* outputs 2+39 valid bits. Diagram 2780*d* illustrates long mode processing formats. More specifically, H0 includes 26+11+0 bits input to ½ MAD CSA Tree 2741*a*. L0 includes 13+26 bits, CL includes 13+13+11+0 bits input, and ½ MAD includes 13+X+X+26 bits. MAD CSA Tree 2741*a* outputs 3+39 valid bits.

Diagram 2780*e* illustrates mixed mode processing formats. More specifically, H0 inputs 26+11+0 bits to ½ MAD CSA Tree 2741*a*. L0 includes 13+26 bits and CL includes 13+13+11+0 bits. ½ MAD CSA Tree 2741*a* outputs 2+39 valid bits. Diagram 2780*f* illustrates mixed mode processing formats. More specifically, H0 inputs 26+11+0 bits to ½ MAD CSA Tree 2741*a*. L0 includes 13+26 bits, CL includes 13+13+11+0 bits, and ½ MAD CSA includes X+X+39 bits. MAD CSA Tree 2741*b* outputs 3+39 valid bits.

FIG. 27C is a continuation of the processing formats from FIG. 27B. Diagram 2780*g* illustrates short mode processing formats for MAC CSA. More specifically, MAC CSA Tree 0 and 1 (2745*a*, 2745*b*) receives X+X+26 bits from MAD and 5X+26 bits from MACC. MAC CSA Tree 0 and 1 (2745*a*, 2745*b*) outputs 5+26 bits×2 channels. Diagram 2780*h* illustrates long mode processing formats. More specifically, MAD (msb) sends 14+3X+11 bits to MAC CSA Tree 0 2745*a*. MAC (msb) sends 12+5X+11 bits to MAC CSA Tree 0 2745*a*. MAC CSA Tree 0 2745*a* outputs result (MSB) as 12+5X+11 bits, where 5+11 bits are valid. Diagram 2780*l* includes MAD (lsb) sending 2+26 bits to MAC CSA Tree 1 2745*b*. MAC (lsb) sends 0+0+0+2+26 bits to MAC CSA Tree 1 2745*b*. MAC CSA Tree 1 2745*b* outputs result least significant bit first (lsb) of 0+0+0+2+26 bits, where 2+26 bits are valid. One should note that to provide short and long mantissa processing modes in the same hardware, one can utilize fence logic, which can be configured to split some CSA and CPA adders, as shown in FIGS. 23 and 24, as well as adding logic to the normalizer unit.

FIG. 28A is an exemplary diagram of a fence in a CSA adder, which may be utilized in the MACC from FIGS. 24 and 27. Using a special multiplexor controlled by mode bit, one can split long adder into two short parts. In the case of a long format, one can propagate a carry signal from one part of the adder to another part of the adder. In the case of short format, one can propagate zero. More specifically, half adder 2875*a* receives data from full adder 2876*a*. Full adder 2876*a* sends data to half adder 2875*a* and full adder 2876*b*. Full adder 2876*c* receives data from multiplexor 2877*a*, as well as full adder 2876*d*. Multiplexor 2877*a* receives "0" as well as data from full adder 2876*e*. Fence 2878*a* separates multiplexor 2877*a* from full adder 2876*e*. Half adder 2875*b* receives data from full adder 2876*e*. Full adder 2876*e* also sends data to full adder 2876*f*. Full adder 2876*g* sends data to full adder 2876*h*.

FIG. 28B is an exemplary diagram of a fence in a CPA adder, which may be utilized in the Full Adder and Normalizer from FIGS. 22 and 23. More specifically, full adder 2876*i* receives data from full adder 2876*j*, which receives data from multiplexor 2877*b*. Multiplexor 2877*b* receives "0" as well as data from full adder 2876*k*. Fence 2878*b* separates multiplexor 2877*b* from full adder 2876*k*. Full adder 2876*k* receives data from half adder 2875*c*.

FIG. 29 is an exemplary diagram of a fence in a complement shift unit, which may be utilized in the datapath from FIGS. 22, 23, and 26. On the upper left corner is an upper view diagram of a fence logic application in complement shift unit for MAC CSA. More specifically, as a more detailed illustration of CASU high 2939*a*, fence 2940, and CASU low 2939*b*, includes mode multiplexor 2914*a*. Channel 0 Mode multi-plexor 2914*a* receives data from long operands, as well as channel 0 mode multiplexor 2914*b*. Mode multiplexor provides inputs to function block 2901 and 2902*a*. Function 2901*a* calculates a predetermined function (such as is illustrated) and outputs N bits to function block 2902*a*. Function block 2902*a* calculates a predetermined function (such as is illustrated), and outputs NZ bits to multiplexor 3:1 (2906*a*). Multiplexor 2906*a* also receives "0", mantissa HM_H and "not M_H" as inputs. Multiplexor 2906*a* outputs 5+26 bits of data to barrel shifter H 2910*a*. Barrel shifter H also receives operand shift data from mode multiplexor 2908*a*, which receives long data, as well as channel 0 data. Barrel shifter h 2910*a* outputs 5+26 bits of data to CSA Tree, as well as a shift out high signal to shift data multiplexor 2912*a*. Shift data multiplexor 2912*a* also receives "0" and outputs data to barrel shifter low 2910*b*. Fence 2940 separates CASU 2939*a* from 2939*b*.

Mode multiplexor 2914*b* receives channel 1 data, as well as long ops. Mode multiplexor 2914*b* provides data for function blocks 2901*b* and 2902*b*, as illustrated. Function block 2901*b* calculates a predefined function, such as is illustrated, and provides "N" bits to function block 2902*b*. Function block 2902*b* outputs "NZ" bits to Multiplexor 3:1 (2906*b*). Multiplexor 2906*b* also receives "0", as well as mantissa L M_L and "not M_L. Multiplexor 2906*b* sends data to barrel shifter low 2910*b*. Barrel shifter low 2910*b* also receives an operand shift signal from mode multiplexor 2908*b* and outputs data to CSA Tree. Mode multiplexor 2908*b* receives long data and channel 1 data.

FIG. 30A is an exemplary fence in a normalization shifter, which may be utilized in the merged mantissa processing datapath from FIGS. 23 and 24. More specifically, CPA 0 (3047*a*) receives 5+26 bits or 5+40 bits of data. CPA 0 (3047*a*) is separated from CPA 1 (3047*b*) by a fence for short 3048. CPA 1 (3047*b*) receives 5+26 bits of data. Leading zero detector LZD0 3029*a* receives data from CPA 0 (3047*a*), and sends data to shifter H (3034*a*). Leading zero detector LZDL receives data from CPA 0 (3047*a*) and CPA 1 (3047*b*), and outputs data to shifter H (3034*a*) and shifter L (3034*b*). Leading zero detector LZD1 3032*a* receives data from CPA 1 (3047*b*) and outputs data to shifter L (3034*b*). Shifter L (3034*b*) receives, as well as the leading zero data from LZDL 3030*a* and LZD1 3032*a*, data from CPA 1 (3047*b*). Shifter L (3034*b*) outputs ML13. Similarly, shifter H (3034*a*) receives data from LZD0 3028*a* and LZDL 3030*a*, as well as data from CPA 0 (3047*a*). Shifter H (3034*a*) outputs data MH13.

FIG. 30B is a more detailed view of the exemplary fence from FIG. 30A. In this nonlimiting example, the two shift amount control multiplexors is added to shift data forwarding multiplexor to implement such a fence and allow the unit to process two short or one long format operands. More specifically, mode multiplexor 3049 receives data from LZDL 3030*b*, as well as LZD0 3028*b*. Mode multiplexor 3049 outputs shift amount data to shifter h 3034*c*, which also receives 2+13 bits of data, as well as output data from shift data multiplexor 3045. Shifter H (3034*c*) outputs 13 bits to output latch 3040.

Mode multiplexor 3041 receives data from LZD1 3032*b*, as well as LDZL 3030*b*. Mode multiplexor 3041 sends shift amount data to shifter L (3034*d*), which also receives 2+13 bits of data. Shifter L (3034*d*) sends data to shift data multiplexor, which also receives "0" and outputs to shifter H (3034*c*). Shifter L 3034*d* sends data to output latch 3040. Output latch outputs dl, (dh, dl) and dh.

FIG. 31 is a flowchart illustrating an exemplary process that may be utilized for sending data to a functionally separated ALU. More specifically, as illustrated in FIG. 31, a computing system can determine that received data is short format floating point data (block 3132). In response to determining that the received data the received data is short format floating point data, the computing system can functionally separate a first ALU into a plurality of channels for processing according to an instruction set (block 3134). The computing system can functionally separate a second ALU into a plurality of channels for processing, according to the instruction set (block 3136). The computing system can send the processed data to the second functionally separated ALU with a plurality of channels for short data (block 3138). Some embodiments of the process may include processing data at a special function unit, wherein the special function unit is configured to receive data from the first ALU and the second ALU.

It should be noted that embodiments of the present disclosure may include a Multiply-Accumulate Unit, configured to process a plurality of different data types, the Multiply-Accumulate Unit that includes a short format exponent datapath configured to facilitate processing of a first set of short format data and a long format exponent datapath configured to facilitate processing of long format data. Additionally embodiments of the Multiply-Accumulate Unit include a mixed format exponent datapath configured to facilitate processing of a second set of short format data and long format data and a mantissa datapath situated to facilitate processing of a plurality of different formatted operands, where a plurality of sets of short format data and a set of long format data are processed utilizing a common hardware structure. Additionally, in some embodiments of the Multiply-Accumulate Unit, the mantissa datapath further includes a sectional multiplier with a plurality of re-configurable outputs, the outputs being configured to process at least one of the following: a plurality of sets of short mantissa data and a set of long mantissa data. Additionally, in some embodiments of the Multiply-Accumulate Unit, the mantissa datapath further includes sectional complement logic and an alignment shifter unit, the alignment shifter unit configured to receive control signals data from an exponent datapath, the alignment shifter unit further configured to receive data from sectional multipliers and input operands.

Additionally, in some embodiments of the Multiply-Accumulate Unit, the alignment shifter unit is configured to receive at least one of the following: a plurality of sets of short exponent data, a set of long exponent data, a plurality of sets of mixed exponent data, a plurality of sets of short mantissa data, a set of long mantissa data, and a plurality of mixed mantissa data. Additionally, in some embodiments of the Multiply-Accumulate Unit, the mantissa datapath further includes a first step Multiply and Add Carry Save Adder unit configured to receive data in at least one of a plurality of different data formats and further configured to process the received data and output the processed data to a second step Multiply and Add unit and a second step Multiply and Add (MAD) unit configured to receive data from a half MAD CSA tree configured as a first step adder and configured to add partial results from a plurality of sectional multipliers with configurable outputs.

In some embodiments, the Multiply-Accumulate Unit of claim 1, includes at least one of the following for facilitating processing short format data and long format data: a sectional multiplier with re-configurable outputs, sectional complement logic, an alignment shifter unit, a two-step Carry Save Adder (CSA) with fence implementation, a Carry Propagate Adder (CPA) with fence implementation, and normalizer with fenced exponent adder and fenced mantissa shifter. In some embodiments, the Multiply-Accumulate Unit, further includes a sectional multiplier configured to operate with short and long data formats, a Multiply Accumulate (MAC) adder configured to operate as a Carry Save Adder tree, and a full adder and normalization unit configured to convert data from a Carry Save Adder (CSA) redundant format to a normal format.

In some embodiments, the Multiply-Accumulate Unit, further includes a merged mantissa channel configured to process short format data and long format data. Similarly, in some embodiments, the Multiply-Accumulate Unit, further includes a Multiply-Accumulate Carry Save Adder tree unit, further configured to receive data in any of a plurality of different data formats, the Multiply-Accumulate Carry Save Adder tree unit process the received data and output the processed data to the Normalization unit.

Additionally, this disclosure includes embodiments of a Multiply-Accumulate Unit configured to process a plurality of different data types. At least one embodiment of the Multiply-Accumulate Unit includes a short format exponent data path, the short format exponent data path including a first channel and a second channel, the short format exponent data path also including logic for processing short format exponent data, a merged mantissa data path, the merged mantissa data path including a first channel and a second channel, the merged mantissa data path also including logic for processing short format mantissa data with long format mantissa data, and a sectional multiplier with re-configurable outputs capable of processing at least one of the following: a plurality of sets of short format data and a set of long format data, utilizing a common hardware structure.

Additionally, this disclosure includes embodiments of a method of processing a plurality of different data types. At least one embodiment of the method includes receiving data at a merged mantissa datapath, determining whether the received data includes short format data, determining whether the received data includes long format data, in response to determining that the received data includes short format data, processing the short format data according to a control signal, in response to determining that the received data includes long format data, processing the long format data according to a control signal, and sending the processed data to output.

This disclosure also includes embodiments of a stream processor configured to process data in any of a plurality of different formats. At least one embodiment of the stream processor includes a first arithmetic logic unit (ALU), configured to process a first plurality of sets of short format data in response to a received short format control signal from an instruction set and process a first set of long format data in response to a received long format control signal from the instruction set. Additionally, embodiments of the stream processor includes a second arithmetic logic unit (ALU), configured to process a second plurality of sets of short format data in response to a received short format control signal from the instruction set, process a second set of long format data in response to a received long format control signal from the instruction set, and receive the processed data from the first arithmetic logic unit (ALU). Additionally embodiments of the stream process or include process input data and the processed data from the first ALU according to a control signal from the instruction set.

Additionally, embodiments of the stream processor include a special function unit (SFU) configured to provide additional computational functionality to the first ALU and the second ALU. In some embodiments of the stream processor, the first ALU is a scalar ALU. Similarly, in some embodiments of the stream processor, the second ALU is a scalar ALU.

In some embodiments, the stream processor, in response to receiving short format data, the stream processor is configured to functionally divide at least one pair of the ALUs to facilitate dual format processing with a variable Single Instruction Multiple Data (SIMD) factor for short formats and for long formats. In some embodiments of the stream processor, the instruction set includes an instruction for processing variable format data in a plurality of different modes.

In some embodiments of the stream processor, the instruction set includes at least one of the following: a normal type instruction, a blend type instruction, and a cross type instruction applicable for short format data processing and for long format data processing. In some embodiments, the instruction set includes at least one instruction to process in at least one of the following modes: a short format operand mode, a long format operand mode, and a mixed format operand mode. In some embodiments, the instruction set is configured to control variable SIMD folding mode, when output data of the first ALU is sent as an operand to the second ALU in long format mode; and wherein the output of one channel of the first ALU is sent as an operand to the second channel of the first ALU in a short format mode. Similarly, in some embodiments of the stream processor, the special function unit is coupled to the first ALU and the second ALU.

Additionally included in this disclosure are embodiments of a method for processing data in any of a plurality of different formats. At least one embodiment of a method includes determining that received data is short format data, in response to determining that the received data is short format data, functionally separate a first arithmetic logic unit (ALU) to a plurality of channels for processing, according to an instruction set, functionally separating a second ALU to a plurality of channels for processing, according to the instruction set, processing data in the first ALU, and sending the processed data to the second functionally separated ALU with a plurality of channels for short data.

This disclosure also includes embodiments of a modular stream processor configured to process data in a plurality of different formats. At least one embodiment of the modular stream processor includes a first Arithmetic Logic Unit (ALU) configured to receive first input data and control data, the control data being configured to indicate a format associated with the received input data, the first ALU further configured to process short format input data and long format input data, according to the control data. Some embodiments include a second ALU configured to receive the control data from the first ALU, the second ALU further configured to process second input data, the second input data being related to the first input data, the second ALU being further configured to process short format input data and long format input data, according to the control data. Still some embodiments include a third ALU configured to receive the control data from the second ALU, the third ALU further configured to receive third input data, the third input data being related to the first input data and the second input data, the third ALU further configured to process short format input data and long format input data according to the control data. Still some embodiments include a fourth ALU configured to receive the control data from the third ALU, the fourth ALU further configured to receive fourth input data, the fourth input data being related to the first input data, the second input data, and the third input data, the fourth ALU further configured to process short format data and long format data, according to the control data.

The flowcharts described herein show the architecture, functionality, and operation of a possible implementation of various logic. In this regard, each block can represent a module, segment, or portion of code, which comprises one or more executable instructions for implementing the specified logical function(s), circuit, or other type of logic. It should also be noted that in some alternative implementations, the functions noted in the blocks may occur out of the order. One should also note that the described data format sizes are not limited, as it is conceivable to implement similar functionality for processing 32/64, 64/128, etc. bit format. Basically, any two related formats can be processed using the principles described above. If short format is not a multiple of long format, some redundancy can be created in the data path when some bits are not used. Additionally, some embodiments may be configured with a plurality of channels for short format data and/or a channel for long format data.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A Multiply-Accumulate Unit, configured to process a plurality of different data types, the Multiply-Accumulate Unit comprising:
   a short format exponent datapath configured to facilitate processing of a first set of short format data;
   a long format exponent datapath configured to facilitate processing of long format data;
   a mixed format exponent datapath configured to facilitate processing of a second set of short format data and long format data; and
   a mantissa datapath situated to facilitate processing of a plurality of different formatted operands,
   wherein a plurality of sets of short format data and a set of long format data are processed utilizing a common hardware structure.

2. The Multiply-Accumulate Unit of claim 1, wherein the mantissa datapath further comprises a sectional multiplier with a plurality of re-configurable outputs, the outputs being configured to process at least one of the following: a plurality of sets of short mantissa data and a set of long mantissa data.

3. The Multiply-Accumulate Unit of claim 1, wherein the mantissa datapath further comprises sectional complement logic and an alignment shifter unit, the alignment shifter unit configured to receive data from an exponent datapath, the alignment shifter unit further configured to receive data from sectional multipliers and input operands.

4. The Multiply-Accumulate Unit of claim 3, wherein the alignment shifter unit is configured to receive at least one of the following: a plurality of sets of short exponent data, a set of long exponent data, a plurality of sets of mixed exponent data, a plurality of sets of short mantissa data, a set of long mantissa data, and a plurality of mixed mantissa data.

5. The Multiply-Accumulate Unit of claim 1, wherein the mantissa datapath further comprising:
   a first step Multiply and Add Carry Save Adder unit configured to receive data in at least one of a plurality of different data formats and further configured to process the received data and output the processed data to a second step Multiply and Add unit; and
   a second step Multiply and Add (MAD) unit configured to receive data from a half MAD CSA tree configured, the half MAD CSA tree configured to add partial results from a plurality of sectional multipliers with configurable outputs.

6. The Multiply-Accumulate Unit of claim 1, further comprising at least one of the following for facilitating processing short format data and long format data: a sectional multiplier with re-configurable outputs, sectional complement logic, an alignment shifter unit, a two-step Carry Save Adder (CSA) with fence implementation, a Carry Propagate Adder (CPA) with fence implementation, and normalizer with fenced exponent adder and fenced mantissa shifter.

7. The Multiply-Accumulate Unit of claim 1, further comprising:
 a sectional multiplier configured to operate with short and long data formats;
 a Multiply Accumulate (MAC) adder configured to operate as a Carry Save Adder tree; and
 a full adder and normalization unit configured to convert data from a Carry Save Adder (CSA) redundant format to a normal format.

8. The Multiply-Accumulate Unit of claim 1, further comprising a merged mantissa channel configured to process short format data and long format data.

9. The Multiply-Accumulate Unit of claim 1, further comprising a Multiply-Accumulate Carry Save Adder tree unit, further configured to receive data in any of a plurality of different data formats, the Multiply-Accumulate Carry Save Adder tree unit process the received data and output the processed data to the Normalization unit.

10. A Multiply-Accumulate Unit configured to process a plurality of different data types, the Multiply-Accumulate Unit comprising:
 a short format exponent data path, the short format exponent data path including a first channel and a second channel, the short format exponent data path also including logic for processing short format exponent data;
 a merged mantissa data path, the merged mantissa data path including a first channel and a second channel, the merged mantissa data path also including logic for processing short format mantissa data with long format mantissa data; and
 a sectional multiplier with re-configurable outputs capable of processing at least one of the following: a plurality of sets of short format data and a set of long format data, utilizing a common hardware structure.

11. The Multiply-Accumulate Unit of claim 10, further comprising a long exponent data path, the long exponent data path including a first channel and a second channel, the long exponent data path also including logic for processing long format exponent data.

12. The Multiply-Accumulate Unit of claim 10, further comprising, a mixed mantissa data path, the mixed mantissa data path including a first channel and a second channel, the mixed mantissa data path including logic for processing long format mantissa data with short format mantissa data.

13. The Multiply-Accumulate Unit of claim 10, further comprising a fence for facilitating processing of short format data.

14. The Multiply-Accumulate Unit of claim 10, wherein the short format exponent data includes one-half the number of bits as the long format exponent data.

15. The Multiply-Accumulate Unit of claim 10, wherein the short format mantissa data includes at least one-half the number of bits as the long format mantissa data.

* * * * *